United States Patent Office 3,321,667
Patented May 23, 1967

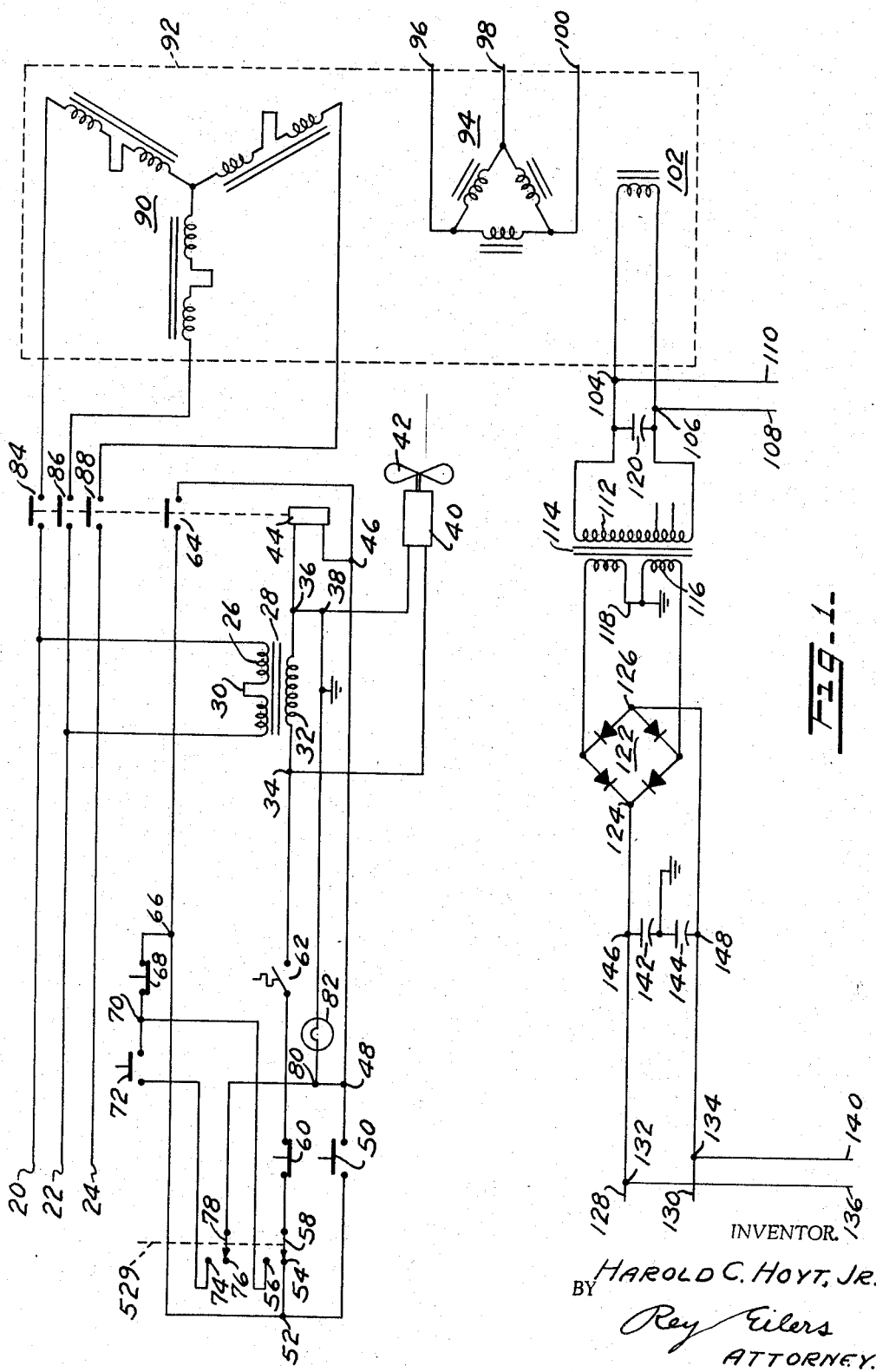

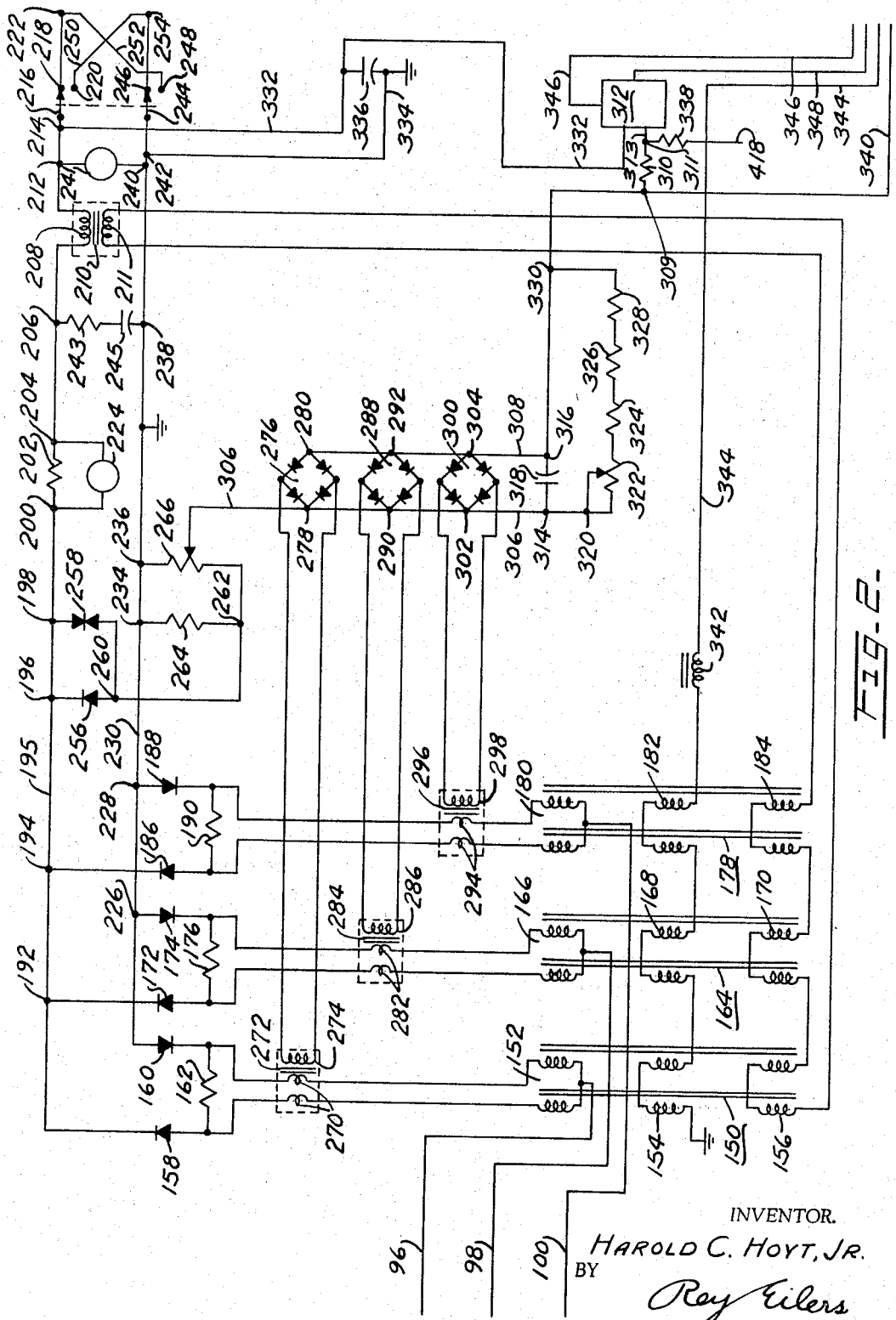

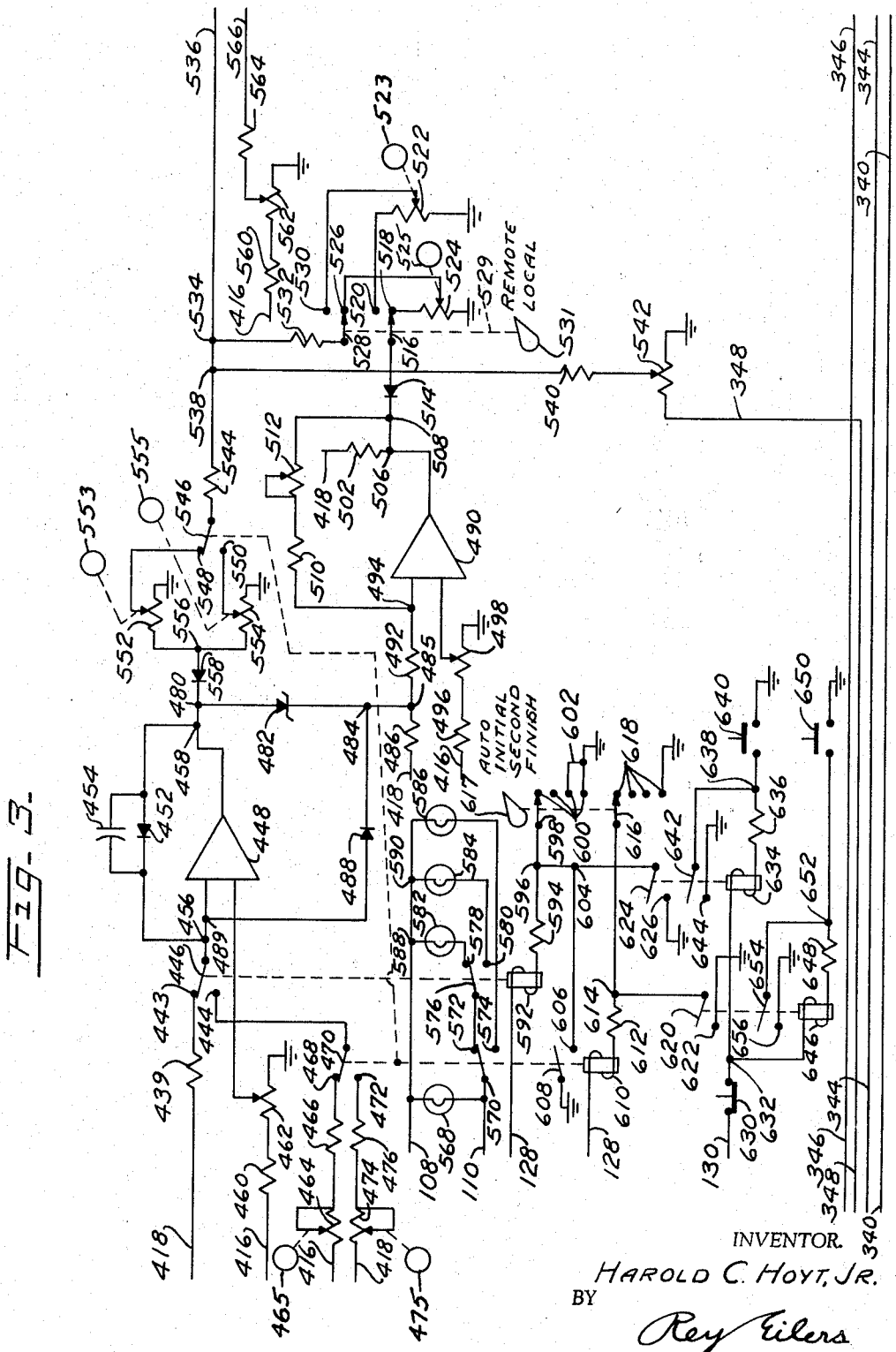

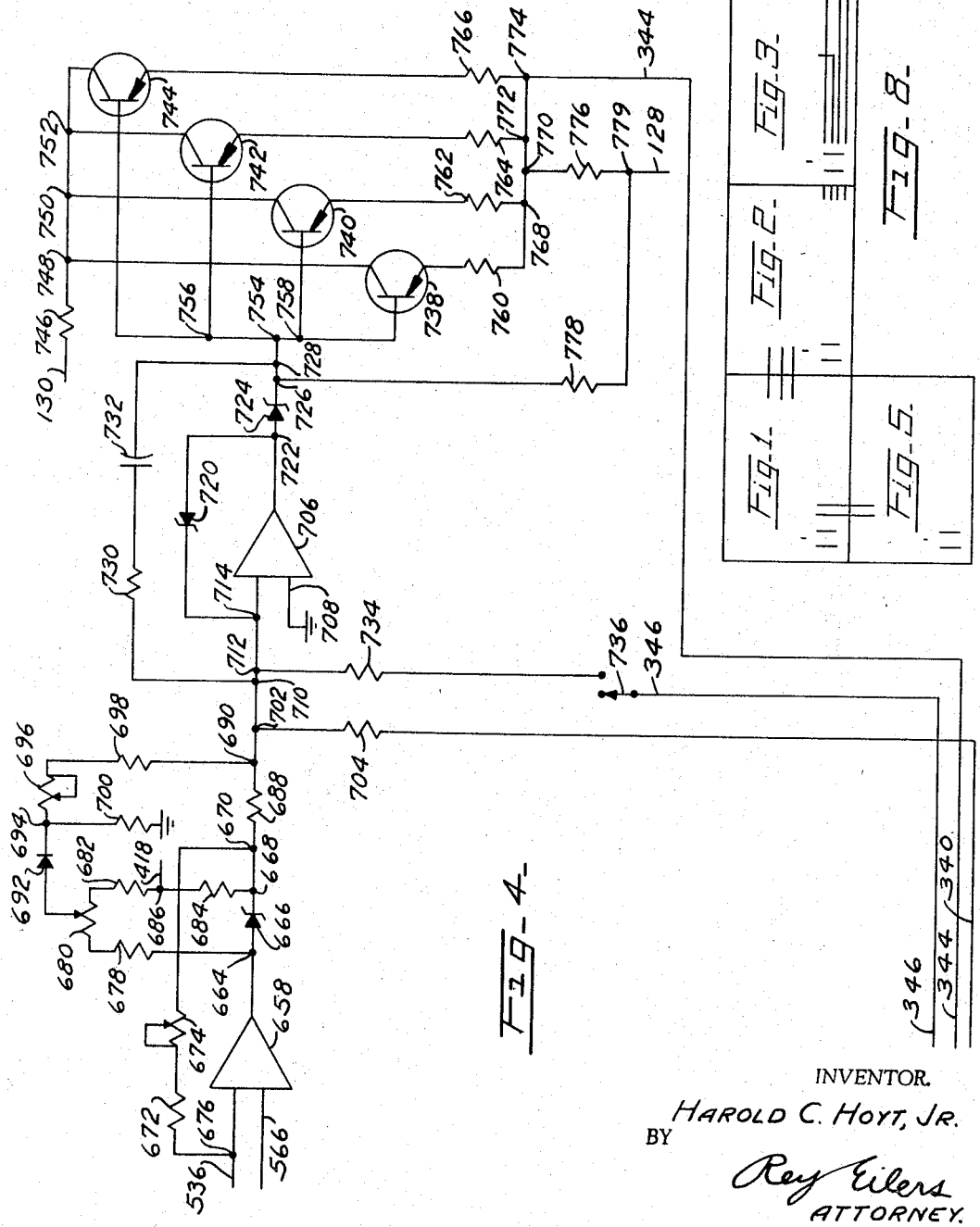

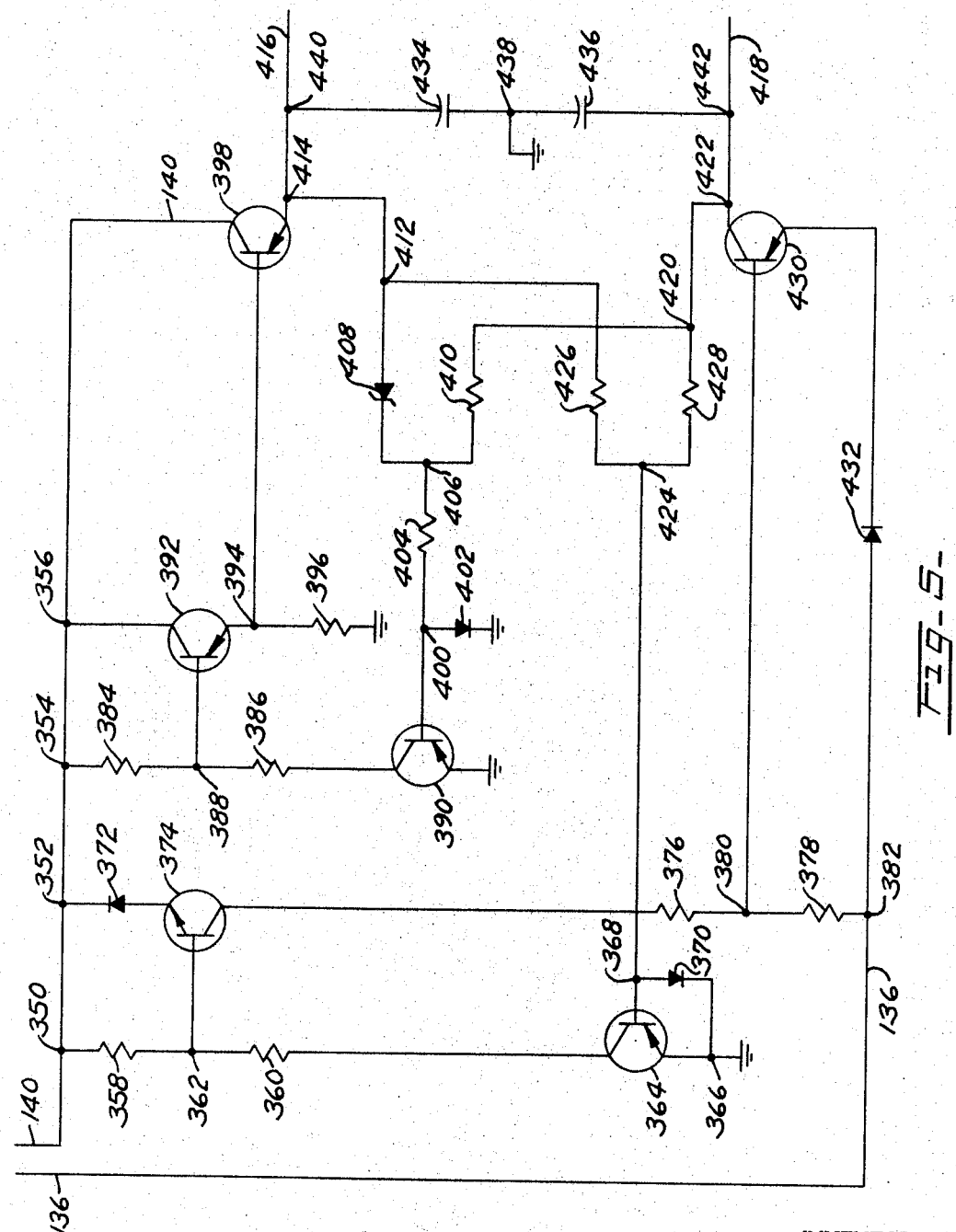

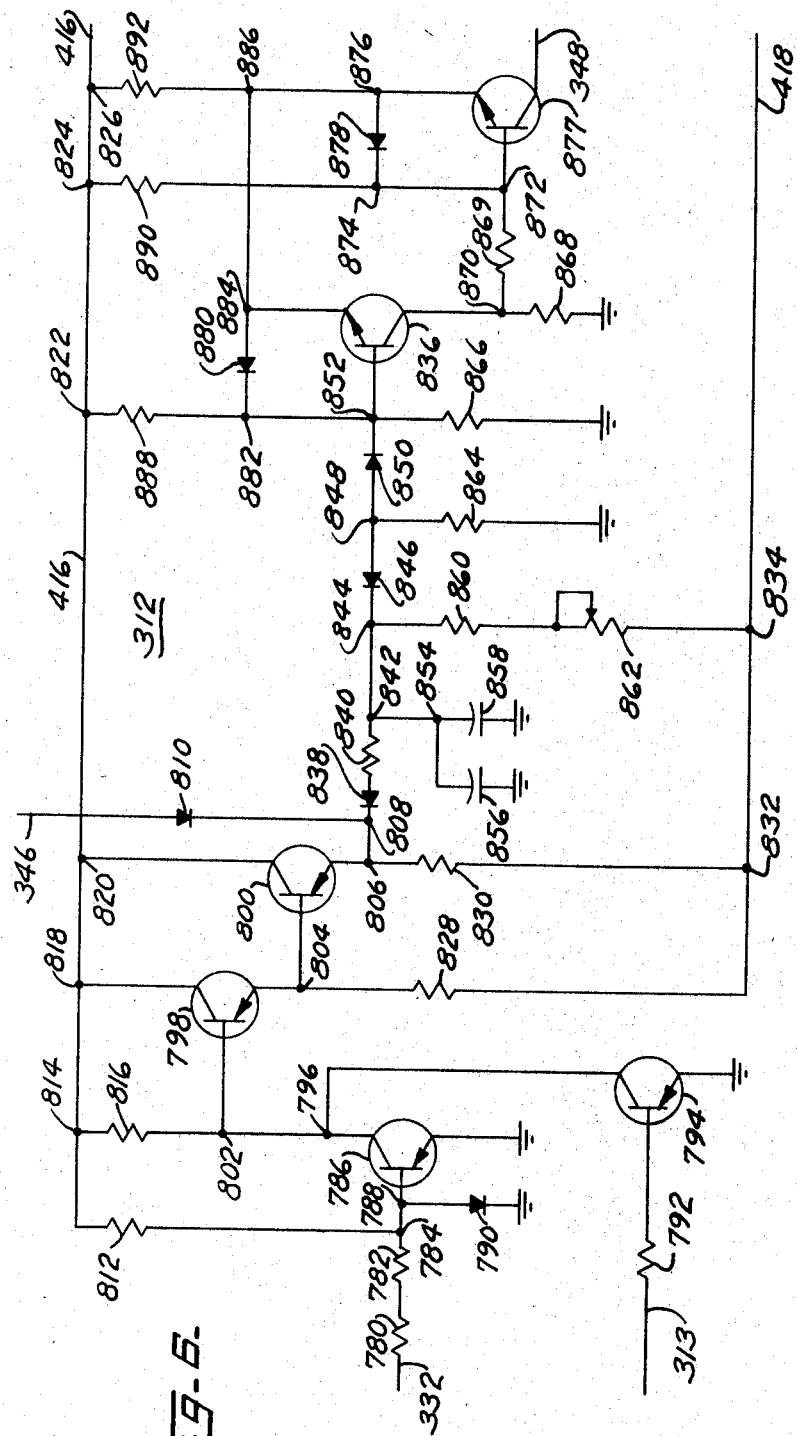

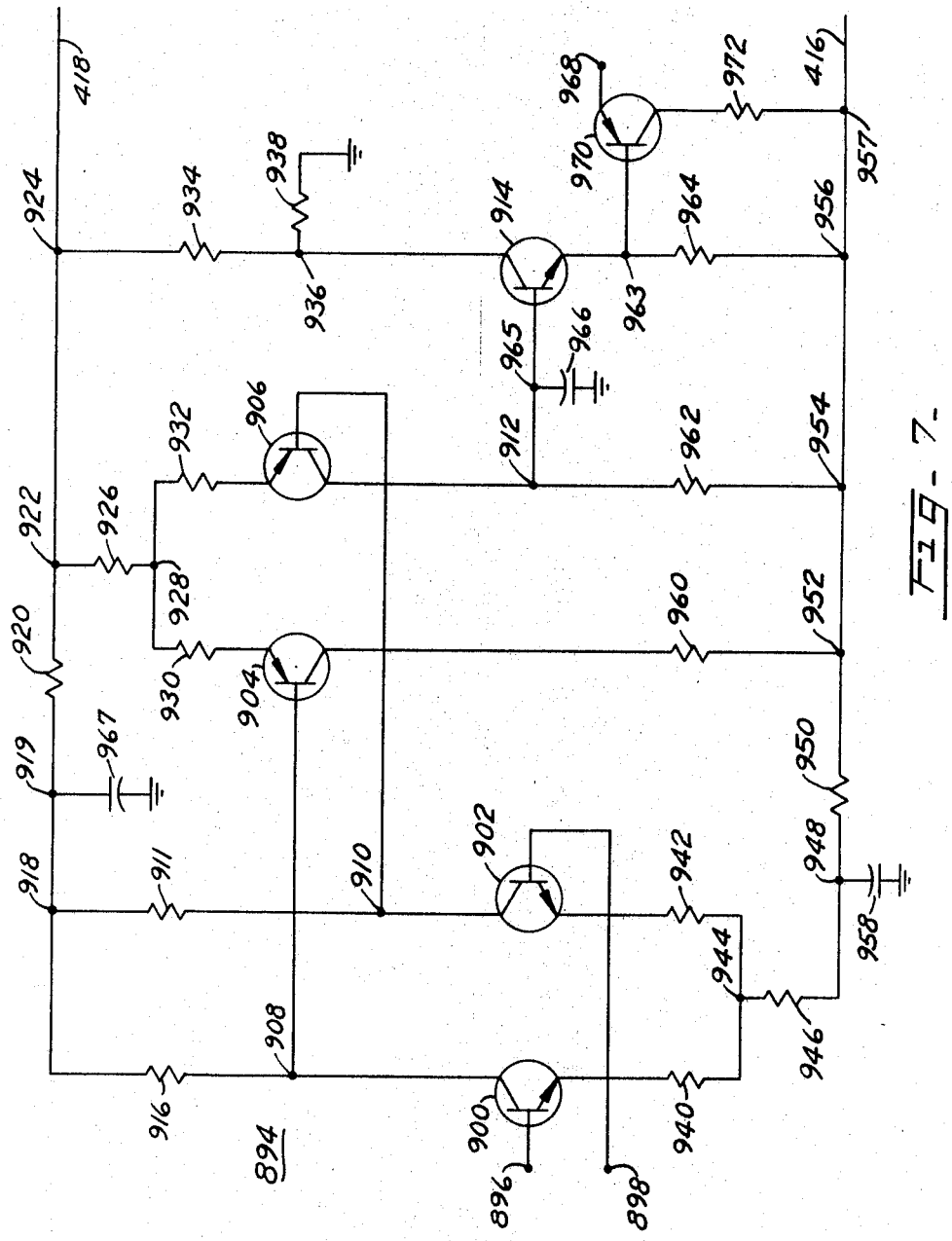

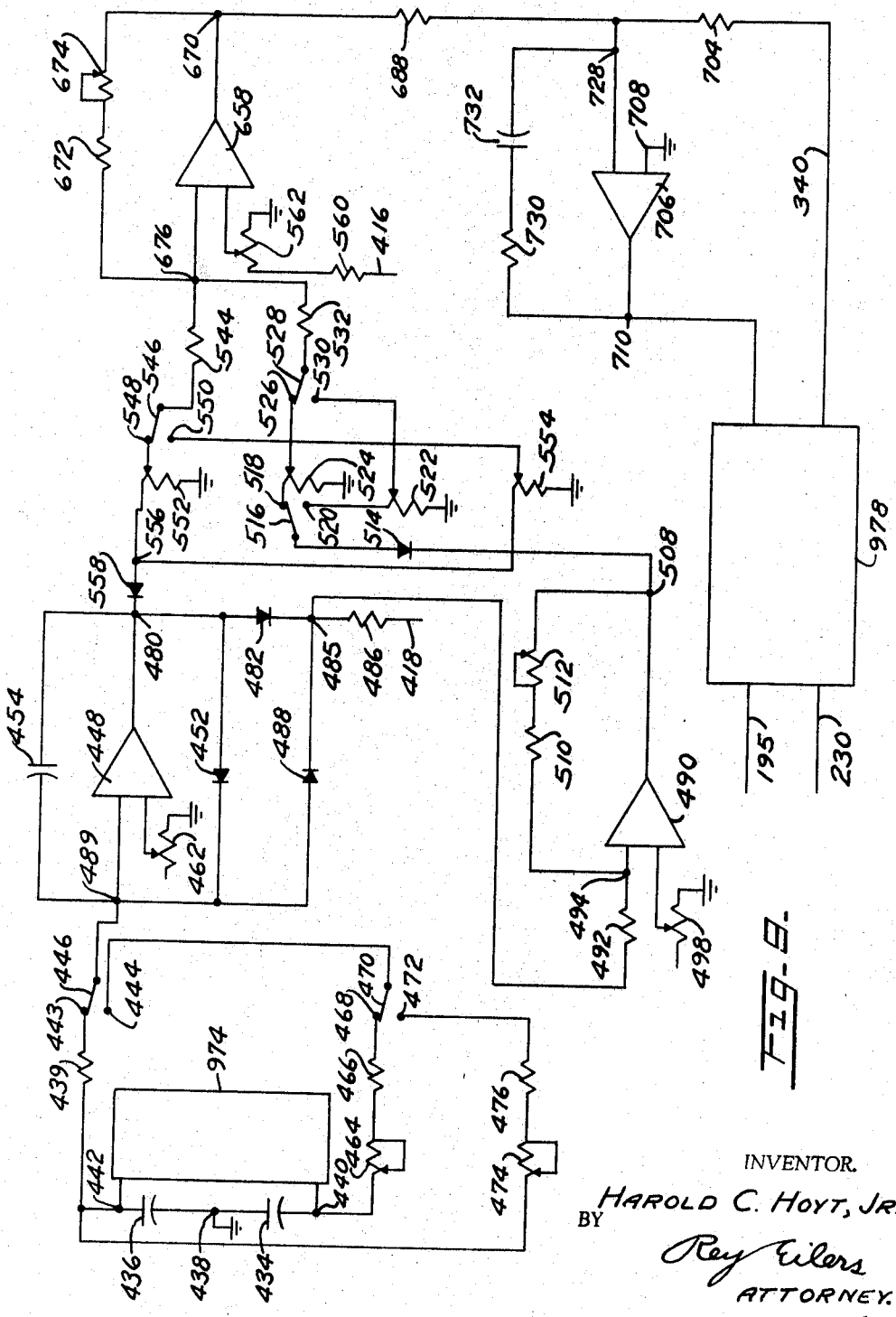

3,321,667
CONTROL SYSTEMS FOR ELECTRIC WELDERS
Harold C. Hoyt, Jr., Overland, Mo., assignor to Sperry Rand Corporation, a corporation of Delaware
Filed June 4, 1962, Ser. No. 199,771
24 Claims. (Cl. 315—284)

This invention relates to improvements in control systems for electric welders.

It is, therefore, an object of the present invention to provide an improved control system for an electric welder.

In performing some welding operations it is desirable to start welding at an initial welding current level, to continue to weld at that initial welding current level for a predetermined period of time, to subsequently change that welding current level to a second welding current level, and then to continue to weld at that second welding current level for a second predetermined period of time. In performing other welding operations it is additionally desirable to change to a third or finish welding current level and to continue to weld at that finish welding current level for a third predetermined period of time. In still other welding operations, it is desirable to cause the initial welding current level to change to the second welding current level during a predetermined length of time, and to cause the second welding current level to change to the finish welding current level during a second predetermined length of time. This means that in those still other welding operations, it is desirable to control five factors, namely, three welding current levels and two lengths of time during which those welding current levels are changed. In recognition of this fact, programming devices have been proposed which could be used with electric welders to "program" an initial current level, a second current level, a third or finish current level, the time required to change from the initial welding current level to the second welding current level, and the time required to change from the second welding current level to the finish welding current level. In using those programming devices, the operators could directly predetermine and control some of the hereinbefore-mentioned five factors but could not directly predetermine and control all of those five factors. For example, those operators could directly predetermine and control the initial welding current level and the slope rate and slope time of the change from the initial welding current level to the second welding current level but could not directly predetermine and control the second welding current level. Similarly, in using those programming devices, the operators could directly predetermine and control the slope rate and slope time of the change from the second welding current level to the finish welding current level but could not directly predetermine and control that finish welding current level. As a result, the operators using those programming devices had to be highly skilled and had to be capable of making rather complex calculations. Furthermore, the operators using those programming devices were seldom able to precisely reproduce, in successive welding operations, the programmed second welding current level and the finish welding current level. It would be desirable to provide a programming device for an electric welder which would enable the operator using that programming device to directly predetermine and control the initial welding current level, the second welding current level, the finish welding current level, the time required to change from the initial welding current level to the second welding current level, and the time required to change from the second current level to the finish current level. The present invention provides such a programming device; and it is, therefore, an object of the present invention to provide a programming device for an electric welder which enables the operator using that programming device to directly predetermine and control the initial welding current level, the second welding current level, the finish welding current level, the time required to change from the initial welding current level to the second welding current level, and the time required to change from the second current level to the finish current level.

The programming device provided by the present invention can enable the operator thereof to predetermine and control the initial welding current level, the second welding current level, the finish welding current level, the time required to change from the initial welding current level to the second welding current level, and the time required to change from the second welding current level to the finish welding current level because it has separate, independent and normally non-interacting controls for the initial welding current level, for the second welding current level, and for the finish welding current level. Further, that programming device has separate, independent and normally non-interacting controls for the time required to change from the initial welding current level to the second welding current level and for the time required to change from the second welding current level to the finish welding current level. It is, therefore, an object of the present invention to provide a programming device with independent and normally non-interacting controls for the initial welding current level, for the second welding current level, for the finish welding current level, for the time required to change from the initial welding current level to the second welding current level, and for the time required to change from the second welding current level to the finish welding current level.

The control for the initial welding current level, the control for the second welding current level, and the control for the finish welding current level are, in the preferred embodiment of the present invention, equipped with direct-reading current dials. Those dials are calibrated in one ampere divisions from zero to maximum welding current level; and those dials can be set by the operator of the programming device to cause the electric welder to supply any desired initial, second and finish welding current levels from zero to maximum welding current level. It is, therefore, an object of the present invention to provide a programming device for an electric welder with direct-reading current dials that are calibrated in one ampere divisions from zero to maximum welding current level.

The control for the time required to change from the initial welding current level to the second welding current level and the control for the time required to change from the second welding current level to the finish welding current level are, in the preferred embodiment of the present invention, equipped with precision time dials. Those dials provide direct readings, to hundredths of a second, of the length of time required to change from the initial welding current level to the second welding current level and of the length of time required to change from the second welding current level to the finish welding current level. Those dials can be set by the operator of the programming device to cause the electric welder to change from the initial welding current level to the second welding current level within a precisely predetermined length of time and to change from the second welding current level to the finish welding current level within a second precisely predetermined length of time.

It would be desirable for the initial welding current level to change to the second welding current level at a linear rate, and it would be desirable for the second welding current level to change to the finish welding current level at a linear rate. The programming device provided by the present invention makes it possible for the initial welding current level to change to the second welding current level at a linear rate and also makes it possible for the second welding current level to change to the finish welding current level at a linear rate and it is, therefore, an object of the present invention to provide a programming device that makes it possible for the initial welding current level to change to the second welding current level at a linear rate and also makes it possible for the second welding current level to change to the finish welding current level at a linear rate.

The electric welder, with which the programming device of the present invention is used, utilizes a variable impedance element to control the level of the welding current supplied to the electrode and work piece; and it varies the impedance of that element in accordance with pre-set reference voltages provided by the programming device. One of those reference voltages enables the variable impedance element to determine and control the initial welding current level. Another of those reference voltages enables the variable impedance element to determine and control the second welding current level. A third of those reference voltages enables the variable impedance element to determine and control the finish welding current level. By appropriately pre-setting those three reference voltages, it is possible to pre-set the desired initial, second and finish welding current levels. It is, therefore, an object of the present invention to provide an electric welder which uses a variable impedance element to control the level of the welding current, and to provide a programming device which varies the impedance of that variable impedance element in accordance with pre-set reference voltages provided by the programming device.

The pre-set reference voltages which the programming device provides, for the variable impedance element in the electric welder of the present invention, can be precisely fixed. Further, those pre-set reference voltages can remain precisely fixed throughout successive welding operations. This means that those reference voltages make it possible for the variable impedance element in the electric welder of the present invention to precisely fix the levels of the welding current and to hold those levels fixed throughout successive welding operations. As a result, the programming device provided by the present invention enables the electric welder to repeatedly perform programmed welding operations with accuracies in the range of plus or minus one percent. It is, therefore, an object of the present invention to provide a programming device that supplies precisely-fixed reference voltages and that can hold those voltages precisely fixed throughout successive welding operations.

The pre-set reference voltages provided by the programming device are independent and are normally non-interacting. This means that whenever the variable impedance element of the electric welder is operating in accordance with one of those reference voltages, the other of those reference voltages can be varied and changed as desired. This means that if the operator of the electric welder provided by the present invention is welding at the initial welding current level and ascertains that the programmed second welding current level is not optimum, he can pre-set the optimum second welding current level while he is still welding at the initial welding current level and he can do so without changing that initial welding current level at all. Similarly, if the operator of the electric welder provided by the present invention is welding at the second welding current level and ascertains that the programmed finish welding current level is not optimum, he can pre-set the optimum finish welding current level, and he can do so without changing that second welding current level at all. This arrangement makes the operation of the electric welder provided by the present invention extremely flexible. It is, therefore, an object of the present invention to provide a programming device for an electric welder which enables the operator of that electric welder to pre-set other welding current levels while welding at a given welding current level without changing that given welding current level.

The independent and normally non-interacting reference voltages provided by the programming device of the present invention are caused to interact whenever the initial welding current level is to be changed to the second welding current level and whenever the second welding current level is to be changed to the finish welding current level. Specifically, the reference voltage that enables the variable impedance element of the electric welder to establish the initial welding current level and the reference voltage that enables the variable impedance element of the electric welder to establish the second welding current level will interact whenever the initial welding current level is to be changed to the second welding current level, and the reference voltage that enables the variable impedance element of the electric welder to establish the second welding current level and the reference voltage that enables the variable impedance element of the electric welder to establish the finish welding current level will interact whenever the second welding current level is to be changed to the finish welding current level. As those reference voltages interact, when the electric welder has been supplying the initial welding current, the reference voltage that enables the variable impedance element of the electric welder to establish the initial welding current level will progressively have less effect upon that variable impedance element and the reference voltage that enables the variable impedance element of the electric welder to establish the second welding current level will progressively have more effect upon that variable impedance element. At the end of a predetermined length of time, the reference voltage that enables the variable impedance element of the electric welder to establish the initial welding current level will have no effect upon that variable impedance element and the reference voltage that enables the variable impedance element of the electric welder to establish the second welding current level will be controlling that variable impedance element. As those reference voltages, interact, when the electric welder has been supplying the second welding current, the reference voltage that enables the variable impedance element of the electric welder to establish the second welding current level will progressively have less effect upon that variable impedance element and the reference voltage that enables the variable impedance element of the electric welder to establish the finish welding current level will progressively have more effect upon that variable impedance element. At the end of a second predetermined length of time, the reference voltage that enables the variable impedance element of the electric welder to establish the second welding current level will have no effect upon that variable impedance element and the reference voltage that enables the variable impedance element of the electric welder to establish the finish welding current level will be controlling that variable impedance element. The transition of control from any one of the reference voltages to another of those reference voltages will be smooth and will enable the slope of the changing welding current to be linear. It is, therefore, an object of the present invention to cause the independent and normally non-interacting reference voltages provided by the programming device to interact, whenever the welding current level is to be changed, to provide a linear rate of change of the welding current.

In the operation of an electric welder, it is customary to employ an ignition circuit to help initiate the arc. Such a circuit temporarily increases the output of the electric welder, and thereby facilitates the establishment of the arc; but, unfortunately, the magnitude of the increased output is frequently so large that craters and holes are formed in the workpieces. It would be desirable to provide an ignition circuit for an electric welder that could provide an adjustable, controlled, temporarily-increased output for that electric welder; because such an output could facilitate establishment of an arc without the formation of craters or holes in the workpiece. The present invention provides such an ignition circuit; and it is, therefore, an object of the present invention to provide an ignition circuit for an electric welder that can provide an adjustable, controlled, temporarily-increased output for that electric welder.

The ignition circuits that are customarily used with electric welders are intended to become inactive, once the arcs have been established for those electric welders; and those ignition circuits are intended to remain inactive until those arcs subsequently become extinguished. Unfortunately those ignition circuits tend, whenever the initial welding current levels are quite low, to again become active after the arcs have been established and as the initial welding currents drop to the desired low levels. As those ignition circuits again become active, the outputs of the electric welders temporarily increase again; and, thereafter, those ignition circuits again become inactive and permit the initial welding currents to again fall to the desired low levels—with consequent reactivation of those ignition circuits. The overall result is that the ignition circuits recurrently become active and inactive, with undesired rises and falls in the levels of the initial welding currents. It would be desirable to provide an ignition circuit that would become inactive after it helped establish an arc and that would not again become active as long as that arc continued—even if the initial welding current level was very low. Such an ignition circuit would make it possible to provide carefully controlled welding at low initial welding current levels. The present invention provides such an ignition circuit; and it is, therefore, an object of the present invention to provide an ignition circuit that will become inactive after it helps establish an arc for an electric welder and that will not again become active as long as that arc continues, even if the initial welding current level is very low.

To enable the ignition circuit provided by the present invention to become active and help establish the arc, that ignition circuit is provided with an "or" gate; and to enable that ignition circuit to remain inactive, after it has helped establish that arc and as long as that arc continues, that ignition circuit is provided with an "and" gate. The "or" gate will respond either to an increase in the current flowing through the output circuit of the electric welder or to a decrease in the voltage across that output circuit to become active; and this is desirable because either an increase in the current flowing through the output circuit of the electric welder or a decrease in the voltage across that output circuit will indicate that an arc is being initiated. This means that as soon as an arc is initiated, the ignition circuit will become active and will cause the electric welder to provide the increased output that is needed to establish that arc. The "and" gate, on the other hand, will respond only to the combination of a substantial decrease in the current flowing through the output circuit of the electric welder and to a substantial increase in the voltage across that output circuit; and this is desirable because, while the current flowing through the output circuit of the electric welder could rise substantially while the arc was being maintained and while the voltage across that output circuit could rise substantially while the arc was being maintained, the combination of a substantial decrease in the current flowing through the output circuit of the electric welder and of a substantial increase in the voltage across that output circuit will usually occur only when the arc becomes extinguished. The overall result is that the "or" gate and the "and" gate enable the ignition circuit to become active as soon as an arc is being initiated and enable that ignition circuit to subsequently remain inactive as long as that arc is continued. It is, therefore, an object of the present invention to provide an ignition circuit which has an "or" gate to enable that ignition circuit to become active and which has an "and" gate to enable that ignition circuit to subsequently remain inactive.

It is customary to use current transformers to provide signals that are proportional to changes in the currents flowing through output circuits. However, in some instances, the signals provided by those current transformers are not truly proportional to the currents flowing through output circuits. For example, where current transformers are used to provide signals that are proportional to the currents flowing through the output circuits of magnetic amplifiers, the signals provided by those current transformers may not be truly proportional to the currents flowing through those output circuits; because D.C. circulating currents can flow through the discharge rectifiers, that are customarily used in those output circuits, and will not affect the primary windings of those current transformers. Those D.C. circulating currents will increase the total values of the currents flowing through the output circuits of the magnetic amplifiers; but, since those D.C. circulating currents will not affect the primary windings of the current transformers, those current transformers will not be able to provide signals that are truly proportional to the currents flowing through the output circuits of the magnetic amplifiers. It would be desirable to provide a circuit that could supply a signal which was truly proportional to the total current flowing through the output circuit of a magnetic amplifier. The present invention provides such a circuit; and that circuit obtains a sub-signal proportional to the D.C. circulating currents in the output circuit of the magnetic amplifier and adds that sub-signal to the sub-signals obtained from the current transformers to develop an overall signal which is truly proportional to the total current flowing through the output circuit of the magnetic amplifier. It is, therefore, an object of the present invention to provide a circuit that obtains a sub-signal proportional to the D.C. circulating currents in the output circuit of a magnetic amplifier and adds that sub-signal to the sub-signals obtained from the current transformers to develop an overall signal which is truly proportional to the total current flowing through the output circuit of that magnetic amplifier.

The programming device provided by the present invention utilizes a closely regulated positive voltage and a closely regulated negative voltage; and it would be desirable to provide a voltage regulator which could provide those voltages but which was inexpensive and effective. The present invention provides such a voltage regulator; and that voltage regulator uses just one reference to enable it to regulate both the said positive and negative voltages. It is, therefore, an object of the present invention to provide a voltage regulator that uses just one reference to regulate a positive voltage and a negative voltage.

The programming device provided by the present invention has a remote control which can be held in the hand of the operator of the electric welder and which can be used to cause that electric welder to start supplying the initial welding current, can be used to cause that electric welder to change the initial welding current level to the second welding current level, can be used to cause the electric welder to change the second welding current level to the finish welding current level, can be used to cause that electric welder to supply different levels of second welding current, and can be used to cause that electric welder to terminate the welding operation. That remote control enables the operator to stand immediately adjacent the workpiece and provide the required changes in the welding current at the exact moments those changes are required. It is, therefore, an object of the present invention to provide a programming device, for an electric welder, with a remote control which can be held in the hand of the operator of the electric welder and which can be used to cause that electric welder to start supplying the initial welding current, can be used to cause that electric welder to change the initial welding current level to the second welding current level, can be used to cause that electric welder to change the second welding current level to the finish welding current level, can be used to cause that electric welder to supply different levels of second welding current, and can be used to cause that electric welder to terminate the welding operation.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1 is a schematic diagram of one part of the circuit of one embodiment of electric welder and programming device that is made in accordance with the principles and teachings of the present invention, and it shows the power transformer of that circuit, FIG. 2 is a schematic diagram of another part of the circuit of the electric welder and programming device provided by the present invention, and it shows the magnetic amplifiers used in that circuit, FIG. 3 is a schematic diagram of another part of the circuit of the electric welder and programming device provided by the present invention, and it shows the sub-circuits which develop the reference voltages used in controlling the magnetic amplifiers of FIG. 2, FIG. 4 is a schematic diagram of another part of the circuit of the electric welder and programming device provided by the present invention, and it shows the manner in which the summing amplifier and the preamplifier of that circuit are connected, FIG. 5 is a schematic diagram of a voltage regulator which is used in the circuit of the electric welder and programming device provided by the present invention, FIG. 6 is a schematic diagram of an ignition circuit which is used in the circuit of the electric welder and programming device provided by the present invention, FIG. 7 shows an amplifier which can be used as the integrating operational amplifier, as the inverting operational amplifier, as the summing amplifier, and as the preamplifier in the circuit of the electric welder and programming device of the present invention, FIG. 8 is a diagram showing how the parts of the circuit shown by FIGS. 1–5 are interrelated, and FIG. 9 is a simplified diagram of the circuit shown by FIGS. 1–5.

Referring to the drawing in detail, the numerals 20, 22 and 24 denote conductors which can be connected, by contacts not shown, to a suitable source of three phase alternating voltage; as for example, a source of three phase, sixty cycle, four hundred and sixty volts or a source of three phase, sixty cycle, two hundred and thirty volts. The primary winding 26 of a transformer 28 has two sections; and the adjacent ends of those sections will be interconnected by a connector 30, while the other ends of those sections will be connected to the conductors 20 and 22, whenever the conductors 20, 22 and 24 are connected to a source of four hundred and sixty volts. Where the conductors 20, 22 and 24 are to be connected to a source of two hundred and thirty volts, the connector 30 will be removed and the two sections of the primary winding 26 will be connected in parallel across the conductors 20 and 22.

The transformer 28 has a secondary winding 32; and a junction 34 connects one terminal of that secondary winding to one terminal of a blower motor 40. A blower 42 is driven by the output shaft of that motor, and that blower will provide a cooling effect for the power transformer 92 of the electric welder. That power transformer is indicated by a dotted enclosure in FIG. 1. Junctions 36 and 38 connect the other terminal of the secondary winding 32 to the other terminal of the blower motor 40.

It will be noted that the primary winding 26 is directly connected to the conductors 20 and 22 and that the blower motor 40 is directly connected to the secondary winding 32; and hence whenever the conductors 20, 22 and 24 are connected to a source of three phase, sixty cycle alternating voltage, the blower motor 40 will be energized.

The numeral 44 denotes a relay coil which is disposed to the right of the secondary winding 32, and the upper terminal of that coil is connected to that secondary winding by the junction 36. The lower terminal of that relay coil is connectable to the other terminal of that secondary winding by a junction 46, a junction 48, a normally-open push button 50, a junction 52, fixed and movable switch contacts 54 and 58, normally-closed push button 60, normally-closed thermostatic switch 62, and junction 34. The lower terminal of the relay coil 44 also is connectable to the left-hand terminal of the secondary winding 32 by junction 46, junction 48, junction 80, movable and stationary switch contacts 78 and 74, normally-open push button 72, junction 70, stationary and movable switch contacts 56 and 58, normally-closed push button 60, thermostatic switch 62 and junction 34. However, before the lower terminal of the relay coil 44 can be connected to the left-hand terminal of the secondary winding 32 by closure of the push button 72, the movable switch contacts 58 and 78 have to be shifted to their upper positions.

A holding circuit for the relay coil 44 extends from junction 46 via normally-open relay contacts 64, junction 66, junction 52, stationary and movable contacts 54 and 58, push button 60, thermostatic switch 62, and junction 34 to the secondary winding 32. A second holding circuit for the relay coil 44 extends from junction 46 via normally-open relay contacts 64, junction 66, normally-closed push button 68, junction 70, stationary and movable switch contacts 56 and 58, push button 60, thermostatic switch 62, and junction 34 to the secondary winding 32. The latter holding circuit is used whenever the movable contacts 58 and 78 have been shifted to their upper positions.

The push buttons 72 and 68 are preferably mounted in a small, remote control which can easily be held in the hand of the operator of the electric welder and programming device provided by the present invention. Also mounted within that remote control is a lamp 82; and one terminal of that lamp is connected to the junction 38 while the other terminal of that lamp is connected to the junction 80. That lamp will be illuminated, whenever the push button 50 is closed, by a circuit which extends from secondary winding 32 via junctions 36 and 38, lamp 82, junctions 80 and 48, push button 50, junction 52, contacts 54 and 58, push button 60, switch 62, and junction 34. That lamp will thereafter be kept illuminated by a circuit which extends from secondary winding 32 via junctions 36 and 38, lamp 82, junctions 80, 48 and 46, relay contacts 64, junctions 66 and 52, contacts 54 and 58, push button 60, switch 62, and junction 34. Where the movable contacts 58 and 78 have been shifted to their upper positions, the lamp 82 will be illuminated, whenever the push button 72 is closed, by a circuit which extends from secondary winding 32 via junctions 36 and 38, lamp 82, junction 80, contacts 78 and 74, push button 72, junction 70, contacts 56 and 58, push button 60, switch 62, and junction 34. That lamp will thereafter be kept illuminated by a circuit which extends from secondary winding 32 via junctions 36 and 38, lamp 82, junctions 80, 48 and 46, relay contacts 64, junction 66, push button 68, junction 70, contacts 56 and 58, push button 60, switch 62, and junction 34.

The overall result is that the lamp 82 will be illuminated whenever the relay coil 44 is energized. That relay coil can be de-energized, and the lamp 82 permitted to become dark, by pressing of the push button 60 whenever the movable contacts 58 and 78 are in their lower positions and by pressing of the push button 68 whenever the movable contacts 58 and 78 are in their upper positions.

The conductors which extend between the remote control and the housing for the electric welder and programming device will be elongated and flexible. As a result that remote control can easily be carried in one hand of the operator of that electric welder and programming device as he stands immediately adjacent and moves relative to the workpiece that is being welded.

The right-hand terminal of lamp 82 and the junction 38 are connected to a common return within the electric welder and the programming device; and that common return is denoted by the usual symbol for "ground." However, that common return will not be grounded to the chassis of the electric welder or to the chassis of the programming device. That common return also will be a voltage reference point with a voltage of substantially zero.

The numeral 84 denotes normally-open relay contacts in the conductor 20, the numeral 86 denotes normally-open relay contacts in the conductor 22, and the numeral 88 denotes normally-open contacts in the conductor 24. Those normally-open relay contacts normally isolate the primary winding 90 of the power transformer 92 from the source of three phase alternating voltage to which the conductors 20, 22 and 24 can be connected. This means that even when the conductors 20, 22 and 24 are connected to the said source of three phase alternating voltage, current will not flow to the primary winding 90 until after the relay coil 44 has been energized to cause the relay contacts 84, 86 and 88 to close.

The primary winding 90 is connected as a wye; and each of the legs of that wye has two sections. The adjacent terminals of the two sections of each leg are shown interconnected by connectors, so that the two sections of each leg are connected in series. This is done whenever the power transformer 92 is to be connected to a source of three phase, sixty cycle, four hundred and sixty volts. However, where that transformer is to be connected to a source of three phase, sixty cycle, two hundred and thirty volts, the connectors will be removed and the two sections of each leg of the primary winding 90 will be connected in parallel with each other.

The power transformer 92 has a secondary winding 94 which has the sections thereof connected in delta. Three conductors 96, 98 and 100 extend from the terminals of that secondary winding into FIG. 2 to supply three phase sixty cycle alternating current to the magnetic amplifiers 150, 164 and 178.

The power transformer 92 has another secondary winding 102; and that winding serves as a source of single phase, sixty cycle, one hundred and fifteen volts. Junctions 104 and 106, respectively, connect conductors 110 and 108 to the terminals of the secondary winding 102; and those conductors extend into FIG. 3 to supply single phase, sixty cycle one hundred and fifteen volts.

A transformer 114 has a tapped primary winding 112, and the taps of that primary winding make it possible for that transformer to provide a desired voltage across the secondary winding 116 of that transformer. The effective terminals of that tapped primary winding are connected to the terminals of the secondary winding 102 of power transformer 92. A capacitor 120 is connected across the effective terminals of the primary winding 112, and that capacitor will tend to filter out high frequency currents. The secondary winding 116 of the transformer 114 has two sections; and the adjacent terminals of those sections are interconnected by a connector 118. Further, those adjacent terminals are connected to the common return of the circuit, thereby making the secondary winding a center-tapped winding.

The outer terminals of the secondary winding 116 are connected to the input terminals of a bridge rectifier 122. That bridge rectifier will coact with the center-tapped secondary winding 116 to provide full wave rectified alternating current. The output terminals 124 and 126 of that rectifier are, respectively, connected to junctions 132 and 134 by junctions 146 and 148. Capacitors 142 and 144 are connected in series between the junctions 146 and 148; and the confronting terminals of those capacitors are connected to the common return. The capacitors 142 and 144 are provided to filter out A.C. ripple.

The transformer 114 coacts with the full wave bridge rectifier 122 to provide a positive voltage of thirty-two volts at the junction 132 and to provide a negative voltage of thirty-two volts at the junction 134. Conductor 128 and conductor 130 extend into FIGS. 3 and 4 to supply those positive and negative voltages to the parts of the circuit shown in FIGS. 3 and 4. Conductors 136 and 140 extend from the junctions 132 and 134, respectively, into FIG. 5 to supply those positive and negative voltages to the part of the circuit shown in FIG. 5.

The magnetic amplifier 150 in FIG. 2 has output windings 152, has control windings 154, and has control windings 156. A diode 158 has the anode thereof connected to the upper end of one of the output windings 152 and a diode 160 has the cathode thereof connected to the upper end of the other of the output windings 152. The lower ends of the output windings 152 are connected together, and are connected to the conductor 96 which extends from the secondary winding 94 of the power transformer 92 in FIG. 1. A resistor 162 is connected between the upper ends of the output windings 152.

The magnetic amplifier 164 has output windings 166, has control windings 168, and has control windings 170. A diode 172 has the anode thereof connected to the upper end of one of the output windings 166, and a diode 174 has the cathode thereof connected to the upper end of the other of the output windings 166. The lower ends of those output windings are connected together, and are connected to the conductor 98 which extends from the secondary winding 94 of the power transformer 92 in FIG. 1. A resistor 176 is connected between the upper ends of the output windings 166.

The magnetic amplifier 178 has output windings 180, has control windings 182, and has control windings 184. A diode 186 has the anode thereof connected to the upper end of one of the output windings 180, and a diode 188 has the cathode thereof connected to the upper end of the other of the output windings 180. The lower ends of those output windings are connected together, and are connected to the conductor 100 which extends from the secondary winding 94 of the power transformer 92 in FIG. 1. A resistor 190 is connected between the upper ends of the output windings 180.

The cathodes of the diodes 158, 172 and 186 are connected to a conductor 195—the latter two cathodes being connected to that conductor by junctions 192 and 194—and that conductor is connected to one terminal of a shunt 202 for a meter 224 by junctions 196, 198 and 200. Junctions 204 and 206, the primary winding 208 of a rate transformer 210, and junctions 212 and 214 connect the other terminal of the shunt 202 to the movable contact 216 of a single pole, double throw switch that has fixed contacts 218 and 220. The fixed contact 218 is directly connected to the output terminal 222 of the electric welder; and a flexible welding cable, not shown, can be suitably connected to that terminal.

The anodes of the diodes 160, 174 and 188 are connected to a conductor 230—the latter two anodes being connected to that conductor by junctions 226 and 228—and that conductor is connected to the movable contact 244 of a single pole, double throw switch by junctions 234, 236, 238, 240 and 242. The said switch has fixed contacts 246 and 248; and the fixed contact 246 is directly connected to the other output terminal 254 of the electric welder. A flexible welding cable, not shown, can be suitably connected to that output terminal. The conductor 230 is connected to the common return at a point between the junctions 236 and 238.

A jumper 250 extends between the fixed contact 220 and the output terminal 254, and a second jumper 252 extends between the fixed contact 248 and the output terminal 22. The movable contacts 216 and 244 are "ganged" together, and hence will move simultaneously. Whenever those movable contacts are in the upper positions shown by FIG. 2, the output terminal 222 will be positive and the output terminal 254 will be negative. However, when those movable contacts are, respectively, shifted down into engagement with the fixed contacts 220 and 248, the polarities of the output terminals 222 and 254 will be reversed—the output terminal 254 being positive and the output terminal 222 being negative. This selective reversal of polarity is desirable because some welding operations require the welding electrode to be positive relative to the work piece whereas other welding operations require the work piece to be positive relative to the welding electrode.

The magnetic amplifiers 150, 164 and 178 constitute variable impedance elements that can have the impedances thereof varied to enable them to supply different levels of welding current to the output terminals 222 and 254. The use of magnetic amplifiers is desirable because the arcs, that will be established between the welding electrode and the workpiece connected to the output terminals 222 and 254, will tend to act as short circuits; and magnetic amplifiers are better adapted to having their outputs connected to virtual short circuits than are most variable impedance elements. Further, the use of magnetic amplifiers is desirable because magnetic amplifiers are less affected by ambient temperatures than are many variable impedance elements.

The meter 224 is an ammeter and will indicate the value of the direct current flowing to the output terminals 222 and 254. The numeral 241 denotes a volt meter which is connected to the junctions 212 and 240; and that meter will indicate the D.C. voltage across the output terminals 222 and 254.

The numerals 243 and 245 denote, respectively, a resistor and a capacitor which are connected in series between the junctions 206 and 238. That resistor and capacitor serve to filter out high frequency currents that could otherwise adversely affect the operation of the magnetic amplifiers 150, 164 and 178.

The rate transformer 210 has a secondary winding 211 that is connected to the serially-connected control windings 156, 170 and 184, respectively, of the magnetic amplifiers 150, 164 and 178. That rate transformer will coact with those control windings to provide negative feed-back for those magnetic amplifiers. As a result, that rate transformer and those control windings will respond to transient changes in the currents in the output circuit of the electric welder to cause the magnetic amplifiers to change the output currents thereof in such a way as to restore those output currents to their intended levels. In this way, variations in line voltage and variations in the lengths of the arcs are kept from adversely affecting the currents and voltages supplied to the output terminals 222 and 254.

The numeral 256 denotes a diode which has the cathode thereof connected to the junction 196; and that diode has the anode thereof connected to the conductor 230 by junctions 260 and 262, resistor 264 and junction 234 and also by junctions 260 and 262, potentiometer 266, and junction 236. A surge protector 258 is connected between the junctions 198 and 260, and thus in parallel with the diode 256. That surge protector will protect that diode from injury even if voltage surges should develop in the output circuit of the electric welder.

When a magnetic amplifier is operated so it supplies a relatively low level of output current, inductance in the load of that magnetic amplifier can tend to cause the voltage across that load to reverse. A corresponding reversal of voltage at the output of the magnetic amplifier would be objectionable because it could change the firing angle of that magnetic amplifier. In recognition of this fact, it has become customary to connect a diode, referred to as a discharge rectifier, across the output of a magnetic amplifier in such a way as to enable it to bypass any currents flowing in response to the reversed voltage across the load, and thereby keep those currents from affecting the firing angle of that magnetic amplifier. The diode 256 acts as a discharge rectifier for the magnetic amplifiers 150, 164 and 178.

The numeral 270 denotes the primary windings of a current transformer 272; and those primary windings are connected intermediate the diodes 158 and 160 and the upper terminals of the output windings 152 of the magnetic amplifier 150. The secondary winding 274 of that transformer is connected to the input terminals of a full wave bridge rectifier 276. The output terminals of that rectifier are denoted by the numerals 278 and 280.

The numeral 282 denotes the primary windings of a current transformer 284, and those primary windings are connected intermediate the diodes 172 and 174 and the upper terminals of the output windings 166 of the magnetic amplifier 164. The secondary winding 286 of the transformer 284 is connected to the input terminals of a full wave bridge rectifier 288. The output terminals of that bridge rectifier are denoted by the numerals 290 and 292.

The numeral 294 denotes the primary windings of a current transformer 296, and those windings are connected intermediate the diodes 186 and 188 and the upper terminals of the output windings 180 of the magnetic amplifier 178. The secondary winding 298 of that transformer is connected to the input terminals of a full wave bridge rectifier 300. The output terminals of that rectifier are denoted by the numerals 302 and 304.

The current transformers 272, 284 and 296 are able to respond to the currents flowing through the primary windings 270, 282 and 294 thereof, during each half-cycle of each of the three phases of the A.C., to supply currents to the input terminals of the bridge rectifiers 276, 288 and 300 which are substantially independent of the load connected across the output terminals of those bridge rectifiers. Those bridge rectifiers will rectify those currents and thus provide direct currents which are proportional to the output currents of the magnetic amplifiers 150, 164 and 178. The current transformers 272, 284 and 296 will preferably have just one turn in each of the primary windings 270, 282 and 294 thereof and will preferably have many turns in the secondary windings 274, 286 and 298 thereof. As a result those current transformers will supply low level currents, which are proportional to the output currents of the magnetic amplifiers 150, 164 and 178, to the bridge rectifiers 276, 288 and 300.

The output terminals 278, 290 and 302 of the bridge rectifiers are connected to a conductor 306 which has the upper end thereof connected to the movable contact of the potentiometer 266 and which has the lower end thereof connected to the slider and to one end of an adjustable resistor 322 by junctions 314 and 320. The output terminals 280, 292 and 304 of the bridge rectifiers are connected to a conductor 308, and that conductor is connected to a junction 309 by junctions 316 and 330. A capacitor 318 is connected between the conductors 306 and 308 by the junctions 314 and 316; and that capacitor will filter out high frequency currents. A resistor 324, a resistor 326 and a resistor 328 are connected in series between the right-hand terminal of the adjustable resistor 322 and the junction 330. Those resistors coact with the adjustable resistor 322 to constitute the load for the bridge rectifiers 276, 288 and 300; and they respond to the direct currents from the output terminals of those bridge rectifiers to provide a difference of potential between the conductors 306 and 308. Because the current transformers 272, 284 and 296 coact with the bridge rectifiers 276, 288 and 300 to provide direct currents that are proportional to the output currents of the magnetic amplifiers 150, 164 and 178, the difference of potential which the resistors 324, 326 and 328 and the adjustable resistor 322 provide between the conductors 306 and 308 also will be proportional to the output currents of the magnetic amplifiers 150, 164 and 178. In one preferred embodiment of the present invention, the values of the current transformers 272, 284 and 296, of the bridge rectifiers 276, 288 and 300, of the adjustable resistor 322, and of the resistors 324, 326 and 328 were selected so that whenever the magnetic amplifiers 150, 164 and 178 were supplying one hundred amperes of current, a potential difference of four volts was developed between the conductors 306 and 308.

While the difference of potential which the resistors 324, 326 and 328 and the adjustable resistor 322 provide between the conductors 306 and 308 will be proportional to the output currents of the magnetic amplifiers 150, 164 and 178, that difference of potential may not, because of current flow through the diode 256, be proportional to the total current flowing through the arc between the electrode and the workpiece connected to the output terminals 222 and 254. Specifically, at low current levels, the inductance of the load will tend to cause current to flow through the conductors 195 and 230. The diode 256 will bypass that flow of current, and thereby keep that flow of current from affecting the firing angles of the magnetic amplifiers 150, 164 and 178, but that diode can not keep that current from flowing. As a result, D.C. circulating currents will flow through the diode 256 and through the said arc; and those D.C. circulating currents will increase the total amount of current flowing through the said arc, but will not affect the amount of current flowing through the primary windings 270, 282 and 294 of the current transformers 272, 284 and 296. This means that those current transformers, the bridge rectifiers 276, 288 and 300, and the resistors 322, 324, 326 and 328 can not, by themselves, provide a voltage which is proportional to the total amount of current flowing through the said arc.

It will be noted that the D.C. circulating currents which flow through the diode 256 also flow through the parallel-connected resistor 264 and potentiometer 266. It will also be noted that the movable contact of the potentiometer is connected to the conductor 306. This means that the flow of D.C. circulating currents through the diode 256 will cause a D.C. voltage to be developed across the upper portion of the potentiometer 266, and that the said D.C. voltage will be added to the voltage which appears across the serially-connected resistors 322, 324, 326 and 328. The values of the resistor 264 and of the potentiometer 266 will preferably be selected so the ratio of current flowing through the diode 256 to the voltage across the upper end of the potentiometer 266 will be the same as the ratio of the currents flowing through the output windings of the magnetic amplifiers 150, 164 and 178 to the voltage across the serially-connected resistors 322, 324, 326 and 328. The slider of the adjustable resistor 322 can be set to provide a desirable ratio of the currents flowing through the output windings of the magnetic amplifiers 150, 164 and 178 to the voltage across the serially-connected resistors 322, 324, 326 and 328, and then the movable contact of the potentiometer 266 can be set to provide a comparable ratio for the current flowing through the diode 256 to the voltage across the upper end of that potentiometer. In this way, the current transformers 272, 284 and 296, the bridge rectifiers 276, 288 and 300, and the serially-connected resistors 322, 324, 326 and 328 can coact with the diode 256, the resistor 264 and the potentiometer 266 to apply a voltage to the junction 309 which is truly proportional to the total amount of current flowing through the arc between the electrode and workpiece connected to the output terminals 222 and 254. That junction is connected to the input of a pre-amplifier 706 in FIG. 4 by a conductor 340 which extends into and through FIG. 3 and extends into FIG. 4, and by a resistor 704 and junctions 702, 710, 712 and 714 in FIG. 4; and that conductor, that resistor and those junctions will apply the said voltage to one input of that pre-amplifier.

The numeral 312 in FIG. 2 generally denotes an ignition circuit for the electric welder; and the details of that ignition circuit are shown in FIG. 6. A resistor 310, a junction 311, and a conductor 313 connect the junction 309 to one of the inputs of that ignition circuit. A conductor 332 extends from the junction 214 in the upper right-hand portion of FIG. 2 to the other input of the ignition circuit 312. A conductor 334 is connected to the junction 242 and extends to the common return of the circuit of the electric welder and programming device. A capacitor 336 is connected between the conductors 332 and 334, and will tend to filter out any high frequency currents.

A resistor 338 has the upper end thereof connected to the junction 311 and has the lower end thereof connected to a conductor 418. That conductor will extend to the positive terminal 442 of a voltage regulator shown in FIG. 5. That voltage regulator will provide a precisely-regulated, positive voltage of twenty-eight volts at the terminal 442; and the conductor 418 will apply that voltage to the lower terminal of the resistor 338.

The numeral 342 denotes a choke which is connected to the serially-connected control windings 154, 168 and 182 of the magnetic amplifiers 150, 164 and 178—being connected to the lower terminal of the right-hand control winding 182. The lower end of the left-hand control winding 154 is connected to the common return of the circuit to the electric welder and programming device. A conductor 344 extends from the right-hand terminal of the choke 342 into and through FIG. 3 and to a junction 774 in FIG. 4.

The numeral 346 in FIG. 2 denotes a conductor which extends from the ignition circuit 312 into and through FIG. 3 and to the movable contact of a single pole, single throw switch 736 in FIG. 4. The numeral 348 denotes a conductor which extends from the ignition circuit 312 to one terminal of a potentiometer 542 in FIG. 3. The other terminal of that potentiometer is connected to the common return.

FIG. 5 shows a voltage regulator which provides a precisely-regulated positive voltage of twenty-eight volts and also provides a precisely-regulated negative voltage of twenty-eight volts. A negative voltage of thirty-two volts is supplied to that voltage regulator by the conductor 140 which extends from the junction 134 in FIG. 1; and that conductor has junctions 350, 352, 354 and 356 therein, as shown by FIG. 5. A positive voltage of thirty-two volts is supplied to that voltage regulator by the conductor 136 which extends from the junction 132 in FIG. 1; and that conductor extends to a junction 382 in FIG. 5.

A resistor 358, a junction 362, and a resistor 360 connect the junction 350 with the collector of a PNP transistor 364. The emitter of that transistor is connected to the common return of the circuit by a junction 366. A diode 370 is connected between the junction 366 and the base of the transistor 364 by a junction 368; and that diode will protect that transistor against injury due to transients in the circuit.

The junction 362 is connected to the base of an NPN transistor 374, and the emitter of that transistor is connected to the junction 352 by a diode 372. The collector of that transistor is connected to the junction 382 by a resistor 376, a junction 380 and a resistor 378. The junction 380 is connected to the base of a PNP transistor 430; and the emitter of that transistor is connected to the junction 382 by a diode 432. The collector of the transistor 430 is connected to the conductor 140 by junctions 422 and 420, a resistor 428, a junction 424, a resistor 426, junctions 412 and 414, and a PNP transistor 398. That collector also is directly connected to the output terminal 442 of the voltage regulator of FIG. 5. A conductor 418 extends from that output terminal into FIGS. 2, 3, 4, 6 and 7. The emitter of the transistor 398 is connected to the output terminal 440 of the voltage regulator of FIG. 5 by the junction 414; and the conductor 416 extends from that output terminal into FIGS. 3, 6 and 7.

A resistor 410, a junction 406, and a Zener diode 408 are connected between the junctions 412 and 420. The junction 406 is connected to the base of a PNP transistor 390 by a resistor 404 and a junction 400; and the junction 400 is connected to the common return of the circuit by a diode 402. The emitter of the transistor 390 is connected directly to the common return of the circuit, and the collector of that transistor is connected to the conductor 140 by a resistor 386, a junction 388, a resistor 384, and the junction 354.

The junction 388 is connected directly to the base of a PNP transistor 392, and the collector of that transistor is connected to the junction 356 in the conductor 140. The emitter of that transistor is connected to the common return by a junction 394 and a resistor 396; and the junction 394 is connected directly to the base of the transistor 398. The collector of that transistor is connected directly to the conductor 140. A capacitor 434 and a capacitor 436 are connected in series between the output terminals 440 and 442; and the adjacent terminals of those capacitors are connected to the common return of the circuit by a junction 438.

The numeral 443 in FIG. 3 denotes a fixed relay contact, and that contact is connected to the positive terminal 442 of the voltage regulator of FIG. 5 by a resistor 439 and by the conductor 418. A movable relay contact 446 normally engages the fixed contact 443 but can be moved into engagement with a fixed relay contact 444. The movable contact 446 is connected to one of the inputs of an amplifier 448 by junctions 456 and 489. The details of an amplifier which can be used as the amplifier 448 are shown in FIG. 7. The other input of the amplifier 448 is connected to the movable contact of a potentiometer 462. The right-hand terminal of that potentiometer is connected to the common return of the circuit, and the left-hand terminal of that potentiometer is connected to the negative terminal 440 of the voltage regulator of FIG. 5 by a resistor 460 and by the conductor 416. The output of the amplifier 448 is connected to the cathode of a diode 558 and to the upper end of a Zener diode 482 by junctions 458 and 480. A parallel-connected capacitor 454 and diode 452 connect the junction 458 with the junction 456; and the anode of that diode is connected to the junction 458.

The lower end of the Zener diode 482 is connected to the positive terminal 442 of the voltage regulator of FIG. 5 by junctions 484 and 485, a resistor 486, and the conductor 418. A diode 488 is connected between the junction 484 and the junction 489. The junction 485 is connected to one of the inputs of an amplifier 490 by a resistor 492 and a junction 494. The amplifier 490 can be identical to the amplifier shown in FIG. 7, and hence can be identical to the amplifier 448. The other input of the amplifier 490 is connected to the movable contact of a potentiometer 498; and that potentiometer has the right-hand terminal thereof connected to the common return of the circuit. The left-hand terminal of that potentiometer is connected to the negative terminal 440 of the voltage regulator of FIG. 5 by a resistor 496 and the conductor 416. The output of the amplifier 490 is connected to the cathode of a diode 514 by junctions 506 and 508. The junction 506 is connected to the positive terminal 442 of the voltage regulator of FIG. 5 by a resistor 502 and the conductor 418. A resistor 510 and an adjustable resistor 512 are connected between the junction 508 and the junction 494.

The anode of the diode 514 is connected to the movable contact 516 which is mounted adjacent fixed contacts 518 and 520. The fixed contact 520 is connected to one terminal of a potentiometer 522, and the other terminal of that potentiometer is connected to the common return of the circuit. The fixed contact 518 is connected to one terminal of a potentiometer 524, and the other terminal of that potentiometer is connected to the common return of the circuit. The movable contact of the potentiometer 522 is connected to a fixed contact 530; and a movable contact 528 is selectively engageable with that fixed contact or with a fixed contact 526. The fixed contact 526 is connected to the movable contact of the potentiometer 524; and movable contact 528 is connected to a conductor 536 by a resistor 532 and a junction 534. The movable contacts 516 and 528 are "ganged" together, and they are also "ganged" to the movable contacts 58 and 78 in FIG. 1, as indicated by the dotted line 529 in both FIGS. 1 and 3. Those movable contacts and the adjacent fixed contacts constitute a "Remote-Local" switch. A knob 531 is provided to enable the movable contacts 58, 78, 516 and 528 to be shifted into and out of their upper and lower positions. In their upper positions, those movable contacts will, respectively, engage the fixed contacts 56, 74, 520 and 530; and, in their lower positions, those movable contacts will, respectively, engage the fixed contacts 54, 76, 518 and 526. The knob 531 will be accessible from the exterior of the programming device of the present invention.

The numeral 538 in FIG. 3 denotes a junction in the conductor 536, and that junction is connected to the movable contact of the potentiometer 542 by a resistor 540. The junction 538 also is connected to a movable relay contact 546 by resistor 544. That movable relay contact is adjacent fixed relay contacts 548 and 550. The fixed relay contact 548 is connected to the movable contact of a potentiometer 552 which has the right-hand terminal thereof connected to the common return of the circuit. The other terminal of that potentiometer is connected to the anode of the diode 558 by a junction 556. The fixed relay contact 550 is connected to the movable contact of a potentiometer 554 that has the right-hand terminal thereof connected to the common return of the circuit. The other terminal of that potentiometer is connected to the junction 556.

The movable relay contact 546 is "ganged" with a movable relay contact 470 and with movable relay contacts 570 and 608, as indicated by dotted lines in FIG. 3. Whenever the movable relay contact 546 is in engagement with the fixed relay contact 548, the movable relay contact 470 will be in engagement with the fixed relay contact 468, the movable relay contact 570 will be in engagement with the fixed relay contact 572, and the movable relay contact 608 will be out of engagement with the fixed relay contact 606. Whenever the movable relay contact 546 is in engagement with the fixed relay contact 550, the movable relay contact 470 will be in engagement with the fixed relay contact 472, the movable relay contact 570 will be in engagement with the fixed relay contact 574, and the movable relay contact 608 will be in engagement with the fixed relay contact 606.

The fixed relay contact 468 is connected to the negative terminal 440 of the voltage regulator of FIG. 5 by a resistor 466, an adjustable resistor 464, and the conductor 416. The fixed relay contact 472 is connected to the positive terminal 442 of the voltage regulator of FIG. 5 by a resistor 476, an adjustable resistor 474, and the conductor 418.

The numeral 560 denotes a resistor in the upper right-hand portion of FIG. 3; and one terminal of that resistor is connected to the negative terminal 440 of the voltage regulator of FIG. 5 by the conductor 416. The other terminal of that resistor is connected to one terminal of a potentiometer 562; and the other terminal of that potentiometer is connected to the common return of the circuit. A resistor 564 is connected to the movable contact of the potentiometer 562; and a conductor 566 extends from that resistor to one of the inputs of an amplifier 658 in FIG. 4. The conductor 536 extends from the junction 534 in FIG. 3 to a junction 676 in FIG. 4, and thence to another input of the amplifier 658.

The numeral 568 denotes a lamp which is shown at the left-hand side of FIG. 3; and that lamp is connected across the conductors 108 and 110 which extend from the secondary winding 102 of the power transformer 92 in FIG. 1. That lamp will be illuminated whenever the relay contacts 84, 86 and 88 of FIG. 1 are closed.

The fixed relay contact 572 is connected to a movable relay contact 576 which normally engages a fixed relay contact 578 but which can be moved into engagement with a fixed relay contact 580. The fixed relay contact 578 is connected to one terminal of a lamp 582, and the other terminal of that lamp is connected to the conductor 108 by a junction 588. The fixed relay contact 580 is connected to one terminal of a lamp 584, and the other terminal of that lamp is connected to the conductor 108 by a junction 590. The fixed relay contact 574 is connected to one terminal of a lamp 586, and the other terminal of that lamp is directly connected to the conductor 108.

The movable relay contact 576 is "ganged" with the movable relay contact 446, and those contacts are controlled by a relay coil 592. That relay coil has the upper terminal thereof connected to the positive junction 132 in FIG. 1 by the conductor 128, and it has the other terminal thereof connected to a movable contact 598 of a program control switch by a resistor 594 and a junction 596. That program control switch has four fixed contacts 600, and the two lowermost contacts 600 are connected by a jumper 602 and are connected to the common return of the circuit. A junction 604 connects the junction 596 with the fixed relay contact 606. The movable relay contact 608 is connected to the common return of the circuit.

The movable relay contacts 470, 546, 570 and 608 are controlled by a relay coil 610. One terminal of that coil is connected to the positive junction 132 in FIG. 1 by the conductor 128; and the other terminal of that coil is connected to the movable contact 616 of the program control switch by a resistor 612 and a junction 614. That program control switch has four fixed contacts 618, and the lowermost of those fixed contacts is connected to the common return of the circuit. A knob 617 is provided for that switch.

The junction 614 is connected to a movable relay contact 620 which is selectively engageable with a fixed relay contact 622; and that fixed relay contact is connected to the common return of the circuit. A movable relay contact 624 is connected to the junction 604; and that contact is selectively engageable with a fixed relay contact 626 which is connected to the common return of the circuit.

The numeral 630 denotes a normally-closed push button which has one of the fixed contacts thereof connected to the negative junction 134 in FIG. 1 by the conductor 130. The other fixed contact of that push button is connected to the upper terminals of relay coils 634 and 646 by the junction 632. The other terminal of the relay coil 634 is connectable to the common return of the circuit by a resistor 636, a junction 638, and a normally-open push button 640. The other terminal of the relay coil 646 is connectable to the common return of the circuit by a resistor 648, a junction 652, and a normally-open push button 650. The push buttons 630, 640 and 650 are mounted in the remote control; and can thus be pressed by the operator while he is standing immediately adjacent the workpiece.

A movable relay contact 642 is connected to the junction 638, and that movable contact can be selectively moved into engagement with a fixed relay contact 644 that is connected to the common return of the circuit. The movable relay contact 642 is "ganged" to the movable contact 624; and those contacts are normally in open position. However, whenever the relay coil 634 is energized, those contacts will move into engagement with the fixed relay contacts 626 and 644.

The numeral 654 denotes a movable relay contact that is connected to the junction 652, and that movable contact can be selectively moved into engagement with a fixed relay contact 656 that is connected to the common return of the circuit. The movable contact 654 is "ganged" to the movable contact 620; and those contacts are normally in open position. However, whenever the relay coil 646 is energized, the movable contacts 620 and 654 will, respectively, move into engagement with the fixed contacts 622 and 656.

The numeral 664 in FIG. 4 denotes a junction which is connected to the output of the amplifier 658. That amplifier can be identical to the amplifier shown in FIG. 7, and can thus be identical to the amplifiers 448 and 490. The junction 664 is connected to the positive terminal 442 of the voltage regulator of FIG. 5, either through a Zener diode 666, a junction 668, a resistor 684, a junction 686 and the conductor 418 or by a resistor 678, a potentiometer 680, a resistor 682, junction 686, and the conductor 418. The numeral 672 denotes a resistor which coacts with an adjustable resistor 674 to constitute a feed back circuit that is connected between the junction 676 and a junction 670.

A resistor 688 and junctions 690, 702, 710, 712 and 714 connect the junction 670 with one of the inputs of the pre-amplifier 706. That pre-amplifier can be identical to the amplifier shown in FIG. 7, and can thus be identical to the amplifiers 448, 490 and 658. Aa resistor 698, an adjustable resistor 696, a junction 694, and a diode 692 are connected between the junction 690 and the movable contact of the potentiometer 680. A resistor 700 is connected between the junction 694 and the common return of the circuit. A resistor 734 is connected between the junction 712 and one of the fixed contacts of the switch 736, as shown particularly by FIG. 4. The numeral 708 denotes a conductor which connects the other input of the pre-amplifier 706 with the common return of the circuit. A Zener diode 720 is connected in parallel with the pre-amplifier 706 by the junction 714 and a junction 722. A Zener diode 724 and junctions 726 and 728 connect the junction 722 with a junction 754. A resistor 730 and a capacitor 732 are connected in series between the junction 710 and the junction 728.

Four PNP transistors 738, 740, 742 and 744 have the bases thereof connected to the junction 754 by junctions 756 and 758. The collectors of those transistors are connected to the negative terminal 134 in FIG. 1 by the conductor 130, a resistor 746, and various of the junctions 748, 750 and 752. The emitters of those transistors are connected to the positive terminal 132 in FIG. 1 by the conductor 128, a junction 779, a resistor 776, a junction 770, one or more of junctions 768, 772 and 774 and, respectively, by resistors 760, 762, 764 and 766. A resistor 778 connects the junction 726 with the junction 779, and thus to the positive terminal 132 in FIG. 1.

Referring to FIG. 6, the ignition circuit 312 includes resistors 780 and 782 and junctions 784 and 788 which connect the conductor 332 to the base of a PNP transistor 786. A diode 790 is connected between the junction 788 and the common return of the circuit. A resistor 792 connects the conductor 313 to the base of a PNP transistor 794. The collectors of the transistors 786 and 794 are connected together by a junction 796; and those collectors are connected to the negative terminal 440 of the voltage regulator of FIG. 5 by junctions 796 and 802, a resistor 816, junctions 814, 818, 820, 822, 824 and 826, and the conductor 416. A resistor 812 is connected between the junction 814 and the junction 784.

The numeral 798 denotes a PNP transistor which has the base thereof connected directly to the junction 802 and which has the collector thereof connected directly to the junction 818. A junction 804 connects the emitter of that transistor to the base of a PNP transistor 800. The collector of the transistor 800 is connected to the junction 820. The emitter of the transistor 798 also is connected to a junction 832 by the junction 804 and a resistor 828;

and the emitter of the transistor 800 is connected to the junction 832 by a junction 806 and a resistor 830. The junction 832 is connected to the positive terminal 442 of the voltage regulator of FIG. 5 by a junction 834 and the conductor 418.

The numeral 808 denotes a junction; and a diode 810 and the conductor 346 connect that junction with the movable contact of the switch 736 in FIG. 4. A diode 838 has the cathode thereof connected to the junction 808, and it has the anode thereof connected to parallel-connected capacitors 856 and 858 by a resistor 840, and junctions 842 and 854. The lower terminals of the capacitors 856 and 858 are connected to the common return of the circuit. The upper terminals of those capacitors are connected to the positive terminal 442 of the voltage regulator of FIG. 5 by a junction 844, a resistor 860, an adjustable resistor 862, the junction 834, and the conductor 418. A diode 846 has the cathode thereof connected to the junction 844, and it has the anode thereof connected to the common return of the circuit by a junction 848 and a resistor 864. A diode 850 has the anode thereof connected to the junction 848, and it has the cathode thereof connected to a junction 852 which is connected to the base of an NPN transistor 836. A resistor 866 extends between the junction 852 and the common return of the circuit; and a junction 882 and a resistor 888 connect the junction 852 to the junction 822. The junction 822, in turn, is connected to the negative terminal 440 of the voltage regulator of FIG. 5 by junctions 824 and 826 and the conductor 416. The resistance of the resistor 864 is very much smaller than the resistance of resistor 866—being forty seven thousand ohms to two hundred and twenty thousand ohms for the resistor 866 in one preferred embodiment of the present invention. The resistances of the resistors 866 and 888 are preferably about equal. A resistor 868 is connected to the collector of the transistor 836 by a junction 870; and a resistor 869, a junction 872, a junction 874, and a resistor 890 are connected between the junction 870 and the junction 824. A resistor 892 is connected between the emitter of the transistor 836 and the junction 826 by junctions 884 and 886; and the junction 826 is connected to the negative terminal 440 of the voltage regulator of FIG. 5 by the conductor 416. The junction 886 is connected to the emitter of an NPN transistor 877 by a junction 876. The base of that transistor is connected to the junction 872, and the collector of that transistor is connected to the potentiometer 542 in FIG. 3 by the conductor 348. The resistance of the resistor 890 is very much larger than the resistance of the resistor 892—being one hundred thousand ohms as against fifteen hundred ohms in the said preferred embodiment of the present invention.

A diode 880 is connected between the emitter and base of the transistor 836, and a diode 878 is connected between the emitter and base of the diode 877. Those diodes are used as extra safeguards for the protection of the transistors 836 and 877. However, those diodes can, if desired, be deleted from the circuit.

FIG. 7 shows in detail an amplifier which can be used as the integrating operational amplifier 448 of FIG. 3, as the inverting operational amplifier 490 of FIG. 3, as the summing amplifier 658 of FIG. 4, and as the pre-amplifier 706 of FIG. 4. The amplifier of FIG. 7 is generally denoted by the numeral 894, and it has input terminals 896 and 898. The input terminals 896 and 898 will, respectively, be connected to the junction 489 and to the movable contact of the potentiometer 462 in FIG. 3 when the amplifier 894 is used as the integrating operational amplifier 448. The input terminals 896 and 898 will, respectively, be connected to the junction 494 and to the movable contact of the potentiometer 498 in FIG. 3 when the amplifier 894 is used as the inverting operational amplifier 490. The input terminals 896 and 898 will, respectively, to be connected to the junction 767 and to the conductor 566 in FIG. 4 when the amplifier 894 is used as the summing amplifier 658; and those input terminals will, respectively, be connected to the junction 714 and to the conductor 708 in FIG. 4 when the amplifier 894 is used as the pre-amplifier 706.

The input terminal 896 is connected to the base of an NPN transistor 900, and the input terminal 898 is connected to the base of an NPN transistor 902. The emitters of those transistors are connected, respectively, to a junction 944 by a resistor 940 and by a resistor 942. That junction is connected to the negative terminal 440 of the voltage regulator of FIG. 5 by a resistor 946, a junction 948, a resistor 950, junctions 952, 954, 956 and 957, and the conductor 416. The junction 948 is connected to the common return of the circuit by a capacitor 958. The collector of the transistor 900 is connected to a junction 918 by a junction 908 and a resistor 916, and the collector of the transistor 902 is connected to that junction by a junction 910 and a resistor 911. The junction 918 is connected to the positive terminal 442 of the voltage regulator of FIG. 5 by a junction 919, a resistor 920, junctions 922 and 924, and the conductor 418. The junction 919 is connected to the common return of the circuit by a capacitor 967.

The junction 908 is connected to the base of a PNP transistor 904, and the junction 910 is connected to the base of a PNP transistor 906. The emitters of those transistors are, respectively, connected to a junction 928 by a resistor 930 and a resistor 932. That junction is connected to the positive terminal 442 of the voltage regulator of FIG. 5 by a resistor 926, junctions 922 and 924, and the conductor 418. The collector of the transistor 904 is connected to the junction 954 by a resistor 960 and a junction 952; and the collector of the transistor 906 is connected to the junction 954 by a junction 912 and a resistor 962. As previously indicated, the junction 954 is connected to the negative terminal 440 of the voltage regulator of FIG. 5.

A junction 965 connects the junction 912 with the base of an NPN transistor 914; and a capacitor 966 extends between the junction 965 and the common return of the circuit. The collector of the transistor 914 is connected to the positive terminal 442 of the voltage regulator of FIG. 5 by a junction 936, a resistor 934, the junction 924, and the conductor 418. A resistor 938 is connected between the junction 936 and the common return of the circuit. A junction 963 and a resistor 964 connect the emitter of the transistor 914 to the junction 956; and, as previously explained, that junction is connected to the negative terminal 440 of the voltage regulator of FIG. 5. The base of a PNP transistor 970 is connected to the junction 963; and the collector of that transistor is connected to the negative terminal 440 of the voltage regulator of FIG. 5 by a resistor 972, junction 957, and the conductor 416. The emitter of that transistor extends to an output terminal 968.

It will be noted that the amplifier 894 of FIG. 7 has two input terminals and has one output terminal; and each of the amplifiers 448, 490, 658 and 706, in FIGS. 3 and 4, is shown as having two input terminals and one output terminal. The amplifier 894 is connected to the positive terminal 442 of the voltage regulator of FIG. 5 by the conductor 418 and is connected to the negative terminal 440 of that amplifier by the conductor 416; but, for the sake of clarity, those connections have not been shown for the amplifiers 448, 490, 658 and 706 in FIGS. 3 and 4.

*Operation of amplifier 894*

The resistor 946 of the amplifier 894 of FIG. 7 is connected so the total emitter-collector currents of the transistors 900 and 902 must flow through it. The emitter resistors 940 and 942 have substantially equal resistances, and the collector resistors 916 and 911 have substantially equal resistances. Further, the voltages at the bases of those transistors will normally be the same. This means that the transistors 900 and 902 can act as a differential amplifying stage.

The resistor 926 is connected so the total emitter-collector currents of the transistors 904 and 906 must flow through it. The emitter resistors 930 and 932 have substantially equal resistances, and the collectors are connected to substantially equal loads—the transistor 914 and its load paralleling the resistor 962 and coacting with that resistor to form a load which substantially equals the resistor 960. Further, the voltages at the bases of those transistors will normally be the same. This means that the transistors 904 and 906 can act as a differential amplifying stage.

The transistors 900 and 902 will normally be conductive, and the transistors 904 and 906 will normally be conductive. If a positive-going signal is applied to the base of the transistor 900, that transistor will become more conductive. Thereupon, the total emitter-collector currents that flow through the resistor 946 and then normally divide about equally between the resistor 940 and the resistor 942 will divide in such a way that more current will flow through the resistor 940 and less current will flow through the resistor 942. The resulting increased current flow through the collector resistor 916 of the transistor 900 will cause the junction 908 to become less positive, while the resulting reduced current flow through the collector resistor 911 of the transistor 902 will cause the junction 910 to become more positive. The consequent negative-going signal at the junction 908 will be applied to the base of the transistor 904, and that signal will increase the conductivity of that transistor. The consequent positive-going signal at the junction 910 will be applied to the base of the transistor 906 and that signal will render that transistor less conductive.

Since the transistors 904 and 906 are intended to act as a differential amplifying stage, the emitter-collector currents of those transistors will normally be about equal. However, when the transistor 904 becomes more conductive and the transistor 906 becomes less conductive, the amount of current flowing through the collector resistor 962 of transistor 906 will decrease sharply. As a result, the junction 912 will become much more negative; and a negative-going signal will be applied to the base of the transistor 914. That signal will cause that transistor to become less conductive; and hence less current will flow through the emitter resistor 964. The resulting reduction in the flow of current through the resistor 964 will make the voltage of the junction 963 more negative; and a negative-going signal will be applied to the base of the transistor 970. That signal will make that transistor more conductive and will make the voltage at the terminal 968 more negative. All of this means that the application of a positive-going signal to the base of the transistor 900 will cause terminal 968 to become more negative; while the application of a negative-going signal to the base of transistor 900 will cause the terminal 968 to become more positive.

*Operation of voltage regulator*

The voltage regulator of FIG. 5 receives an unregulated positive voltage of thirty-two volts from the terminal 132 in FIG. 1, and it receives an unregulated negative voltage of thirty-two volts from the terminal 134 in FIG. 1. That voltage regulator supplies a closely regulated positive voltage of twenty-eight volts, and it also supplies a closely regulated negative voltage of twenty-eight volts; and that voltage regulator needs just one reference to fix and regulate both of those voltages. As a result, that voltage regulator is highly effective and is relatively inexpensive.

The transistors 398 and 430 of the voltage regulator of FIG. 5 are power transistors, and they serve as variable resistance elements. The Zener diode 408 serves as the reference for that voltage regulator; and it will serve to fix and regulate a positive voltage of twenty-eight volts at the terminal 442 and will also serve to fix and regulate a negative voltage of twenty-eight volts at the terminal 440.

When the unregulated positive voltage of thirty-two volts is initially applied to the junction 382 and the unregulated negative voltage of thirty-two volts is initially applied to the junctions 350, 362, 354 and 356, the transistor 390 will be non-conductive; and hence the voltage at the junction 388 between the resistors 384 and 386 will be close to the negative voltage at the junction 354. The resulting negative voltage at the base of the transistor 392 will make that transistor conductive; and as current flows through the resistor 396, the voltage at the upper end of that resistor will approach the negative voltage at the junction 356. The voltage at the base of the transistor 398 will thus become negative, and will render that transistor conductive. This means that the emitter of that transistor will rapidly move in the negative direction; and when the right-hand end of the Zener diode 408 becomes sufficiently negative, that Zener diode will become conductive. As soon as that Zener diode becomes conductive, current will begin to flow from the common return of the circuit through the emitter-base circuit of the transistor 390, past the junction 400, through the resistor 404, past the junction 406, through the Zener diode 408, past the junctions 412 and 414, and through the transistor 398 to the conductor 140. The Zener diode 408 will establish and fix a voltage of twenty-eight volts between the left-hand and right-hand ends thereof, and will thereby keep the emitter of the transistor 398 from moving closer to the negative voltage at the junction 356. The right-hand end of the Zener diode 408 will be negative relative to the left-hand end of that Zener diode; and, as a result, the voltage at the emitter of transistor 398, and hence at the output terminal 440, will be twenty-eight volts negative relative to the common return of the circuit.

If a variation in line voltage, a variation in load voltage, noise, or some other transient were to make the negative voltage at the junction 356 more negative, the voltage at the emitter of the transistor 398 would tend to become more negative; and the Zener diode 408 would respond to that tendency to tend to make the left-hand end thereof become more negative. Immediately, the emitter-base current of transistor 390 would increase. That transistor would amplify that increased emitter-base current, with a resulting increase in the voltage drop across the resistor 384. This means that the junction 388, and hence the base of the transistor 392, would become more positive; and, thereupon, that transistor would become less conductive. The consequent decrease in voltage drop across the resistor 396 would cause the junction 394, and hence the base of transistor 398, to become more positive. That transistor would then become less conductive and would drop more voltage across it, thereby making the voltage of the emitter thereof move back to minus twenty-eight volts relative to the common return of the circuit.

If a variation in line voltage, a variation in load voltage, noise, or some other transient were to make the negative voltage at the junction 356 less negative, the voltage at the emitter of the transistor 398 would tend to become less negative; and the Zener diode 408 would respond to that tendency to tend to make the left-hand end thereof become less negative. Immediately, the emitter-base current of the transistor 390 would decrease. That transistor would amplify that decreased emitter-base current, with a resulting decrease in the voltage drop across the resistor 384. This means that the junction 388, and hence the base of the transistor 392, would become less positive; and, thereupon, that transistor would become more conductive. The consequent increase in voltage drop across the resistor 396 would cause the junction 394, and hence the base of transistor 398, to become less positive. That transistor would then become more conductive and would drop less voltage across it, thereby making the voltage of the emitter thereof move back to minus twenty-eight volts relative to the common return of the circuit.

It will thus be apparent that the Zener diode 408 will coact with the loop which includes the transistors 390, 392 and 398 to fix and establish the voltage at the terminal 440. That voltage will be twenty-eight volts negative to the common return of the circuit. The voltage regulator will then use that fixed and regulated voltage as a reference for the positive voltage of twenty-eight volts which it must supply.

When the positive and negative voltages of thirty-two volts are first applied to the voltage regulator of FIG. 5, the transistors 364, 374 and 430 will be non-conductive. The resistors 426 and 428 will coact to constitute a voltage divider between the terminal 440 and the collector of the transistor 430, and thus between the output terminals 440 and 442. As the voltage at the right-hand end of the Zener diode 408 goes twenty-eight volts negative relative to the common return of the circuit, the voltage at the left-hand end of the resistor 428 will move in the negative direction. The resulting negative-going signal at the base of the transistor 364 will make that transistor conductive. As current flows through the resistor 358, the voltage at the junction 362, and hence at the base of the transistor 374, will become more positive. The NPN transistor 374 will become conductive; and as it does so the voltage at the junction 380, and hence at the base of the transistor 430, will become more negative. Thereupon, the transistor 430 will become conductive, and the collector of that transistor will move in the positive direction. The voltage at the right-hand end of the resistor 428 also will move in the positive direction; and that voltage will continue to move in the positive direction until the junction 424 closely approaches zero. At that time, the collector of the transistor 430 will be just about as positive as the emitter of the transistor 398 is negative. The overall result will be that the voltage at the collector of transistor 430, and hence at the terminal 442, will be equal and opposite to the voltage at the emitter of the transistor 398, and hence at the terminal 440. As the voltage at the junction 424 approaches zero, the voltage at the base of the transistor 364 will also approach zero, with a consequent decrease in conductivity of that transistor. That decrease in conductivity will make the junction 362, and hence the base of NPN transistor 374, more negative. As a result, that transistor will become less conductive; and the resulting decrease in voltage drop across the resistor 378 will make the junction 380, and hence the base of transistor 430, more positive. This means that the transistor 430 will become less conductive and will tend to fix the voltage at the junction 442 at twenty-eight volts postive relative to the common return of the circuit.

If a variation in line voltage, a variation in load voltage, noise, or some other transient were to make the positive voltage at the junction 382 more positive, the voltage at the junction 424, and hence at the base of transistor 364, would tend to move in the positive direction. The resulting decrease in conductivity of that transistor would make the junction 362, and hence the base of NPN transistor 374, more negative. As a result, that transistor would become less conductive; and the resulting decrease in voltage drop across the resistor 378 would make the junction 380, and hence the base of transistor 430, more positive. This means that the transistor 430 would become less conductive and would drop more voltage across it, thereby holding the voltage at the junction 442 at twenty-eight volts positive relative to the common return of the circuit.

If a variation in line voltage, a variation in load voltage, noise, or some other transient were to make the positive voltage at the junction 382 less positive, the voltage at the junction 424, and hence at the base of transistor 364, would tend to move in the negative direction. The resulting increase in conductivity of that transistor would cause the voltage at the junction 362, and hence at the base of the transistor 374, to become more positive. The NPN transistor 374 would become conductive; and as it did so the voltage at the junction 380, and hence at the base of the transistor 430, would become more negative. Thereupon, the transistor 430 would become more conductive, and would drop less voltage across it, thereby holding the voltage at the junction 442 at twenty-eight volts positive relative to the common return of the circuit.

The capacitors 434 and 436 lower the frequency response of the voltage regulator. This is desirable because it will prevent oscillation of that voltage regulator at the upper end of the band pass of the circuit.

The diode 402 coacts with the resistor 404 to keep reverse transients from causing injury to the transistor 390. Similarly, the diode 370 is intended to protect the transistor 364 from injury due to reverse transients. The diode 432 provides a voltage drop across it that enables leakage current to flow into the base of the transistor 430 through the resistor 378; thereby enabling that transistor to become completely non-conductive whenever it is supposed to become non-conductive. Similarly, the diode 372 provides a voltage drop across it that enables leakage current to flow out of the base of the transistor 374 through the resistor 358; thereby enabling that transistor to become completely non-conductive whenever it is supposed to become non-conductive.

In essence, the voltage regulator of FIG. 5 establishes a loop through the transistors 390, 392 and 398 and causes the Zener diode 408 to coact with that loop to fix and establish a negative twenty-eight volts at the terminal 440. The transistor 430, on a steady state basis, causes enough current to flow through the resistor 410 and the Zener diode 408 to enable that Zener diode to operate in its optimum current range, thereby precisely establishing the desired negative twenty-eight volts. The voltage regulator then uses that negative twenty-eight volts as a reference for the loop including the transistors 430, 364 and 374; and that loop then fixes and establishes a positive twenty-eight volts at the terminal 442.

Operation of ignition circuit

The ignition circuit 312 of FIG. 2 is shown in detail in FIG. 6; and that ignition circuit is intended to enable the magnetc amplifiers 150, 164 and 178 to provide an increased output for a short period of time to help establish the arc between the electrode and workpiece connected to the output terminals 222 and 254. The increase in output, and the length of time during which the increased output is provided, can be precisely controlled by the ignition circuit 312.

The emitter-collector circuits of the transistors 786 and 794 of the ignition circuit 312 are connected in parallel between the common return of the circuit and the lower terminal of the resistor 816 by the junctions 796 and 802. The upper terminal of that resistor is connected to the negative terminal 440 of the voltage regulator of FIG. 5 by junctions 814, 818, 820, 822, 824 and 826 and by the conductor 416. The transistors 786 and 794 are PNP transistors and will be non-conductive until the bases thereof are made negative relative to the emitters thereof.

Prior to the time an arc is initiated between the electrode and the workpiece, a positive voltage of about eighty-two volts will appear at the junction 214 in FIG. 2; and the conductor 332 will apply that voltage to the left-hand end of the resistor 780. The upper end of the resistor 812 will be connected to the negative terminal 440 of the voltage regulator by the junctions 814, 818, 820, 822, 824 and 826 and by the conductor 416; and hence the resistors 780, 782 and 812 will constitute a voltage divider which is connected between a positive voltage that is initially eighty-two volts and a negative voltage that is always twenty-eight volts. The anode of the diode 790 is connected to the junction 784, intermediate the resistors 782 and 812, by the junction 788; and the cathode of that diode is connected to the common return of the circuit. The values of the resistors 780, 782 and 812 are selected so that the voltage at the junction 784, and hence at the base of the transistor 786, will be positive as long as the voltage at the junction 214 in FIG. 2 is above about fifty volts; and the diode 790 will keep that positive voltage at a value of less than one volt. The overall result is that before an arc is initiated, the transistor 786 will be non-conductive.

The lower end of the resistor 338 in FIG. 2 is connected to the positive terminal 442 of the voltage regulator of FIG. 5 by the conductor 418; and the upper end of that resistor is connected to the junction 330 by junction 311, resistor 310 and junction 309. Junctions 234 and 236, parallel-connected resistor 264 and potentiometer 266, conductor 306, output terminals 278, 290 and 302, junctions 314 and 320, adjustable resistor 322, and resistors 324, 326 and 328 connect the common return of the circuit to the junction 330. Prior to the initiation of an arc, no current will flow through the primary windings 270, 282 and 294 of the current transformers 272, 284 and 296; and for lack of current, no voltage will appear across the output terminals of the bridge rectifiers 276, 288 and 300. As a result, before an arc is initiated, the parallel-connected resistor 264 and potentiometer 266, adjustable resistor 322, and resistors 324, 326, 328, 310 and 338 will constitute a voltage divider between the positive terminal 442 of the voltage regulator and the common return of the circuit; and the voltage at the junction 311, and hence at the base of the transistor 794, will be positive relative to the emitter of that transistor. Consequently, before an arc is initiated, the transistor 794 will be non-conductive.

The overall result is that both of the input transistors 786 and 794 of the ignition circuit 312 will be non-conductive prior to the time an arc is initiated. Once an arc has been initiated, that arc will constitue a finite impedance across the output terminals 222 and 254; and the voltage across those output terminals will start decreasing. Also, the output windings 152, 166 and 180 of the magnetic amplifiers 150, 164 and 178 will start supplying current to that arc; and that current will be large enough to enable the secondary windings 274, 286 and 298 to cause appreciable voltages to appear across the output terminals of the bridge rectifiers 276, 288 and 300. Those voltages will make the junction 330 negative relative to the conductor 306; and the values of parallel-connected resistor 264 and potentiometer 266, of adjustable resistor 322, and of resistors 324, 326, 328, 310 and 338 are selected so even very small values of current from the output windings 152, 166 and 180 of the magnetic amplifiers 150, 164 and 178 will make the voltage at the junction 311, and hence at the base of the transistor 794, negative relative to the common return of the circuit. The increasing current from the output windings 152, 166 and 180 of the magnetic amplifiers 150, 164 and 178 may cause the transistor 794 to become conductive before the decreasing voltage across the output terminals 222 and 254 causes the transistor 786 to become conductive or the decreasing voltage across the output terminals 222 and 254 may cause the transistor 786 to become conductive before the increasing current from the output windings 152, 166 and 180 of the magnetic amplifiers 150, 164 and 178 causes the transistor 794 to become conductive, but one or the other or both of the transistors 786 and 794 will become conductive as soon as an arc has been initiated.

As long as both of the transistors 786 and 794 remain non-conductive, the voltage at the base of transistor 798 will be close to the negative voltage at junction 814. The emitter of that transistor will be biased in the negative direction by the flow of leakage current, from the base-collector circuit of transistor 800, through resistor 828; but as long as both of the transistors 786 and 794 remain non-conductive the base of transistor 798 will be sufficiently more negative than the emitter of that resistor to make that transistor fully conductive.

Current flowing through transistor 798 will also flow through the resistor 828 and will make the voltage at the base of transistor 800 close to the negative voltage at the junction 818. The emitter of transistor 800 will, whenever the switch 736 in FIG. 4 is closed, be biased in the negative direction by the flow of leakage current, from the base-collector circuit of transistor 900 of the pre-amplifier 706, through resistor 830; but as long as transistor 798 remains fully conductive the base of transistor 800 will be more negative than the emitter of that transistor. This means that as long as transistor 798 is fully conductive, transistor 800 will remain fully conductive and the voltage at its emitter will be close to the negative voltage at the junction 820.

As long as the transistor 800 is fully conductive, the voltage at the junctions 806 and 808 will be quite negative. That negative voltage will be applied to the base of the transistor 900 of the pre-amplifier 706 by diode 810, conductor 346, switch 736, resistor 734, and junctions 712 and 714; and that negative voltage will cause that pre-amplifier to make the terminal 968 thereof about one-half of a volt negative. The magnitude of the negative voltage at the junctions 806 and 808 will be large enough so the resulting negative voltage applied to the base of the transistor 900 of the pre-amplifier 706 will over-ride noise or any signal which could be applied to that base. As a result, prior to the time an arc is initiated, the ignition circuit 312 will, whenever the switch 736 of FIG. 4 is closed, make the terminal 968 of the pre-amplifier 706 about one-half of a volt negative.

The Zener diode 724 has the left-hand end thereof connected to the terminal 968 of the pre-amplifier 706, and has the right-hand end thereof connected to the bases of the transistors 738, 740, 742 and 744 of the four-transistor amplifier. That Zener diode maintains the right-hand end thereof six volts positive relative to the left-hand end thereof; and will, whenever the terminal 968 of the pre-amplifier 706 is about one-half of a volt negative, make the voltage at the bases of the transistors 738, 740, 742 and 744 about five and one-half volts positive. That positive voltage will reduce the conductivities of those transistors to a minimum and will thus make the voltage at the emitters of those transistors positive with respect to the common return of the circuit. Consequently, current will flow from the positive terminal 132 in FIG. 1 through conductor 128, past junction 779 in FIG. 4, through resistor 776, past junctions 770, 772 and 774, through conductor 344, through choke 342 in FIG. 2, and then through the serially-connected control windings 182, 168 and 154 of the magnetic amplifiers 178, 164 and 150 to the common return of the circuit. The choke 342 will limit the rate of change of that current and will thus keep that current from "tripping" those magnetic amplifiers. The current flowing through those serially-connected control windings will cause those magnetic amplifiers to limit the output current levels thereof to very low values. All of this means that prior to the time an arc is initiated, the levels of the output current which the magnetic amplifiers 150, 164 and 178 can supply to the output terminals 222 and 254 will be very low. This is desirable because it will prevent the formation of craters and holes in the workpiece as the arc is initiated.

The diode 838 of the ignition circuit 312 is connected between the junction 808 and the upper terminals of the capacitors 856 and 858 by the resistor 840 and the junctions 842 and 854. That diode will initially permit current to flow from the common return of the circuit via the parallel-connected capacitors 856 and 858, junctions 854 and 842, resistor 840, diode 838, junctions 808 and 806, transistor 800, junctions 820, 822, 824 and 826, and conductor 416 to the negative terminal 440 of the voltage regulator. That flow of current will charge the capacitors 856 and 858 so the upper terminals thereof are negative. The resistance of the resistor 840 is small, and hence the capacitors 856 and 858 will charge rapidly. The diode 838 also will, as long as the transistor 800 is fully conductive, permit current to flow from the conductor 418 via junction 834, adjustable resistor 862, resistor 860, junctions 844 and 842, resistor 840, diode 838, junctions 808 and 806, and transistor 800 to the conductor 416 rather than flow through the capacitors 856 and 858 to the common return of the circuit. As long as the transistor 800 is fully conductive, the voltage drop across it will be small enough to keep the voltage at the junction 842, and hence at the upper terminals of the capacitors 856 and 858, negative. It should be noted that while the resistor 840 is small enough to facilitate rapid charging of the capacitors 856 and 858, that resistor will be able to protect the transistor 800 from injury due to excessive emitter current.

The diode 846 and the resistor 864 are serially-connected and are connected in parallel with the parallel-connected capacitors 856 and 858. As a result, current can flow through the resistor 864 and the diode 846; and that current flow will make the voltage at the upper terminal of that resistor negative relative to the common return, thereby applying a negative voltage to the anode of the diode 850. That negative voltage will be large enough to render that diode non-conductive. This means that as long as the upper terminals of the capacitors 856 and 858 have negative voltages of at least fourteen volts, the diode 850 will be kept non-conductive.

The transistors 836 and 877 and their associated resistors constitute a Schmitt trigger that is used as a bistable multivibrator. The resistors 888 and 866 are connected between the negative terminal 440 of the voltage regulator and the common return, and the resistances of those resistors are preferably equal. As a result, those resistors will act as a voltage divider that tends to establish a voltage of about minus fourteen volts at the junction 852, and hence at the base of the transistor 836. The resistors 890, 869 and 868 also are connected between the negative terminal 440 of the voltage regulator and the common return, and the resistance of the resistor 890 is preferably many times larger than the sum of the resistances of the resistors 868 and 869. As a result, those resistors will act as a voltage divider that tends to establish a voltage at the junction 872, and hence at the base of the transistor 877, which is close to zero. The resistor 892, the transistor 877, and the potentiometer 542 in FIG. 3 are connected between the negative terminal 440 of the voltage regulator and the common return, and the resistance of the resistor 892 is preferably larger than the resistance of the potentiometer 542. As a result, that resistor and potentiometer will act as a voltage divider which tends to make the voltage at the junction 886, and hence at the emitter of the transistor 836, less than minus fourteen volts. It will be noted that the resistor 892 serves as a common emitter resistor for transistors 836 and 877.

The base of the transistor 877 will initially be more positive than the emitter of that transistor, and the base of the transistor 836 will initially be less positive than the emitter of that transistor. As a result, the transistor 836 will tend to be non-conductive whereas the transistor 877 will tend to become conductive. As the latter transistor becomes conductive, the current flowing through the resistor 892 will make the junction 886, and hence the emitter of the transistor 836, more positive; and hence that transistor will be kept non-conductive. The flow of current through the transistor 877 also will make the left-hand terminal of the potentiometer 542 in FIG. 3 negative; thereby enabling the movable contact of that potentiometer to act through resistor 540, junctions 538 and 534, conductor 536, and junction 676 to apply a negative signal to the base of the transistor 900 of the summing amplifier 658.

The application of the said negative signal to the base of the transistor 900 of the summing amplifier 658 will not affect the output of the electric welder at this time; because the highly-negative voltage that is being applied to the base of the transistor 900 of the pre-amplifier 706 will act through that pre-amplifier, the four-transistor amplifier, the choke 342, and the control windings 180, 166 and 152 of the magnetic amplifiers 178, 164 and 150 to hold the outputs of those magnetic amplifiers to very low levels. However, when the said highly-negative voltage is isolated from the base of the transistor 900 of the pre-amplifier 706, the said negative signal that is being applied to the base of the transistor 900 of the summing amplifier 658 will materially affect the output of the electric welder. Specifically, that negative signal will cause the terminal 968 of the summing amplifier 658 to move in the positive direction; and the resulting positive-going signal will be applied to the base of the transistor 900 of the pre-amplifier 706 by the Zener diode 666 and the resistor 688. That positive-going signal will cause the terminal 968 of that pre-amplifier to move in the negative direction; and the Zener diode 724 will apply the resulting negative-going signal to the bases of the transistors 738, 740, 742 and 744 of the four-transistor amplifier. Those transistors will then become conductive; and, as those transistors become conductive, the voltage at the junction 774 will become negative. Thereupon, current will flow from the common return in FIG. 2 via serially-connected control windings 154, 168 and 182, choke 342, conductor 344, junction 774, through the parallel-connected transistors 738, 740, 742 and 744 and their associated emitter resistors 760, 762, 764 and 766, and then through the resistor 746 and the conductor 130 to the negative terminal 134 of FIG. 1. The magnitude of that flow of current will be determined by the setting of the movable contact of the potentiometer 542; but that flow of current will cause the magnetic amplifiers 150, 164 and 178 to increase the outputs thereof. By appropriate adjustment of the movable contact of the potentiometer 542, in one embodiment of the present invention, it is possible to increase the outputs of those magnetic amplifiers by any desired current value from one ampere to two hundred amperes. The particular increased output that should be used will be determined by the nature, the thickness and the material of the workpiece.

As described hereinbefore, as long as the upper terminals of the capacitors 856 and 858 have a negative voltage of at least fourteen volts, the diode 850 will be kept non-conductive; and as long as that diode is kept non-conductive it will isolate the Schmitt trigger from the resistor 864. However, when an arc is initiated, either or both of the transistors 786 and 794 will become conductive; and thereupon the voltage at the junction 802, and hence at the base of the transistor 798, will move in the positive direction. That transistor will then become less conductive; and the resulting decreased voltage drop across the resistor 828 will cause the voltage at the junction 804, and hence at the base of the transistor 800, to move in the positive direction. The transistor 800 will thereupon become less conductive, and the resulting decreased voltage drop across the resistor 830 will cause the voltage at the junction 806, and hence at the cathodes of the diodes 810 and 838, to move in the positive direction. Very promptly, both of those diodes will become non-conductive; and this means that the diode 810 will isolate the base of the transistor 900 of the pre-amplifier 706 from the voltage at the junction 806, and that the junction 842 will be isolated from the negative terminal 440 of the voltage regulator. As the diode 810 isolates the base of the transistor 900 of the pre-amplifier 706 from the voltage at the junction 806, that pre-amplifier will cause the magnetic amplifiers 150, 164 and 178 to increase the outputs thereof to the levels established by the movable contact of the potentiometer 542. Those levels will be high enough to make sure that the arc can become established, but will be low enough to keep that arc from forming holes or craters in the workpiece. The isolating of the junction 842 from the negative terminal 440 of the voltage regulator will enable the capacitors 856 and 858 to discharge. Specifically, current will flow from the positive terminal 442 of the voltage regulator via conductor 418, junction 834, adjustable resistor 862, resistor 860, junctions 844, 842 and 854, and then through the parallel-connected capacitors 856 and 858 to the common return of the circuit. Current also will flow from that common return through resistor 864 and diode 846, past junctions 844, 842 and 854, and then through the capacitors 856 and 858 to that common return; and that flow of current will continue to keep the diode 850 non-conductive by keeping the anode thereof negative. The time that is required for the capacitors 856 and 858 to discharge can be adjusted by shifting the slider of adjustable resistor 862.

After a predetermined length of time, which is controlled by the position of the slider of adjustable resistor 862 and which is in the range of from one-tenth to five-tenths of a second, the capacitors 856 and 858 will have discharged sufficiently to enable the voltage at the anode of diode 850 to shift far enough in the positive direction to render that diode conductive. Thereupon, resistors 864 and 866 will be effectively connected in parallel, and will coast with resitsor 888 to form a further voltage divider between the negative terminal 440 of the voltage regulator and the common return of the circuit. Resistor 864 has a resistance which is much smaller than that of either resistor 866 or resistor 888; and hence the effective connecting of resistor 864 in parallel with resistor 866 will cause the voltage at junction 852, and hence at the base of transistor 836, to shift appreciably in the positive direction. The transistor 836 will respond to that shift to become conductive; and the resulting increase in current flow through resistor 868 will make junction 870, and hence the base of transistor 877, shift in the negative direction. Transistor 877 will then become less conductive; and the resulting reduction in voltage drop across resistor 892 will make the voltage at junction 886, and hence at the emitter of transistor 836, more negative—with a consequent increase in conductivity of transistor 836. A further increase in voltage drop across resistor 868 will cause a further decrease in conductivity of transistor 877; and the further decrease in voltage drop across resistor 892 will make transistor 836 still more conductive. As a result, the transistor 877 will rapidly become non-conductive; and that transistor will remain non-conductive as long as the tranisstor 836 remains conductive.

As the transistor 877 becomes fully non-conductive, the voltage at the movable contact of the potentiometer 542 in FIG. 3 will rise to zero. This means that the negative voltage which that potentiometer had been applying to the base of the transistor 900 of the summing amplifier 658 will disappear. Thereupon, that summing amplifier will act through the pre-amplifier 706 and the magnetic amplifiers 150, 164 and 178 to eliminate the increase in output which had been provided by those magnetic amplifiers. At such time, the electric welder will supply initial welding current at the level set by the movable contact of the potentiometer 552 in FIG. 3.

Once the ignition circuit 312 has applied a negative signal of predetermined magnitude to the base of the transistor 900 of the summing amplifier 658, has maintained that signal for a predetermined length of time, and has then eliminated that signal, that ignition circuit should not, as long as the arc is being maintained, again develop and apply that signal. The present invention keeps a drop in the welding current or a rise in the voltage across the arc, during the period the arc is being maintained, from causing the ignition circuit 312 to develop and apply the said negative signal to the base of the transistor 900 of the summing amplifier 658; and it does so by providing that ignition circuit with an "and" gate. Specifically the ignition circuit 312 will, after the said negative voltage has been applied, has been maintained and has then been eliminated, cause current to flow from the positive terminal 442 of the voltage regulator via conductor 418, junction 834, adjustable resistor 862, resistor 860, junctions 844, 842 and 854, and parallel-connected capacitors 856 and 858 to the common return of the circuit; and that current flow will make the upper terminals of those capacitors positive, thereby back-biasing the diode 846. Consequently, until such time as the transistor 800 is again rendered fully conductive, no signal can be applied to the Schmitt trigger to render the transistor 877 conductive again, and thereby enable the ignition circuit 312 to again develop and apply a negative signal to the base of the transistor 900 of the summing amplifier 658. Yet, the transistor 800 can not be rendered fully conductive until both the transistor 786 and the transistor 794 are rendered non-conductive once again; and hence a true "and" gate is provided for the ignition circuit 312.

That "and" gate is very desirable because the welding current may, whenever the electric welder is supplying a very low level of welding current, momentarily fall below the level to which the current transformers 272, 284 and 296 can respond even though the arc is being maintained; and, if the ignition circuit 312 was free to respond to a drop welding current to develop a negative signal and apply it to the base of the transistor 900 of the summing amplifier 658, that ignition circuit would cause an undesired increase in the output of the magnetic amplifiers 150, 164, and 178. The "and" gate provided by the present invention prevents any such undesired increase in the output of the magnetic amplifiers, 150, 164 and 178. The "and" gate is similarly desirable because the voltage across the arc may, with light welding loads, rise appreciably even though the arc is being maintained; and, if the ignition circuit 312 was free to respond to a rise in the voltage across the arc to develop a negative signal and apply it to the base of the transistor 900 of the summing amplifier 658, that ignition circuit would cause an undesired increase in the output of the magnetic amplifiers 150, 164 and 178. The "and" gate provided by the present invention prevents any such undesired increase in the output of the magnetic amplifiers 150, 164 and 178. As a result, the ignition circuit 312 will promptly and automatically enable the electric welder to provide an increased output to help establish an arc, will subsequently cause that electric welder to provide its programmed output, and will thereafter, as long as the arc is being maintained, remain inactive.

As explained hereinafter in the section entitled "Full Description of Operation of Electric Welder and Programming Device," it is customary to use a source of radio frequency voltage to help initiate the arcs of electric welders; and such a source will be used with the electric welder of the present invention. That radio frequency source will be of standard and usual construction, and it is not, per se, a part of the present invention.

It would be undesirable to have the radio frequency currents, generated by that radio frequency source, applied to the "or" gate or the "and" gate of the ignition circuit 312. Consequently, in FIG. 2, a capacitor 336 has one terminal thereof connected to the common return of the circuit and has the other terminal thereof connected to the conductor 332 which extends between the junction 214 and the lefthand end of the resistor 780 in FIG. 6; and that capacitor can filter out radio frequency currents that otherwise could be applied to the base of the transistor 786 of the ignition circuit 312. Also, in FIG. 2, a capacitor 318 is connected between the junctions 314 and 316, respectively, in the conductors 306 and 308; and that capacitor can filter out radio frequency currents which otherwise could be applied to the base of the transistor 794 of the ignition circuit 312. Furthermore, in FIG. 1, a capacitor 120 is connected between the upper and lower terminals of the secondary winding 102 of the power transformer 92; and that capacitor can filter out radio frequency currents that otherwise could pass to the voltage regulator and then be passed on to the ignition circuit 312. The capacitor 245 and the resistor 243 in FIG. 2 are a further filter to filter out radio frequency currents. The filtering action of those various capacitors and of that resistor is also helpful in keeping the radio frequency currents out of other portions of the circuit of the programming device and electric welder.

A diode 880 is connected between the emitter and base of the transistor 836 by junctions 884, 882 and 852. That diode is intended to protect that transistor against injury due to inverse base current flow. Similarly, a diode 878 is connected between the emitter and base of the transistor 877 by junctions 876, 874 and 872. That diode is intended to protect that transistor against injury due to inverse base current flow.

The ignition circuit 312 provided by the present invention is important in making it possible to use a control system, for an electric welder, that has a high gain rather than a low gain. That ignition circuit makes it possible to use a high gain control system because it can keep the high gain of that control system from causing that electric welder to apply high outputs to the workpiece, during the establishing of arcs, which could form craters or holes in the workpiece. This means that the ignition circuit 312 of the present invention is doubly valuable, in that it makes it possible to use a high gain control system for an electric welder and in that it enables that electric welder, during the establishing of the arcs, to provide precisely-controlled increased outputs for precisely-controlled predetermined periods of time.

In some instances it may be desirable to permit the electric welder to supply its full output to the electrode and workpiece during the establishing of the arc. For example, where it is desirable to clean a flux-coated welding electrode and where it is desirable to use the electric welder to cut the workpiece, it may be helpful to permit the electric welder to supply its full output to the electrode and workpiece during the establishing of the arc. The present invention makes it possible to permit the electric welder to supply its full output to the electrode and workpiece during the establishing of the arc, as by permitting the switch 736 to be opened; because the opening of that switch will keep the ignition circuit 312 from applying a negative voltage to the base of the transistor 900 of the pre-amplifier 706.

The ignition circuit 312 provided by the present invention is capable of performing two important functions during the establishing of the arcs; namely, it can keep the full output of the welder from being applied to the electrode and workpiece, and it can make it possible to provide precisely-controlled increases in the output of the electric welder for precisely-controlled periods of time. As a result, the ignition circuit 312 provided by the present invention makes it possible for the operator of the electric welder to do high quality work at all times.

*Alinement of programming device*

To aline the programming device of the present invention, the operator should set the dial 553 of the "Initial" welding current potentiometer 552 to zero, should set the dial 525 of the "Second" welding current potentiometer 524 to zero, and should set the dial 555 of the "Finish" welding current potentiometer 554 to zero. In addition, that operator should set the dial 465 of the initial slope time adjustable resistor 464 in its maximum position, and should set the dial 475 of the finish slope time adjustable resistor 474 in its maximum position. Further, that operator should set the knob 531 of the "Remote-Local" switch in the "Local" position; and, in doing so, he would shift the movable contacts 58, 78, 516 and 528 down into their lower positions. Also, that operator should set the knob 617 of the program control switch in the "Second"

position; and, in doing so, he would shift the movable contacts 598 and 616, respectively, into engagement with the third-uppermost contacts 600 and 618. Moreover, that operator should set the movable contact of the potentiometer 542 in its extreme righthand position.

Thereupon that operator should connect the conductors 20, 22 and 24 to a suitable source of three phase, sixty cycle, alternating voltage, and should press the push button 50. The connecting of the conductors 20, 22 and 24 to the said source of three phase, sixty cycle, alternating voltage will enable the transformer 28 to energize the blower motor 40. The pressing of the push button 50 will energize the relay coil 44 and will illuminate the "on" lamp 82 in the remote control; and that relay coil will promptly cause the normally-open relay contacts 64, 84, 86 and 88 to close. The relay contacts 64 will establish a holding circuit for the relay coil 44 and for the lamp 82; and the relay contacts 84, 86 and 88 will connect the primary winding 90 of the power transformer 92 to the source of three phase, sixty cycle, alternating voltage. Current will then flow from the secondary winding 94 to the output windings 152, 166 and 180, respectively, of the magnetic amplifiers 150, 164 and 178; and the effect of that current will be discussed hereinafter in the section entitled "Alinement of Electric Welder." Current also will flow through the secondary winding 102 of the power transformer 92; and that current will enable the transformer 114 to supply single phase, one hundred and fifteen volt A.C. to the "on" lamp 568 in the programming device. The current flowing through the secondary winding 102 of the power transformer 92 also will enable the transformer 114 to coact with the full wave bridge rectifier 122 to supply a positive D.C. voltage of thirty-two volts and a negative D.C. voltage of thirty-two volts to the voltage regulator of FIG. 5, to the left-hand terminals of the relay coils 592, 610, 634 and 646 of FIG. 3, and to the four-transistor power amplifier in FIG. 4. The operation of the said four-transistor power amplifier will be discussed hereinafter in the section entitled "Alinement of Electric Welder" and need not be discussed here.

Because the knob 617 of the program control switch will be in its "Second" position, the supplying of the positive voltage of thirty-two volts to the left-hand terminals of the relay coils 592 and 610 will energize the relay coil 592 but will not energize the relay coil 610. Hence the movable relay contacts 446 and 576 will shift down into their lower positions but the movable relay contacts 470, 546, 570 and 608 will remain in their upper positions. The movable relay contact 570 will be in its upper position and the movable relay contact 576 will be in its lower position; and those movable relay contacts will illuminate the "Second" welding current lamp 584 in the programming device. The supplying of the positive and negative voltages of thirty-two volts to the voltage regulator of FIG. 5 will enable that voltage regulator to provide precisely-regulated positive and negative voltages of twenty-eight volts; all as explained hereinbefore in the section entitled "Operation of Voltage Regulator."

The voltage regulator of FIG. 5 will apply a positive voltage of twenty-eight volts to the left-hand end of resistor 486 and will apply a negative voltage of twenty-eight volts to the left-hand end of the adjustable resistor 464 in FIG. 3. As a result, a negative-going signal will be applied to the base of the transistor of the integrating operational amplifier 448; and current will start flowing from the positive terminal 442 of the voltage regulator via resistor 486, junctions 485 and 484, Zener diode 482, junctions 480 and 458, capacitor 454, junction 456, movable and fixed relay contacts 446 and 444, movable and fixed relay contacts 470 and 468, resistor 466, adjustable resistor 464, and conductor 416 to the negative terminal 440 of the voltage regulator. Also, current will start flowing through resistor 486, past junctions 485 and 484, through Zener diode 482, past junctions 480 and 458 and terminal 968 of the amplifier 448, and through the transistor 970 and resistor 972 of that amplifier to the negative terminal 440 of the voltage regulator. The negative-going signal at the base of the transistor 900 of the amplifier 448 will cause that amplifier to move the terminal 968 thereof in the positive direction; and the flow of current through the capacitor 454 will make the left-hand terminal thereof progressively negative relative to the right-hand terminal thereof. The adjustable resistor 464 has a large resistance; and that adjustable resistor will coact with the capacitor 454 and with the resistors 466 and 486 to provide a time constant of several seconds. At the end of the said several seconds, the voltage drop across the capacitor 454 will make the cathode of the diode 452 about one-half of a volt negative relative to the anode of that diode; and thereupon that diode will become conductive. At such time, the current which was flowing through the capacitor 454 will be diverted through the diode 452; and the resulting current flow through that diode will keep the voltage at the terminal 968 of the amplifier 448 from moving further in the positive direction. As a result, the amplifier 448 will reach a state of equilibrium.

It is important, whenever the program control switch is in its "Second" position, that a voltage of about minus one-quarter of a volt be established at the cathode of the diode 558. With such a voltage, that diode will be rendered non-conductive because the right-hand ends of the potentiometers 552 and 554 are connected to the common return of the circuit. To provide the desired voltage at the cathode of diode 558, while permitting the amplifier 448 to remain in a state of equilibrium, the voltage at the base of the transistor 900 of that amplifier should be spaced from the voltage at the said cathode by the voltage drop across the diode 452. This means that the voltage at the base of the transistor 900 of the amplifier 448 should be about minus three-quarters of a volt. To establish and maintain that voltage at that base, substantially the same voltage should be applied to the base of the transistor 902 of the amplifier 448. In making the required adjustment, the operator need only shift the movable contact of the potentiometer 462 until he measures a voltage of minus one-quarter of a volt at the junction 480. Thereafter, whenever the program control switch is set in its "Second" position, the amplifier 448 will make certain that the voltage of minus one-quarter of a volt will appear at the cathode of diode 558 and will render that diode non-conductive, after capacitor 454 discharges.

The diode 558 will remain non-conductive as long as the voltage at the cathode thereof does not shift far enough to be one-half of a volt negative. This is desirable because it means that even if the output of the amplifier 448 were to drift slightly, the diode 558 would still remain non-conductive. Actually, the amplifier 448 is strongly resistant to drift; and hence that amplifier will be able to keep the diode 558 non-conductive as long as the knob 617 of the program control switch is in its "Second" position.

To aline the inverting operational amplifier 490, it is necessary to provide an adjustment while the knob 617 of the program control switch is in the "Initial" position and to provide a further adjustment while the knob 617 of the program control switch is in the "Second" position. Further, it is important that the adjustment which is made while that knob is in the "Initial" position be made before the making of the adjustment which is made while that knob is in the "Second" position. Consequently, the knob 617 should next be shifted to its "Initial" position.

As that knob is so shifted, the movable switch contacts 598 and 616 will be shifted, respectively, out of engagement with the third-uppermost stationary contacts 600 and 618 and will be moved into engagement with the second-uppermost switch contacts 600 and 618. Since those second-uppermost switch contacts are not connected to the common return of the circuit, the relay coils 592 and 610 will be de-energized. As a result, the movable relay contacts 470, 546, 570 and 608 will remain in their upper positions, and the movable relay contacts 446 and 576 will shift up into their upper positions. The upward shifting of the movable relay contact 576 will extinguish the "Second" welding current lamp 584 and will illuminate the "Initial" welding current lamp 582 in the programming device.

The shifting of the movable relay contact 446 out of engagement with the fixed relay contact 444 and up into engagement with the fixed relay contact 443 will disconnect the base of the transistor 900 of the amplifier 448 from the negative terminal 440 of the voltage regulator and will connect it to the positive terminal 442 of that voltage regulator. As a result, a positive-going signal will be applied to the base of the transistor 900 of the amplifier 448; and current will start flowing from the positive terminal 442 of the voltage regulator via resistor 439, fixed and movable relay contacts 443 and 446, junction 456, capacitor 454, junction 458, terminal 968 of amplifier 448, transistor 970 and resistor 972 of that amplifier, and thence to the negative terminal 440 of the voltage regulator. The positive-going signal at the base of the transistor 900 of the amplifier 448 will cause that amplifier to move the terminal 968 thereof in the negative direction; and the flow of current through the capacitor 454 will make the right-hand terminal thereof progressively negative relative to the left-hand terminal thereof. The resistance of the resistor 439 will be so small, compared to the resistance of the adjustable resistor 464, that the time constant of that resistor and capacitor will be just a few cycles of the alternating current of the A.C. supply. Very promptly, therefore, the voltage at the right-hand terminal of the capacitor 454 will become sufficiently negative relative to the voltage at the left-hand terminal of that capacitor to cause the cathode of the diode 488, to become about one-half of a volt negative relative to the anode of that diode. Thereupon, the diode will become conductive and the current which was flowing through the capacitor 454 will be diverted through the diode 488. The resulting current flow through that diode will keep the voltage at the terminal 968 of the amplifier 448 from moving further in the negative direction. As a result, that amplifier will reach a state of equilibrium.

At such time, a voltage of about one-half of a volt will appear across the diode 488, and a voltage of about eighteen volts will appear across the Zener diode 482. This means that the junction 480 will be about eighteen and one-half volts negative relative to the base of the transistor 900 of the amplifier 448. Since that base has a voltage of about minus three-quarters of a volt relative to the common return of the circuit, the voltage at the junction 480, and hence at the cathode of the diode 558, will be about minus ninteen and one-quarter volts. At this time the voltage at the junction 556 should be carefully measured and recorded.

The eighteen volts which appear across the Zener diode 482 wil make the voltage at the junction 484 about minus one and one-quarter volts. As a result, a negative-going signal will be applied to the base of the transistor 900 of the amplifier 490, and that negative-going signal will cause that amplifier to move the terminal 968 thereof in the positive direction. The voltage regulator of FIG. 5 will apply a positive voltage of twenty-eight volts to the upper end of the resistor 502; and current will flow from that upper end through two paths—one path extending to the negative terminal 440 of that voltage regulator via resistor 502, junction 506, terminal 968 of amplifier 490, transistor 970 and resistor 972 of that amplifier, junction 957, and the conductor 416, and the other path extending to the negative terminal 440 of that voltage regulator via resistor 502, junctions 506 and 508, adjustable resistor 512 and resistor 510, junction 494, resistor 492, junctions 485 and 484, Zener diode 482, junctions 480 and 458, terminal 968 of amplifier 448, transistor 970 and resistor 972 of that amplifier, junction 957, and the connector 416. The conductivity of the transistor 970 of the amplifier 490 will largely control how much current will flow through that transistor and how much will flow through the feed-back resistors 512 and 510. Very quickly, a balance will develop between the current flow through the said two paths, and the amplifier 490 will reach a state of equilibrium.

It is important, whenever the program control switch is in its "Initial" position, that a voltage of about minus one-quarter of a volt will be established at the cathode of the diode 514. With such a voltage, that diode will be rendered non-conductive because the lower end of the potentiometer 524 is connected to the common return of the circuit. To provide the desired voltage at the cathode of diode 514, while permitting the amplifier 490 to remain in a state of equilibrium, the voltage at the base of the transistor 900 of that amplifier should be about half-way between the voltage of about minus one-quarter of a volt at the cathode of diode 514 and the voltage of about minus one and one-quarter volts at the junction 485. This means that the voltage at the base of the transistor 900 of the amplifier 490 should be about minus three-quarters of a volt. To establish and maintain that voltage at that base, substantially the same voltage should be applied to the base of the transistor 902 of that amplifier. In making the required adjustment, the operator need only shift the movable contact of the potentiometer 498 until he measures a voltage of about minus one-quarter of a volt at the junction 508. Thereafter, whenever the program control switch is set in its "Initial" position, the amplifier 490 will make certain that the voltage of about minus one-quarter of a volt will appear at the cathode of diode 514 and will render that diode non-conductive.

The minus one-quarter of a volt at the cathode of the diode 514 will render that diode non-conductive; and the minus ninteen and one-quarter volts at the cathode of the diode 558 will render that diode conductive. As a result, whenever the program control switch is in its "Initial" position, and the programming device is in a steady state condition, the potentiometer 552 will be able to develop a reference voltage across it but the potentiometer 524 will be completely isolated from the potentiometer 552.

The alinement of the amplifier 490 requires the shifting of the knob 617 of the program control switch back to its "Second" position; and, as that knob is shifted back to that position, the relay coil 592 will again be energized. Specifically, current will flow from the positive terminal 132 in FIG. 1 via conductor 128, relay coil 592 in FIG. 3, resistor 594, junction 596, movable contact 598, the third-uppermost fixed contact 600, and jumper 602 to the common return of the circuit. The resulting energization of the relay coil 592 will shift the movable relay contacts 446 and 576 to their lower positions. The shifting of the latter relay contact will extinguish the "Initial" welding current lamp 582 and will again illuminate the "Second" welding current lamp 584. The shifting of the movable relay contact 446 to its lower position will disconnect the positive terminal 442 of the voltage regulator from the base of the transistor 900 of the amplifier 448 and will connect that base to the negative terminal 440 of that voltage regulator through adjustable resistor 464, resistor 466, stationary and movable relay contacts 468 and 470, stationary and movable relay contacts 444 and 446, and junctions 456 and 489.

As a result, a negative-going signal will be applied to the base of the transistor 900 of the amplifier 448; and current will start flowing from the positive terminal 442 of the voltage regulator via resistor 486, junctions 485 and 484, Zener diode 482, junctions 480 and 458, capacitor 454, junction 456, movable and fixed relay contacts 446 and 444, movable and fixed relay contacts 470 and 468, resistor 466, adjustable resistor 464, and conductor 416 to the negative terminal 440 of the voltage regulator. Also, current will start flowing through resistor 486, past junctions 485 and 484, through Zener diode 482, past junctions 480 and 458 and terminal 968 of the amplifier 448, and through the transistor 970 and resistor 972 of that amplifier to the negative terminal 440 of the voltage regulator. The negative-going signal at the base of the transistor 900 of the amplifier 448 will cause that amplifier to move the terminal 968 thereof in the positive direction; and the flow of current through the capacitor 454 will make the left-hand terminal thereof progressively negative relative to the right-hand terminal thereof. As indicated hereinbefore, the adjustable resistor 464 has a large resistance; and that adjustable resistor will coact with the capacitor 454 and with the resistors 466 and 486 to provide a time constant of several seconds. At the end of the said several seconds, the voltage drop across the capacitor 454 will make the cathode of the diode 452 about one-half of a volt negative relative to the anode of that diode; and thereupon that diode will become conductive. At such time, the current which was flowing through the capacitor 454 will be diverted through the diode 452, and the resulting current flow through that diode will keep the voltage at the terminal 968 of the amplifier 448 from moving further in the positive direction. As a result, the amplifier 448 will reach a state of equilibrium.

If, at this time, the voltage at the movable contact 516 is exactly the same as the voltage which appeared at the junction 556 when the knob 617 of the program control switch was in its "Initial" position, namely a voltage of about minus eighteen and three-quarter volts, the amplifier 490 needs no further adjustment. However, if the voltage at the movable contact 516 is not exactly the same as the voltage which appeared at the junction 556 when the knob 617 of the program control switch was in its "Initial" position, the slider on the adjustable resistor 512 must be adjusted until the required voltage appears at the movable contact 516.

If the slider of the adjustable resistor 512 had to be shifted, it will be desirable to check the adjustment of the movable contact of the potentiometer 498 which was made when the knob 617 of the program control switch was in its "Initial" position. If, when that check is made, the voltage at the cathode of the diode 514 is about minus one-quarter of a volt, the amplifier 490 needs no further adjustment. However, if that voltage is appreciably different from minus one-quarter of a volt, the position of the movable contact of the potentiometer 498 must be adjusted to re-establish that voltage at the cathode of the diode 514. Thereafter, the knob 617 of the program control switch will have to be shifted, once again, to its "Second" position to make sure that the voltage at the movable contact 516 is exactly the same as the voltage which appears at the junction 556 when the knob 617 is in its "Initial" position. If the required voltage does not appear at the voltage of the movable contact 516, a further adjustment will be made in the position of the slider of the adjustable resistor 512.

At this time the knob 617 of the program control switch can be shifted to its "Finish" position; and thereupon current will flow from the positive terminal 132 in FIG. 1 via conductor 128, relay coil 592, resistor 594, junction 596, movable contact 598, and the lowermost fixed contact 600 to the common return of the circuit, while further current will flow from the positive terminal 132 in FIG. 1 via conductor 128, relay coil 610, resistor 612, junction 614, movable contact 616, and the lowermost fixed contact 618 to that common return. The resulting energization of those relay coils will cause the movable relay contacts 446 and 576 and the movable relay contacts 470, 546, 570 and 608 to be in their lower positions. The movable relay contact 608 will establish a holding circuit for the relay coil 592 via conductor 128, relay coil 592, resistor 594, junctions 596 and 604, and fixed and movable relay contacts 606 and 608 to the common return of the circuit; and that holding circuit will make certain that the relay coil 592 is energized whenever the relay coil 610 is energized. The movable relay contact 570 will illuminate the "Finish" welding current lamp 586 in the programming device and will extinguish the "Initial" and "Second" welding current lamps 582 and 584. The movable relay contact 546 will disconnect the movable contact of the potentiometer 552 from the upper input of the summing amplifier 658 and will connect the movable contact of the potentiometer 554 to that upper input. The movable relay contacts 446 and 470 will connect the base of the transistor 900 of the amplifier 448 to the positive terminal 442 of the voltage regulator via adjustable resistor 474, resistor 476, fixed and movable relay contacts 472 and 470, fixed and movable relay contacts 444 and 446, and junctions 456 and 489.

As a result, a positive-going signal will be applied to the base of that transistor; and current will start flowing from the positive terminal 442 of the voltage regulator via adjustable resistor 474, resistor 476, fixed and movable relay contacts 472 and 470, fixed and movable relay contacts 444 and 446, junction 456, capacitor 454, junction 458, terminal 968 of amplifier 448, transistor 970 and resistor 972 of that amplifier, and thence to the negative terminal 440 of the voltage regulator. The positive-going signal at the base of the transistor 900 of the amplifier 448 will cause that amplifier to move the terminal 968 thereof in the negative direction; and the flow of current through the capacitor 454 will make the right-hand terminal thereof progressively negative relative to the left-hand terminal thereof. The adjustable resistor 474 has a large resistance, and that adjustable resistor will coact with the capacitor 454 and with the resistor 476 and the resistor 972 of the amplifier 448 to provide a time constant of several seconds. At the end of the said several seconds, the voltage at the right hand terminal of the capacitor 454 will become sufficiently negative relative to the voltage at the left-hand terminal of that capacitor to cause the cathode of the diode 488 to become about one-half of a volt negative relative to the anode of that diode. Thereupon, that diode will become conductive, and the current which was flowing through the capacitor 454 will be diverted through the diode 488. The resulting current flow through that diode will keep the voltage at the terminal 968 of the amplifier 448 from moving further in the negative direction. As a result, that amplifier will reach a state of equilibrium. At this time, the voltage at the junction 556 will be exactly the same as the voltage which appeared at that junction when the knob 617 of the program control switch was in its "Initial" position, because the amplifier 448 will always establish the same voltage at the junction 556 when the upper input thereof is connected to the positive terminal 442 of the voltage regulator.

If desired, the knob 531 of the "Remote-Local" switch can be set in its "Remote" position, and the knob 617 of the program control switch can be set in its "Second" position. The shifting of the knob 531 will cause the movable contact 516 to disconnect the anode of the diode 514 from the potentiometer 524 and to connect that anode to the potentiometer 522, and will cause the shifting of the movable contact 528 to disconnect the movable contact of the potentiometer 524 from the resistor 532 and to connect the movable contact of the potentiometer 522 to that resistor. Also, the shifting of the knob 531 will shift the movable contact 58 up into engagement with the fixed contact 56 and will shift the movable contact 78 up into engagement with the fixed contact 74. As the movable contact 58 moves up out of engagement with the fixed conatct 54, the holding circuit of the relay coil 44 and of the lamp 82 will be broken. Thereupon, the relay contacts 64, 84, 86 and 88 will re-open and will de-energize the magnetic amplifiers 150, 164 and 178 and will de-energize the transformer 114, thereby de-energizing the voltage regulator of FIG. 5, the ignition circuit 312, and the "on" lamp 568.

The operator will then press the push button 72, thereby completing a circuit which extends from the right-hand end of the secondary winding 32 via junction 36, relay coil 44, junctions 46, 48 and 80, movable and fixed contacts 78 and 74, push button 72, junction 70, fixed and movable contacts 56 and 58, push button 60, thermostatic switch 62, and junction 34 to the left-hand end of that secondary winding. Also, the pressing of that push button will illuminate the "on" lamp 82 in the remote control by a circuit which extends from the right-hand terminal of the secondary winding 32 via junctions 36 and 38, lamp 82, junction 80, movable and fixed contacts 78 and 74, push button 72, junction 70, fixed and movable contacts 56 and 58, push button 60, thermostatic switch 62, and junction 34 to the left-hand terminal of that secondary winding. The energization of the relay coil 44 will cause the relay contacts 64, 84, 86 and 88 to close, once again; and thereupon the power transformer 92 will cause current to flow to the output windings 152, 166 and 180, respectively, of the magnetic amplifiers 150, 164 and 178. That power transformer also will cause current to flow to the transformer 114; and that transformer will illuminate the "on" lamp 568 in the programming device and will coact with the bridge rectifier 122 to supply D.C. to the voltage regulator of FIG. 5, to the four-transistor amplifier of FIG. 4, and to the left-hand terminals of the relay coils 592, 610, 634 and 646 of FIG. 3.

Because the program control switch is in its "Second" position, the movable contact 598, the third-uppermost contact 600, and the jumper 602 will effect energization of the relay coil 592, while the movable contact 616 and the third-uppermost contact 618 will permit the relay coil 610 to be de-energized. The movable relay contact 576 will illuminate the "Second" welding current lamp 584, and the movable relay contact 446 will connect the base of the transistor 900 of the amplifier 448 to the negative terminal 440 of the voltage regulator via junctions 489 and 456, movable and fixed relay contacts 446 and 444, movable and fixed relay contacts 470 and 468, resistor 466, adjustable resistor 464, and the conductor 416.

As a result, a negative-going signal will be applied to the base of the transistor 900 of the amplifier 448, and current will flow through the capacitor 454 and through the transistor 970 of that amplifier, all as explained hereinbefore in connection with the alignment of that amplifier. After a period of several seconds, the amplifier 448 will reach a state of equilibrium; and, at this time, the voltage at the movable contact 516 should be exactly the same as it was when the knob 617 was in its "Second" position and the knob 531 was in its "Local" position, because the potentiometers 522 and 524 are made to have precisely the same resistance.

The shifting of the "Remote-Local" switch to its "Remote" position can interrupt the holding circuit of the relay coil 44, because the movable contact 58 will shift out of engagement with the fixed contact 54 before it shifts into engagement with the fixed contact 56. This is desirable because the operator of the electric welder may want to turn off that electric welder while he moves from a position adjacent that electric welder to a position adjacent the workpiece. However, it would be undesirable for the shifting of the program control switch from its "Second" position to its "Finish" position or from its "Finish" position to its "Second" position to permit the relay coil 592 to become de-energized. Consequently, the present invention uses a shorting-type program control switch; and the movable contact 598 or that switch will engage the third-uppermost fixed contact 600 before it leaves the second-uppermost fixed contact 600, and that movable contact will engage that second-uppermost contact before it leaves that third-uppermost fixed contact.

The alinement of the programming device will now be complete; and that programming device will provide a voltage of about minus eighteen and three-quarters volts at the junction 556 and will provide a voltage of about minus one-quarter of a volt at the cathodes of the diode 514 whenever the program control switch is in its "Initial" or "Finish" position. Further, that programming device will provide a voltage of about minus one-quarter of a volt at the cathode of the diode 558 and will provide a voltage of about minus eighteen and three-quarters volts at the movable contact 516 whenever the program control switch is in its "Second" position.

*Alinement of electric welder*

The serially-connected adjustable resistor 322 and fixed resistors 324, 326 and 328 are intended to coact with the current transformers 272, 284 and 296 and with the bridge rectifiers 276, 288 and 300 to provide a voltage that is proportional to the current flowing through the output windings 152, 166 and 180, respectively, of the magnetic amplifiers 150, 164 and 178. Where the serially-connected adjustable resistor 322 and fixed resistors 324, 326 and 328 are to be incorporated within an electric welder that is intended to provide a maximum output of three hundred amperes, a desirable range of voltages will be developed across the serially-connected adjustable resistor 322 and fixed resistors 324, 326 and 328 as the current flowing through those output windings is varied. Similarly, where the serially-connected adjustable resistor 322 and fixed resistors 324, 326 and 328 are to be incorporated within an electric welder that is intended to provide a maximum output of two hundred amperes, a usable range of voltages will be developed across the serially-connected adjustable resistor 322 and fixed resistors 324, 326 and 328 as the current flowing through the output windings 152, 166 and 180 is varied. However, where the serially-connected adjustable resistor 322 and fixed resistors 324, 326 and 328 are to be incorporated within an electric welder that is intended to provide a maximum output of four hundred amperes, too high a range of voltages would be developed across the serially-connected adjustable resistor 322 and fixed resistors 324, 326 and 328 as the current flowing through the output windings 152, 166 and 180 was varied; and hence where the serially-connected adjustable resistor 322 and fixed resistors 324, 326 and 328 are to be incorporated within an electric welder that is intended to provide a maximum output of four hundred amperes, the slider of the adjustable resistor 322 will be set at the right-hand end of that resistor. For purposes of illustration, it will be assumed that a four hundred ampere electric welder is being alined; and hence the slider of the adjustable resistor 322 will be shifted to the right-hand end of that resistor. Before shifting that slider, the operator should shut off the electric welder, as by pressing the push button 60 in FIG. 1.

At this time, the movable contact of the potentiometer 680 in FIG. 4 will be shifted to the left-hand end of that potentiometer. Thereupon the current, flowing from the positive terminal 442 of the voltage regulator via conductor 418, resistor 682, potentiometer 680, resistor 678, junction 664, terminal 968 of the summing amplifier 658, transistor 970 and resistor 972 of that amplifier, junction 957, and thence to the negative terminal 440 of that voltage regulator, will make the movable contact of that potentiometer, and hence the anode of the diode 692, negative. As a result, that diode will be rendered non-conductive.

The operator should then adjust the dial 553 of the "Initial" welding potentiometer 552 to call for the supplying of five amperes to the output terminals 222 and 254 of the electric welder. An adjustable load should then be connected across those output terminals, and that load should be adjusted to have a resistance of eight ohms. At this time, the operator should press the push button 50 to re-energize the programming device and electric welder; and he should then adjust the movable contact of the potentiometer 562 until the ammeter 224 reads five amperes. At this time, the voltmeter 241 should read forty volts.

The resistance of the load should then be changed to four tenths of an ohm, and the dial 553 should be adjusted to call for the supplying of one hundred amperes to that load. The slider of the adjustable resistor 674 should then be adjusted until the ammeter 224 reads one hundred amperes. At this time, the voltmeter 241 should again read forty volts. This adjustment of the slider of the adjustable resistor 674 will enable the summing amplifier 658 to operate as a linear amplifier.

It will be noted that the adjustment of the movable contact of the potentiometer 562 and that the adjustment of the slider of the adjustable resistor 674 were made when substantial voltages existed across the output terminals 222 and 254. Since D.C. circulating currents do not flow when such voltages exist across those output terminals, the position of the movable contact of the potentiometer 266 did not affect those adjustments. However, since arcs can approximate short circuits, and since D.C. circulating currents flow when the output terminals 222 and 254 are "shorted," it will be necessary to adjust the position of the movable contact of the potentiometer 266. In making that adjustment, the output terminals 222 and 254 will be "shorted"; and, thereupon, the meter 224 will read more than one hundred amperes. The movable contact of the potentiometer 266 should then be adjusted to make that meter read one hundred amperes.

The resistance of the resistor 264 is selected so any D.C. circulating current flowing through that resistor will provide a voltage-to-current ratio which is comparable to the ratio of the voltage across the serially-connected adjustable resistor 322 and the fixed resistors 324, 326 and 328 to the currents flowing through the output windings 152, 166 and 180 of the magnetic amplifiers 150, 164 and 178. The potentiometer 266 is connected in parallel with the resistor 264 so it can provide a vernier-like adjustment of the voltage across the upper section of that potentiometer, and can thereby make the ratio between that voltage and the D.C. circulating current exactly the same as the ratio of the voltage across the serially-connnected adjustable resistor 322 and the fixed resistors 324, 326 and 328 to the currents flowing through the output windings 152, 166 and 180 of the magnetic amplifiers 150, 164 and 178. The voltage across the upper section of the potentiometer 266 will be applied to the base of the transistor 900 of the pre-amplifier 706, and the voltage across the serially-connected adjustable resistor 322 and the fixed resistors 324, 326 and 328 will be applied to that base. Those voltages will be additive and will thereby apply to the base of the transistor 900 of the pre-amplifier 706 a signal that is truly representative of the total current flowing to the output terminals 222 and 254.

When magnetic amplifiers are operated adjacent the upper ends of their output ranges, their sensitivities to applied signals decrease. The present invention compensates for the decreased sensitivities of magnetic amplifiers by providing a diode function generator which will increase the magnitudes of the signals that are applied to the magnetic amplifiers 150, 164 and 178. The diode function generator includes the diode 692, the potentiometer 680, the adjustable resistor 696, and the fixed resistors 678, 682, 700 and 698.

To adjust that diode function generator, the load that is connected across the output terminals 222 and 254 should be adjusted to have a resistance of two-tenths of an ohm; and the dial 553 should be adjusted to call for progressively larger output currents. As that dial is so adjusted, the settings of that dial should be compared with the readings of the meter 224. When the readings of the meter begin to lag behind the settings of the dial, further advancement of that dial should be halted, and the setting of that dial should be carefully recorded. If the setting of the dial 553 reaches two hundred amperes before the settings of that dial begin to lag behind the readings of the meter 224, the value of the adjustable load connected across the output terminals 222 and 254 should be reduced to fifteen-hundredths of an ohm.

At this time, the slider of the adjustable resistor 696 should be moved to the left-hand end of that adjustable resistor, because such movement will increase the sensitivity of the diode function generator; and an increased sensitivity will facilitate the adjusting of that diode function generator. The movable contact of the potentiometer 680 will then be adjusted until the reading on the meter 224 starts to increase; and then further movement of that movable contact will be halted. At this time the value of the adjustable load should be carefully recorded; and this means that the setting of dial 553 and the value of the adjustable load, when the potentiometer 680 started to increase the current level, will have been recorded.

Thereupon, the dial 553 will be set at the welder's maximum current level; and, as that dial is so set, the resistance of the adjustable load will be reduced. Specifically, that resistance should be two-tenths of an ohm until the dial setting reaches two hundred amperes, it should be fifteen-hundredths of an ohm when the dial setting is between two hundred and three hundred amperes, and it should be one-tenth of an ohm when the dial setting is above three hundred amperes. The exact values of the adjustable load are not critical, because the reductions in the resistance of that load are made principally to keep the voltage across the output terminals 222 and 254 from exceeding forty-five volts. While the dial 553 is at its maximum setting, the slider of the adjustable resistor 696 will be moved to right; and that slider will be moved until the reading on the meter 224 matches the setting of the dial 553.

At this time, the dial 553 will be returned to its previously-recorded setting, and the resistance of the adjustable load will be made to equal its recorded value. The movable contact of the potentiometer 680 will then be adjusted to make the reading on the meter 224 match the reading on the dial 553. Thereafter, the dial 553 will, once again, be shifted to its maximum setting and the slider of the adjustable resistor 696 will, once again, be shifted to make the reading on the meter 224 match the setting of that dial. The settings of the movable contact of the potentiometer 680 and of the slider of the adjustable resistor 696 will continue to be alternately adjusted until the readings on the meter 224 match the settings of the dial 553.

At this time, the adjustment of the electric welder will be complete. Consequently, the operator should then press the push button 60 to de-energize the electric welder and should disconnect the adjustable load from the output terminals 222 and 254.

*Brief description of operation of electric welder and programming device*

Referring to the simplified diagram of FIG. 9, the numeral 974 generally denotes the voltage regulator of FIG. 5; and that voltage regulator provides a precisely-controlled positive voltage of twenty-eight volts at the termivoltage of twenty-eight volts at the terminal 440. The numeral 978 generally denotes the magnetic amplifiers 150, 164 and 178 of FIG. 2 and their associated diodes, current transformers, bridge rectifiers and resistors.

The summing amplifier 658 has the upper input thereof connectable to the movable contact of the potentiometer 524 or to the movable contact of the potentiometer 522 by the movable contact 528, and also has that input connectable to the movable contact of the potentiometer 552 or to the movable contact of the potentiometer 554 by the movable contact 546. The potentiometer 552 is intended to provide an adjustable reference voltage whenever the initial welding current is to be supplied, either the potentiometer 524 or the potentiometer 522 is intended to provide an adjustable reference voltage whenever the second welding current is to be supplied, and the potentiometer 554 is intended to provide an adjustable reference voltage whenever the finish welding current is to be supplied. The summing amplifier 658 will selectively respond to the reference voltages, provided by the various potentiometers 552, 524, 522 and 554 to provide signals for the pre-amplifier 706. That pre-amplifier will respond to those signals to supply approprite signals to the magnetic amplifiers represented by the numeral 978; and those magnetic amplifiers will respond to those signals to vary the impedances thereof and thereby provide the desired welding current levels.

The potentiometer 522 is disposed within the remote control, and it will be connected to the upper input of the summing amplifier 658 only when the movable contact 528 is shifted out of the position shown by FIGS. 3 and 9. That shifting will occur only when the operator of the electric welder and programming device wishes to control the operation of the electric welder and programming device while he is standing immediately adjacent the workpiece. Further, the action of the potentiometer 522 is the same as the action of the potentiometer 524. Consequently, the potentiometer 522 need not be discussed in detail at this point.

FIG. 9 shows the upper input of the summing amplifiers 658 simultaneously connected to the movable contacts of the potentiometers 552 and 524. Yet that summing amplifier must, under all steady state conditions, respond to just one reference voltage. FIG. 9 also shows that whenever the movable contact 546 is shifted into engagement with the fixed contact 550, the upper input of the summing amplifier 658 will be simultaneously connected to the movable contacts of the potentiometers 524 and 554. Yet, as indicated hereinbefore, that summing amplifier must, under all steady state conditions, respond to just one reference voltage.

The present invention makes it possible for the upper input of the summing amplifier 658 to be simultaneously connected to the movable contacts of the potentiometers 552 and 524 and yet have that summing amplifier respond to just the reference voltage provided by the potentiometer 552, by causing the integrating operational amplifier 448 and the inverting operational amplifier 490 and their associated circuitry to keep the potentiometer 524 from providing a reference voltage whenever the potentiometer 552 is providing a reference voltage on a steady state basis. Similarly, the present invention makes it possible for the upper input of the summing amplifier 658 to be simultaneously connected to the movable contacts of the potentiometers 552 and 524 and yet have that summing amplifier respond to just the reference voltage provided by the potentiometer 524 by causing the integrating operational amplifier 448 and the inverting operational amplifier 490 and their associated circuitry to keep the potentiometer 552 from providing a reference voltage whenever the potentiometer 524 is providing a reference voltage on a steady state basis. Also, the present invention makes it possible for the upper input of the summing amplifier 658 to be simultaneously connected to the movable contacts of the potentiometers 554 and 524 and yet have that summing amplifier respond to just the reference voltage provided by the potentiometer 554, by causing the integrating operational amplifier 448 and the inverting operational amplifier 490 and their associated circuitry to keep the potentiometer 524 from providing a reference voltage whenever the potentiometer 554 is providing a reference voltage on a steady state basis.

As has been explained in detail hereinbefore, the engagement of movable contact 446 with the fixed contact 443 will apply a positive voltage to the upper input of the integrating operational amplifier 448; and that amplifier and its associated circuitry will respond to that positive voltage to establish a relatively large negative voltage, as for example about nineteen and one-quarter volts, at the junction 480, while also responding to that positive voltage to establish a slightly negative voltage, as for example about one and one-quarter volts, at the junction 485. The relatively large negative voltage at the junction 480 will render the diode 558 conductive; and hence current will flow upwardly from the common return of the circuit through the lower sections of the potentiometers 552 and 554, through the diode 558, and then through the last stage of the amplifier 448 to the negative terminal 440 of the voltage regulator. Because of the voltage drop across the diode 558, the voltage at the tops of the potentiometers 552 and 554 will be a negative voltage of about eighteen and three-quarters volts. The movable contacts of those potentiometers will be able to select any voltage between zero and minus eighteen and three-quarters volts; but the summing amplifier 658 will be completely isolated from the voltage at the movable contact of the potentiometer 554 by the movable contact 546. The slightly negative voltage at the junction 485 will be applied to the upper input of the inverting operational amplifier 490; and that voltage will cause that amplifier and its associated circuitry to establish a slightly negative voltage, as for example, about one-quarter of a volt, at the cathode of the diode 514. That voltage will keep that diode from being conductive; and hence a reference voltage will not be developed across the potentiometer 524. The overall result is that whenever the movable contacts 446 and 546 are in their upper positions, no reference voltage will be developed across the potentiometer 524, the upper input of the summing amplifier 658 will be completely isolated from the potentiometer 554, and that summing amplifier will be able to respond to the portion, of the reference voltage across the potentiometer 552, which is selected by the movable contact of that potentiometer. That summing amplifier will then coact with the pre-amplifier 706 to enable the magnetic amplifiers, represented by the numeral 978, to provide the desired initial welding current level.

If the movable contact 546 is left in its upper position, and the movable contact 470 is in its upper position, but the movable contact 446 is shifted down to its lower position, a negative voltage will be applied to the upper input of the integrating operational amplifier 448. That negative voltage will cause that amplifier and its associated circuitry to establish a slightly negative voltage, as for example about one-quarter of a volt, at the junction 480, while also causing that amplifier and its associated circuitry to establish a relatively large positive voltage, as for example about seventeen and three-quarters volts, at the junction 485. The slightly negative voltage at the junction 480 will render the diode 558 non-conductive; and hence a reference voltage will not be developed across either of the potentiometers 552 and 554. The relatively large positive voltage at the junction 485 will cause the inverting operational amplifier 490 and its associated circuitry to establish a relatively large negative voltage, as for example about nineteen and one-quarter volts, at the junction 508; and that voltage will render the diode 514 conductive. Consequently, current will then flow upwardly from the common return of the circuit through the potentiometer 524, through the diode 514, and then through the last stage of the amplifier 490 to the negative terminal 440 of the voltage regulator of FIG. 5. Because of the voltage drop across the diode 514, the voltage at the top of the potentiometer 524 will be a negative voltage of about eighteen and three-quarters volts. The movable contact of that potentiometer will thus be able to select any voltage between zero and minus eighteen and three-quarters volts. The overall result is that whenever the movable contacts 470 and 546 are in their upper positions but the movable contact 446 is in its lower position, a reference voltage will not be developed across either of the potentiometers 552 and 554, and the upper input of the summing amplifier 658 will be able to respond to the portion, of the reference voltage developed across the potentiometer 524, which is selected by the movable contact of that potentiometer. That summing amplifier will then coact with the pre-amplifier 706 to enable the magnetic amplifiers, represented by the numeral 978, to provide the desired second welding current level.

If the movable contacts 446, 470 and 546 are all placed in their lower positions, a positive voltage will be applied to the upper input of the integrating operational amplifier 448; and that amplifier and its associated circuitry will respond to that positive voltage to establish a relatively large negative voltage, as for example about nineteen and one-quarter volts, at the junction 480, while also responding to that positive voltage to establish a slightly negative voltage, as for example about one and one-quarter volts, at the junction 485. The relatively large negative voltage at the junction 480 will render the diode 558 conductive; and hence current will flow upwardly from the common return of the circuit through the resistances of the potentiometers 552 and 554, through the diode 558, and then through the last stage of the amplifier 448 to the negative terminal 440 of the voltage regulator. Because of the voltage drop across the diode 558, the voltage at the tops of the potentiometers 552 and 554 will be a negative voltage of about eighteen and three-quarters volts. The movable contacts of those potentiometers will be able to select any voltage between zero and minus eighteen and three-quarters volts; but the summing amplifier 658 will be completely isolated from the voltage at the movable contact of the potentiometer 552 by the movable contact 546. The slightly negative voltage at the junction 485 will be applied to the upper input of the inverting operational amplifier 490; and that voltage will cause that amplifier and its associated circuitry to establish a slightly negative voltage, as for example about one-quarter of a volt, at the cathode of the diode 514. The voltage will keep that diode from being conductive; and hence a reference voltage will not be developed across the potentiometer 524. The overall result is that whenever the movable contacts 446, 470 and 546 are in their lower positions, no reference voltage will be developed across the potentiometer 524, the upper input of the summing amplifier 658 will be completely isolated from the potentiometer 552, and that summing amplifier will be able to respond to the portion, of the reference voltage across the potentiometer 554, which is selected by the movable contact of that potentiometer. That summing amplifier will then coact with the pre-amplifier 706 to enable the magnetic amplifiers, represented by the numeral 978, to provide the desired finish welding current level.

The values of the negative reference voltages established at the tops of the potentiometers 552, 524 and 554 need not be eighteen and three-quarters volts and, instead, could be larger or smaller than eighteen and three-quarters volts. However, whatever reference voltage is selected for one of those potentiometers must be precisely established and maintained whenever that potentiometer is called upon to provide a reference voltage. Further, reference voltages of that exact same value must be precisely established and maintained for the other two potentiometers whenever those potentiometers are called upon to provide a reference voltage. This is important because it makes it possible for identical settings of the movable contacts of those potentiometers to apply the same reference voltages to the upper input of the summing amplifier 658.

It will be noted that whenever one of the potentiometers 552, 524 and 554 was providing a reference voltage for the summing amplifier 658, the other two of those potentiometers were effectively kept from providing a reference voltage for that amplifier. This is important because it means that the welding current level controls are normally non-interacting. As a result, the movable contacts of the potentiometers which are effectively being kept from providing a reference voltage for the summing amplifier 658 can be adjusted while the third potentiometer is providing a reference voltage for that amplifier.

When the programming device of the present invention is causing the electric welder to provide an initial welding current, and it is desirable to have that electric welder provide the second welding current, it is only necessary to shift the movable contact 446 down into engagement with the fixed contact 444. Thereupon, the integrating operational amplifier 448 and its associated circuitry will cause the voltage at the top of the potentiometer 552 to start moving toward zero and will cause the voltage at the top of the potentiometer 524 to start moving toward minus eighteen and three-quarters volts. The time required for those voltages, respectively, to reach zero and minus eighteen and three-quarters volts can be varied by varying the setting of the adjustable resistor 464; and that time can be as short as one-tenth of a second and can be as long as ten and one-tenth seconds. However, regardless of the length of time selected for the change, the rate of change will be linear. This is desirable because a non linear rate of change is more difficult to analyze than is a linear rate of change; and a non-linear rate of change would make it easy to mis-adjust the dials of the adjustable resistors 464 and 474.

When the programming device of the present invention is causing the electric welder to provide the second welding current, and it is desirable to have the electric welder provide the finish welding current, it is only necessary to shift the movable contacts 470 and 546 down into their lower positions, so that all of the movable contacts 446, 470 and 546 are in their lower positions. Thereupon, the integrating operational amplifier 448 and its associated circuitry will cause the voltage at the top of the potentiometer 524 to start moving toward zero and will cause the voltage at the top of the potentiometer 554 to start moving toward minus eighteen and three-quarters volts. The time required for those voltages, respectively, to reach zero and minus eighteen and three-quarters volts can be varied by varying the setting of the adjustable resistor 474; and that time can be as short as one-tenth of a second and can be as long as ten and one-tenth seconds. However, regardless of the length of time selected for the change, the rate of change will be linear. A linear rate of change is desirable, all as indicated hereinbefore.

At the end of the finish welding step the electric welder can be shut off, or it can be re-set to perform a further program of welding. In any such further program of welding, the exact same levels of initial welding current, of second welding current, and of finish welding current will be supplied to the arc unless the settings of the movable contacts of the potentiometers 552, 524 and 554 have been changed. As a result, the electric welder and programming device provided by the invention can exactly and repeatedly reproduce any desired program of welding.

*Full description of electric welder and programming device*

In preparing to operate the programming device and electric welder provided by the present invention, the operator will set the knob 617 of the program control switch in an appropriate position and will set the knob 531 of the "Remote-Local" switch in an appropriate position. For purposes of illustration, it will be assumed that the knob 531 is set in its "Local" position and that the knob 617 is set in its "Initial" position. The operator will then connect the conductors 20, 22 and 24 to a suitable source of three phase, sixty cycle, alternating voltage; and thereupon the transformer 28 will energize the blower motor 40. Pressing of the push button 50 will energize the relay coil 44 and the lamp 82, all as explained hereinbefore in the section entitled "Alinement of Programming Device." The energization of the relay coil 44 will establish a holding circuit for that coil and for the lamp 82 through the relay contacts 64 and will also energize the primary winding 90 of the power transformer 92 through the relay contacts 84, 86 and 88. The secondary winding 102 will then apply current to the "on" lamp 568 via junctions 104 and 106 and the conductors 110 and 108, and will also supply current to the "Initial" welding current lamp 582 via junctions 104 and 106, conductors 110 and 108, relay contacts 570, 572, 576 and 578, and junction 588. Also the secondary winding 102 of the power transformer 92 will coact with the transformer 114 and the bridge rectifier 122 to supply a positive voltage of thirty-two volts to the voltage regulator of FIG. 5 and to the upper terminals of the relay coils 592 and 610, and to supply a negative voltage of thirty-two volts to the voltage regulator of FIG. 5 and to the upper terminals of the relay coils 634 and 646. The relay coils 592 and 610 will remain de-energized because the movable contacts 598 and 616 of the program control switch will, respectively, be in engagement with the second-uppermost contacts 600 and 618; and those contacts are not connected to the common return of the circuit. The relay coils 634 and 646 will remain de-energized because the push buttons 640 and 650 isolate the right-hand terminals of those relay coils from the common return of the circuit. The voltage regulator of FIG. 5 will, however, be energized and will establish and maintain a precisely-regulated, positive voltage of twenty-eight volts at the output terminal 442 thereof and will establish and maintain a precisely-regulated negative voltage of twenty-eight volts at the output terminal 440 thereof.

For purposes of illustration, it will be assumed that the dial 553 of the "Initial" welding current potentiometer 552 is set to call for fifty amperes, that the dial 465 of the adjustable resistor 464 calls for a five second transition from the "Initial" welding current to the "Second" welding current, that the dial 525 of the "Second" welding current potentiometer 524 is set to call for one hundred and fifty amperes, that the dial 475 of the adjustable resistor 474 calls for a two second transition from the "Second" welding current to the "Finish" welding current, that the dial 555 of the "Finish" welding current potentiometer 554 is set to call for one hundred amperes, that the movable contact of the potentiometer 542 is set to call for an increase in output current of fifty amperes, that the slider of the adjustable resistor 862 is set to call for that increase in output current to continue for two-tenths of a second, and that the switch 736 is closed.

After the push button 50 was pressed, the source of radio frequency current, not shown, was energized by a suitable means, not shown; and that source will cause sparks to pass between the electrode and the workpiece. The resulting ionization of the air or gas intermediate that electrode and that workpiece will enable current from the output windings 152, 166 and 180 of the magnetic amplifiers 150, 164 and 178 to flow through the conductors 195 and 230 and between the electrode and workpiece. The level of that current will initially be very low, preferably between three and five amperes, because the ignition circuit 312 will be applying a large negative voltage to the base of the transistor 900 of the pre-amplifier 706; and that negative voltage will enable that pre-amplifier and the four-transistor amplifier of FIG. 4 to cause current to flow through the control windings 154, 168 and 182 of the magnetic amplifiers 150, 164 and 178 and hold down the levels of the output currents of those magnetic amplifiers. Specifically, the large negative from the ignition circuit 312 will cause the pre-amplifier 706 to move the terminal 968 thereof in the positive direction, thereby applying a large positive-going signal to the bases of the transistors 738, 740, 742 and 744 of the four-transistor amplifier of FIG. 4. The conductivities of those transistors will then decrease substantially; and thereupon current will flow from the positive terminal 132 in FIG. 1 via conductor 128, junction 779 in FIG. 4, resistor 776, junctions 770, 772 and 774, conductor 344, choke 342, and serially-connected control windings 182, 168 and 154 to the common return of the circuit, thereby holding the output currents of the magnetic amplifiers 178, 164 and 150 to about three to five amperes. As a result, the workpiece and the electrode will be protected against injury due to the application to them of the full output of the electric welder during the initiation and establishment of the arc.

As the voltage regulator of FIG. 5 establishes a positive voltage of twenty-eight volts at the terminal 442 thereof, a positive-going signal will be applied to the base of the transistor 900 of the integrating operational amplifier 448; and that amplifier and its associated circuitry will respond to that signal to cause the voltages at the junctions 480 and 485 to start moving in the negative direction. The values of the resistor 439 and of the capacitor 454 will determine the rate at which those voltages will move in the negative direction but, preferably, the resistance of the resistor 439 will be small enough to permit the voltage at the junction 480 to reach a value of about minus nineteen and one-quarter volts and the voltage at the junction 485 to reach a voltage of about minus one and one-quarter volts within six cycles of the A.C. supplied by the source of alternating voltage. The integrating operational amplifier 448 and its associated circuitry will thereafter maintain those voltages at those junctions; and the inverting operational amplifier 490 will respond to the minus one and one-quarter volts at the junction 485 to establish and maintain a voltage of about minus one-quarter of a volt at the cathode of the diode 514. The latter voltage will render that diode non-conductive; and the voltage of about minus nineteen and one-quarter volts at the junction 480, and hence at the cathode of the diode 558, will render that diode conductive. Immediately, current will flow from the common return of the circuit through the potentiometer 552, past junction 556, through diode 558, past junctions 480 and 458, past terminal 968 of the amplifier 448, through transistor 970 and resistor 972 of that amplifier, past junction 957, and thence conductor 416 to the negative terminal 440 of the voltage regulator.

At this time, the voltage at the left-hand end of the potentiometer 552 in FIG. 3 will be about minus eighteen and three-quarters volts; and the voltage at the movable contact of that potentiometer will be between zero and minus eighteen and three-quarters volts. As a result, a negative-going signal will be applied to the base of the transistor 900 of the summing amplifier 658 by the fixed and movable relay contacts 548 and 546, resistor 544, junctions 538 and 534, conductor 536 and junction 676. That amplifier will respond to that signal to make the terminal 968 thereof move in the positive direction, and hence a positive-going signal will be applied to the base of the transistor 900 of the pre-amplifier 706 by junction 664, Zener diode 666, junctions 668 and 670, resistor 688, and junctions 690, 702, 710, 712 and 714.

Also, at this time, current will flow from the common return of the circuit through the potentiometer 542 in FIG. 3, through conductor 348 which extends to the collector of the transistor 877 of the ignition circuit 312, through that transistor, past junctions 876 and 886, through resistor 892, past junction 826, and thence through the conductor 416 to the negative terminal 440 of the voltage regulator. That flow of current will make the voltage at the movable contact of that potentiometer negative, and will enable that movable contact to apply a negative-going signal to the base of the transistor 900 of the summing amplifier 658 via resistor 540, junctions 538 and 534, conductor 536 and junction 676. That negative-going signal will cause that amplifier to move the terminal 968 thereof in the positive direction; and the resulting positive-going signal will be applied to the base of the transistor 900 of the pre-amplifier 706 by junction 664, Zener diode 666, junctions 668 and 670, resistor 688 and junctions 690, 702, 710, 712 and 714. That positive-going signal will add to the positive-going signal which the summing amplifier 658 provides in response to the negative-going signal from the movable contact of the potentiometer 552.

While the pre-amplifier 706 would normally respond to those positive-going signals to coact with the four-transistor amplifier of FIG. 4 to cause the magnetic amplifiers 150, 164 and 178 to provide a total of output current of one hundred amperes—fifty amperes due to the "Initial" welding current potentiometer 552 and fifty amperes due to the ignition circuit 312—the large negative voltage applied to the base of the transistor 900 of the pre-amplifier 706 by diode 810, conductor 346, switch 736, resistor 734, and junctions 712 and 714 will override those positive-going signals. This means that as the arc is being initiated, the magnetic amplifiers 150, 164 and 178 will supply only very low levels of output current, as for example, three to five amperes.

The output current flowing to the output terminals 222 and 254 will enable the current transformers 272, 284 and 296 to coact with the bridge rectifiers 276, 288 and 300 to establish a voltage across the serially-connected adjustable resistor 322 and the fixed resistors 324, 326 and 328. That voltage will make the junction 330 negative, and will thus apply a negative-going signal to the base of the transistor 794 of the ignition circuit 312. The flow of that output current between the electrode and workpiece will decrease the voltage across the output terminals 222 and 254; and hence the conductor 332 in FIG. 2 will apply a negative-going signal to the base of the transistor 786 of the ignition circuit 312. Very promptly, the base of the transistor 786 or the base of the transistor 794 or both of those bases will become sufficiently negative to cause the transistor 786 or the transistor 794 or both of those transistors to become conductive. Thereupon, as explained hereinbefore, the conductivity of the transistor 800 will decrease substantially; and the voltage at the junction 806 will move in the positive direction and will back-bias the diodes 810 and 838. The back-biasing of the diode 810 will eliminate the large negative voltage which the ignition circuit 312 had been applying to the base of the transistor 900 of the pre-amplifier 706; and, as that voltage is eliminated, the positive-going signals from the summing amplifier 658 will be able to cause the pre-amplifier 706 to coact with the four-transistor amplifier of FIG. 4 to cause the magnetic amplifiers 150, 164 and 178 to increase the output currents thereof to one hundred amperes. Specifically, the pre-amplifier 706 will respond to the positive-going signals from the summing amplifier 658 to apply a negative-going signal to the bases of the transistors 738, 740, 742 and 744, thereby rendering those transistors more conductive. As a result, current will flow from the common return of the circuit via the serially-connected control windings 154, 168 and 182 of FIG. 2, choke 342, conductor 344, junctions 774, 772, 770 and 768 of FIG. 4, parallel-connected emitter resistors 766, 764, 762 and 760 and transistors 744, 742, 740 and 738, junctions 752, 750 and 748, resistor 746, and conductor 130 to the negative terminal 134 in FIG. 1. That current will cause the magnetic amplifiers 178, 164 and 150 to increase the output currents thereof to one hundred amperes. As indicated hereinbefore, fifty amperes of that one hundred amperes will be due to the setting of the dial 553 of the "Initial" welding current potentiometer 552, and the other fifty amperes will be due to the setting of the movable contact 542. The resulting one hundred amperes will quickly and fully establish the arc between the electrode and workpiece.

The back-biasing of the diode 838 of the ignition circuit 312 will permit the capacitors 856 and 858 to discharge; and the flow of current through the adjustable resistor 862 will force those capacitors to discharge while also controlling the rate at which those capacitors discharge. As those capacitors discharge, current will flow from the common return of the circuit through the resistor 864, past junction 848, through diode 846, past junctions 844, 842 and 854, and then through the parallel-connected capacitors 856 and 858 to that common return; and that flow of current will keep the anode of the diode 850 back-biased for two-tenths of a second, and will thus enable the ignition circuit 312 to cause the summing amplifier 658, the pre-amplifier 706, the four-transistor amplifier of FIG. 4, and the magnetic amplifiers 150, 164 and 178 to supply the increased output of fifty amperes for two-tenths of a second. At the end of the two-tenths of a second, the transistor 836 of the Schmitt trigger will become conductive and the transistor 877 will become non-conductive; and, as that happens, the negative voltage at the movable contact of the potentiometer 542 will disappear. As a result, the voltage at the base of the transistor 900 of the summing amplifier 658 will move in the positive direction; and that amplifier will then apply a negative-going signal to the base of the transistor 900 of the pre-amplifier 706. That signal will cause that pre-amplifier 706 to apply a positive-going signal to the bases of the transistors 738, 740, 742 and 744; and that signal will reduce the conductivities of those transistors. However, current will still flow from the common return of the circuit via the serially-connected control windings 154, 168 and 182 of FIG. 2, choke 342, conductor 344, junctions 774, 772, 770 and 768 of FIG. 4, parallel-connected emitter resistors 766, 764, 762 and 760 and transistors 744, 742, 740 and 738, junctions 752, 750 and 748, resistor 746, and conductor 130 to the negative terminal 134 in FIG. 1; and that flow of current will enable the magnetic amplifiers 150, 164 and 178 to make the output currents thereof fifty amperes.

At the time the current transformers 272, 284 and 296 coacted with the bridge rectifiers 276, 288 and 300 to cause a negative-going signal to be applied to the base of the transistor 794 of the ignition circuit 312, those current transformers and those bridge rectifiers also coacted to cause a similar negative-going signal to be applied to the base of the transistor 900 of the pre-amplifier 706 via conductor 340, resistor 704 in FIG. 4, and junctions 702, 710, 712 and 714. That negative-going signal added to the large negative voltage which was being applied to the base of the transistor 900 of the pre-amplifier 706 by the diode 810 of FIG. 6, conductor 346, switch 736 of FIG. 4, resistor 734, and junctions 712 and 714. However, since that large negative voltage had already driven the pre-amplifier 706 as far as it could go in the positive direction, the added negative-going signal is not significant at this time. After one or the other or both of the transistors 786 and 794 of the ignition circuit 312 became conductive and the diode 810 became back-biased, the negative-going signal generated by the current transformers 272, 284 and 296 and the bridge rectifiers 276, 288 and 300 became effective and served to provide negative feedback for the magnetic amplifiers 150, 164 and 178. The current transformers 272, 284 and 296 will coact with the bridge rectifiers 276, 288 and 300 to continue to provide negative feedback for those magnetic amplifiers as long as the arc is maintained; and that negative feedback will help improve the linearity of the responses of those magnetic amplifiers. Further, that negative feedback will help those magnetic amplifiers maintain the "Initial" welding current level set by the "Initial" welding current potentiometer 552, maintain the "Second" welding current level set by the "Second" welding current potentiometer 524, and maintain the "Finish" welding current level set by the "Finish" welding current potentiometer 554 despite variations in line voltage, variations in load voltage, noise, or other transients.

The potentiometers 552, 524 and 554 coact with the summing amplifier 658 to establish predetermined positive reference voltages at the left-hand end of the resistor 688. The current transformers 272, 284 and 296, the bridge rectifiers 276, 288 and 300, and the serially-connected diode 256 and potentiometer 266 coact with the resistors 322, 324, 326 and 328 to provide a negative voltage at the lower end of the resistor 704 which is proportional to the total current flowing through the arc. The resistors 688 and 704, which have equal resistances, have the adjacent ends thereof connected to each other and to the upper input of the pre-amplifier 706; and whenever the voltage at the lower end of resistor 704 differs in magnitude from the reference voltage at the left-hand end of the resistor 688, a signal will be applied to the upper input of the pre-amplifier 706 which will enable that pre-amplifier, the four-transistor amplifier of FIG. 4, and the magnetic amplifiers 150, 164 and 178 to change the welding current level until the voltage at the lower end of the resistor 704 substantially equals the reference voltage. At this time, the welding current level will substantially equal the setting on the dial of the appropriate welding current potentiometer 552, 524 or 554.

As indicated hereinbefore, the amplifier 894 of FIG. 7 can be used as the integrating operational amplifier 448, as the inverting operational amplifier 490, as the summing amplifier 658, and as the pre-amplifier 706. Where that amplifier is used as the integrating operational amplifier 448, its terminals 896, 898 and 968 will, respectively, be connected to junction 489, the movable contact of potentiometer 462, and junction 458. Where that amplifier is used as the inverting operational amplifier 490, its terminals 896, 898 and 968 will, respectively, be connected to junction 494, the movable contact of potentiometer 498, and junction 508. Where that amplifier is used as the summing amplifier 658, its terminals 896, 898 and 968 will, respectively, be connected to junction 676, resistor 564, and junction 664. Where that amplifier is used as the pre-amplifier 706, its terminals 896, 898 and 968 will, respectively, be connected to junction 714, the common return of the circuit, and junction 722.

The overall result of pressing the push button 50 and of then energizing the source of radio frequency currents is that an arc was initiated, the ignition circuit 312 initially limited the current flowing through that arc to form three to five amperes, that ignition circuit subsequently increased the current level to one hundred amperes and maintained that one hundred ampere level for two-tenths of a second, and that ignition circuit then permitted the current to fall to the fifty ampere level set by dial 553. The programming device and electric welder will continue to supply the "Initial" welding current of fifty amperes as long as the operator desires.

When that operator wishes to change from the "Initial" welding current level to the "Second" welding current level, he will shift the knob 617 of the program control switch to its "Second" position. At such time, the relay coil 592 will become energized and will shift the movable relay contacts 446 and 576 down into their lower positions. That shifting of the movable relay contact 576 will extinguish the "Initial" welding current lamp 582 and will illuminate the "Second" welding current lamp 584. The shifting of the movable relay contact 446 will disconnect the base of the transistor 900 of the integrating amplifier 448 from the positive terminal 442 of the voltage regulator and will connect that base to the negative terminal 440 of that voltage regulator. Thereupon, a negative-going signal will be applied to the base of the transistor 900 of the integrating amplifier 448, and current will be caused to flow from right to left through the capacitor 454. The overall result is that the voltage at the junction 556 will start moving towards zero and the voltage at the junction 508 will start moving in the negative direction. As indicated hereinafter, the dial 465 of the adjustable resistor 464 was set to require five seconds for the transistor from the "Initial" welding current level to the "Second" welding current level; and this means that for the said five seconds the voltage at the junction 556 will be moving toward zero and the voltage at the junction 508 will be moving in the negative direction. At the end of the said five seconds, the voltage at the junction 556 will be zero and the voltage at the junction 508 will be about minus nineteen and one-quarter volts. The diode 514 will respond to the latter voltage to become conductive; and thereupon current will flow from the common return of the circuit via potentiometer 524, fixed and movable contacts 518 and 516, diode 514, junctions 508 and 506, terminal 968 of amplifier 490, transistor 970 and resistor 972 of that amplifier, junction 957, and conductor 416 to the negative terminal of the voltage regulator. The voltage at the upper end of the potentiometer 524 will be about minus eighteen and three-quarters volts, and the voltage at the movable contact of the potentiometer 524 will be between zero and minus eighteen and three-quarters volts. As a result, a negative-going signal will be supplied to the upper input of the summing amplifier 658; and that amplifier will then coact with the pre-amplifier 706, the four-transistor amplifier of FIG. 4, and the control winding 154, 168 and 182 to increase the output currents of the magnetic amplifiers 150, 164 and 178. Since the dial 525 of the "Second" welding current potentiometer 524 was set to call for one hundred and fifty amperes, the current level of the electric welder increased at the rate of twenty amperes per second during the transistion period; and, at the end of the said five seconds, the electric welder was delivering one hundred and fifty amperes.

The electric welder will continue to supply the "Second" welding current of one hundred and fifty amperes to the electrode and workpiece as long as the operator of the programming device and electric welder desires. When that operator wishes to change the "Second" welding current level to the "Finish" welding current level, he will shift the knob 617 of the program control switch to its "Finish" position. The relay coil 592 will remain energized during the shifting of that knob, and the relay coil 610 will become energized as that knob reaches its "Finish" position. This means that the movable relay contacts 470, 546, 570 and 608, as well as the movable relay contacts 446 and 576, will be in their lower positions. The shifting of the movable contact 570 to its lower position will extinguish the "Second" welding current lamp 584 and will illuminate the "Finish" welding current lamp 586. The shifting of the movable contact 608 will establish a holding circuit for the relay coil 592, and will thereby make sure that the said relay coil is energized as long as the relay coil 610 is energized. The shifting of the movable relay contact 546 will disconnect the movable contact of the "Initial" welding current potentiometer 552 from the upper input of the summing amplifier 658 and will connect the movable contact of "Finish" welding current potentiometer 554 to that upper input. The shifting of the movable relay contact 470 will disconnect the base of the transistor of the integrating operational amplifier 448 from the negative terminal 440 of the voltage regulator and will connect that base to the positive terminal 442 of that voltage regulator. The resulting positive-going signal at that base will cause that amplifier to start moving the terminal 968 thereof in the negative direction and will cause current to flow from left to right through the capacitor 454. This means that the voltage at the junction 480 will start moving in the negative direction and the voltage at the movable contact 516 will start moving toward zero. Because the dial 475 of the adjustable resistor 474 was set to call for two seconds, the voltage at the junction 480 will be moving in the negative direction and the voltage at the movable contact 516 will be moving toward zero for two seconds. At the end of the said two seconds, the voltage at the movable contact 516 will be zero and the voltage at the junction 480 will be about minus nineteen and one-quarter volts. The diode 558 will respond to the latter voltage to become conductive; and thereupon current will flow from the common return of the circuit via potentiometer 554, junction 556, diode 558, junctions 480 and 458, terminal 968 of amplifier 448, transistor 970 and resistor 972 of that amplifier, junction 957, and conductor 416 to the negative terminal of the voltage regulator. The voltage at the left-hand end of the potentiometer 554 will be about minus eighteen and three-quarters volts, and the voltage at the movable contact of the potentiometer 554 will be between zero and minus eighteen and three-quarters volts. Because the dial 555 of the "Finish" welding current potentiometer 554 was set to call for one hundred amperes, whereas the dial 525 of the "Second" welding current potentiometer 524 was set to call for one hundred and fifty amperes, the negative voltage applied to the upper input of the summing amplifier 658 by the movable contact of the potentiometer 554 will be less than the negative voltage applied to that upper input by the movable contact of the potentiometer 524. As a result, the summing amplifier will coact with the pre-amplifier 706, four-transistor amplifier of FIG. 4, and the control windings 154, 168 and 182 to decrease the output currents of the magnetic amplifier 150, 164 and 178. Those currents will decrease at the rate of twenty-five amperes per second; and at the end of the said two seconds, the electric welder will be supplying a "Finish" welding current of one hundred amperes to the arc.

The operator of the programming device and electric welder can continue to weld with the "Finish" welding current of one hundred amperes as long as he desires. Thereafter, he can push the push button 60 to shut off the electric welder. If that operator subsequently wishes to perform a further welding program, which is identical to the first welding program, he need only return the knob 617 of the program control switch to its "Initial" position, press the push button 50, and then actuate the source of radio frequency currents, not shown. Thereupon, the programming device and electric welder will initiate an arc but will initially hold the current flowing to that arc to a value of between three and five amperes, will then increase the current to one hundred amperes and hold the current at that level for two-tenths of a second, and will thereafter reduce the current to fifty amperes. That programming device and electric welder will then respond to a shifting of the knob 617 to its "Second" position to provide a transition period of five seconds during which the welding current level will rise to one hundred and fifty amperes; and that programming device and electric welder will subsequently respond to the shifting of the knob 617 to its "Finish" position to provide a transition period of two seconds wherein the welding current will be reduced from one hundred and fifty amperes to one hundred amperes.

If, at the conclusion of that further welding program, the operator wishes to promptly perform a still further welding program, which is identical to the first welding program, he need only shift the knob 617 of the program control switch to its "Initial" position. Thereupon, the relay coils 592 and 610 will become de-energized and the movable relay contacts 446, 470, 546, 570, 576 and 608 will assume the upper positions shown by FIG. 3; and the electric welder will start supplying "Initial" welding current. Subsequently, as he desires, that operator can successively shift the knob 617 of the program control switch to its "Second" and "Finish" positions.

If the operator wishes to perform a different welding program, he need only adjust one or more of the dials 465, 475, 553, 555 and 525, to adjust the position of the movable contact of the potentiometer 542, and to adjust the position of the slider of the adjustable resistor 862 in FIG. 6. Regardless of what adjustments are made in the settings of those dials, of that movable contact and of that slider, the programming device and electric welder will initiate the arc with currents that range between three and five amperes, will subsequently provide an increased output for the electric welder, will provide the desired "Initial" welding current level, will respond to a shifting of the knob 617 to its "Second" position to provide the desired transition to the "Second" welding current level, and will subsequently respond to the shifting of that knob to its "Finish" position to provide a transition to the "Finish" welding current level.

If the operator should wish to have the full output of the electric welder applied to the electrode and workpiece during the initiation of the arc, he could open the switch 736 in FIG. 4. The opening of that switch would isolate the base of the transistor 900 of the pre-amplifier 706 from the negative voltage at the junction 806 in the ignition circuit 312 of FIG. 6 but would not interfere with the application of the negative voltage at the movable contact of the potentiometer 542 to the base of the transistor 900 of the summing amplifier 658. As a result, the programming device and electric welder would initially supply to the electrode and workpiece the full output of the magnetic amplifiers 150, 164 and 178, would then supply the increased output set by the movable contact of the potentiometer 542, would maintain that increased output for the time set by the slider of the adjustable resistor 862 in FIG. 6, and would then provide the "Initial" welding current level set by the movable contact of the potentiometer 552.

The operator of the programming device and the electric welder can, if he desires, initiate a welding program and then subsequently change the latter portions of that program. For example, while the programming device and electric welder are supplying the "Initial" welding current, the operator can freely adjust the dials, 465, 475, 525, and 555. This means that the operator can freely vary the transition time which he desires between the "Initial" welding current level and the "Second" welding current level, can freely vary the transition time between the "Second" welding current level and the "Finish" welding current level, and can also freely vary the "Finish" welding current level without in any way affecting the "Initial" welding current level. Also, when the programming device and electric welder are supplying the "Second" welding current, the operator can adjust the dials 475 and 555, and can thereby freely vary the time required for the transition from the "Second" welding current level to the "Finish" welding current level and can freely vary the "Finish" welding current level without in any way affecting the "Second" current welding level.

The programming device and electric welder provided by the present invention will even enable the operator thereof to adjust the setting of the dial 553 of the "Initial" welding current potentiometer 552 while the electric welder is providing the "Initial" welding current. Also, that programming device and electric welder will enable the operator thereof to change the setting of the dial 465 of the adjustable resistor 464 while the welding current level is changing from the "Initial" welding current level to the "Second" welding current level. Further, that programming device and electric welder will enable the operator thereof to change the setting of the dial 525 of the "Second" welding current potentiometer 524 while the electric welder is supplying the "Second" welding current. Furthermore, that programming device and electric welder will enable the operator thereof to change the setting of the dial 475 of the adjustable resistor 474 while the "Second" welding current level is being changed to the "Finish" current level. Moreover, that programming device and electric welder will enable the operator thereof to change the setting of the dial 555 of the "Finish" welding current potentiometer 554 while that electric welder is supplying the "Finish" welding current. As a result, that programming device and electric welder are extremely versatile and make it possible for the operator thereof to provide virtually unlimited combinations of "Initial," "Second" and "Finish" welding current levels and to provide virtually unlimited combinations of transitions from the "Initial" welding current level to the "Second" welding current level and from the "Second" welding current level to the "Finish" welding current level.

It sometimes happens that a welder wishes to perform a welding program which requires more than three welding current levels. The programming device and electric welder provided by the present invention enables the operator thereof to perform a welding program with a limitless number of welding current levels; and it enables him to do so with ease. For example, if it is assumed that the operator of the programming device and electric welder has welded at an "Initial" welding current level of fifty amperes, has welded at a "Second" welding current level of one hundred and fifty amperes, and has welded at a "Finish" welding current level of one hundred amperes, and that he then wishes to weld at a level of two hundred amperes, wishes to change from the one hundred ampere welding current level to the two hundred ampere welding current level in ten seconds, wishes to subsequently weld at a ten ampere welding current level, wishes to change from the two hundred ampere welding current level to the ten ampere welding current level in one second, wishes to weld at a forty ampere welding current level, and wishes to change from the ten ampere welding current level to the forty ampere welding current level in three seconds, that operator need only adjust the dial 553 of the "Initial" welding current potentiometer 552 to call for one hundred amperes, set the dial 465 of the adjustable resistor 464 to call for ten seconds, set the dial 525 of the "Second" welding current potentiometer 524 to two hundred amperes, and then shift the knob 617 to its "Second" position. Thereupon, the relay coil 610 will become de-energized and the movable relay contacts 470, 546, 570 and 608 will move up to their upper positions. The upward movement of the movable relay contact 608 will break the holding circuit for the relay coil 592, but that relay coil will be kept energized by the movable contact 598 and the third-uppermost fixed contact 600. The upward movement of the movable relay contact 570 will extinguish the "Finish" welding current lamp 586 and will re-illuminate the "Second" welding current lamp 584. The upward movement of the moveable relay contact 546 will disconnect the movable contact of the "Finish" welding current potentiometer 554 from the upper input of the summing amplifier 658 and will connect the movable contact of the "Initial" welding current potentiometer 552 to that upper input. The upward movement of the movable relay contact 470 will disconnect the base of the transistor 900 of the amplifier 448 from the positive terminal 442 of the voltage regulator and will connect that base to the negative terminal 440 of that voltage regulator. Thereupon, the amplifier 448 will start moving the terminal 968 thereof in the positive direction and will cause current to flow from right to left through the capacitor 454. As a result, the voltage at the junction 556 will start moving toward zero and the voltage at the movable contact 516 will start moving in the negative direction. Those voltages will continue to move in those directions for ten seconds; and, at the end of said ten seconds, the voltage at the junction 556 will be zero and the voltage at the movable contact 516 will be about minus eighteen and three-quarters volts. Further, the electric welder will be supplying the desired two hundred amperes to the arc.

While the electric welder is supplying the said two hundred amperes to the arc, the dial 555 of the "Finish" welding current potentiometer 554 can be set to call for ten amperes, and the dial 475 of the adjustable resistor 474 can be set to call for one second. When the operator then wishes to change the welding current level from two hundred amperes to ten amperes, he need only shift the knob 617 from its "Second" position to its "Finish" position. As that knob is so shifted, the relay coil 610 will again become energized and the relay coil 592 will remain energized. The downward movement of the movable contact 608 will re-establish the holding circuit for the relay coil 592, and the downward shifting of the movable contact 570 will extinguish the "Second" welding lamp 584 and will re-illuminate the "Finish" welding lamp 586. The downward shifting of the movable relay contact 546 will disconnect the movable contact of the potentiometer 552 from the input of the summing amplifier 658 and will connect the movable contact of the potentiometer 554 to that input. The downward movement of the movable relay contact 470 will disconnect the base of the transistor 900 of the amplifier 448 from the negative terminal 440 of the voltage regulator and will connect that base to the positive terminal 442 of that voltage regulator. Thereupon, that amplifier will cause the terminal 968 thereof to move in the negative direction and current will flow from left to right through the capacitor 454. The voltage at the junction 556 will start moving in the negative direction and the voltage at the movable contact 516 will start moving toward zero. Those voltages will continue to move in those directions for one second; and, at the end of that one second, the voltage at the junction 556 will be about minus eighteen and three-quarters volts and the voltage at the movable contact 516 will be zero. Further, the electric welder will be supplying the desired ten amperes to the arc.

The operator can then set the dial 553 of the "Initial" welding current potentiometer 552 to call for ten amperes, set the dial 465 of the adjustable resistor 464 to call for three seconds, and set the dial 525 of the "Second" welding current potentiometer 524 to call for forty amperes. To change the welding current level from ten amperes to forty amperes, the operator will shift the knob 617 of the program control switch to its "Second" position; and thereupon the relay coil 610 will again become de-energized. The upward movement of the movable relay contact 608 will break the holding circuit for the relay coil 592, but that coil will be held energized by the movable contact 598 and the third-uppermost fixed contact 600. The upward movement of the movable relay contact 570 will extinguish the "Finish" welding current lamp 586 and will re-illuminate the "Second" welding current lamp 584. The upward movement of the movable relay contact 546 will disconnect the movable contact of the potentiometer 554 from the upper input of the summing amplifier 658 and will connect the movable contact of the potentiometer 552 to that upper input. The upward movement of the movable relay contact 470 will disconnect the base of the transistor 900 of the amplifier 448 from the positive terminal 442 of the voltage regulator and will connect that base to the negative terminal 440 of that voltage regulator. Thereupon, the amplifier 448 will start moving the terminal 968 thereof in a positive direction and current will flow from right to left through the capacitor 454. The voltage at the junction 556 will start moving toward zero and the voltage at the movable contact 516 will start moving in the negative direction. Those voltages will continue to move in those directions for three seconds; and, at the end of those three seconds, the voltage at the junction 556 will be zero and the voltage at the movable contact 516 will be about minus eighteen and three-quarters volts. At such time, the electric welder will be supplying the desired forty amperes to the arc. The operator can continue to weld at forty amperes as long as he desires; and he can then either shut off the welder by pressing the push button 60, or can continue to weld at any different level that he desires, as by appropriately manipulating dials 465, 475, 525, 553 and 555 and by shifting the knob 617 of the program control switch.

To keep the arc stable, the operator should, whenever he wishes to shift from the welding current level established by the movable contact of the "Finish" welding current potentiometer 554 to the welding current level established by the movable contact of the "Second" welding current potentiometer 524, adjust the dial 553 of the "Initial" welding current potentiometer 552 to match the setting of the dial 555 of the "Finish" welding current potentiometer 554. Such an arrangement enables the transition, from the welding current level established by the movable contact of the "Finish" welding current potentiometer 554 to the welding current level established by the movable contact of the "Second" welding current potentiometer 524, to start at the same current level which is established by the movable contact of the "Finish" welding current potentiometer 554. As a result the upper input of the summing amplifier 658 will, despite the upward movement of the movable relay contact 546 as the relay coil 610 becomes de-energized, initially receive the same reference voltage that it had been receiving from the "Finish" welding current potentiometer 554. This is important in providing smooth transitions from the "Finish" welding current levels to the "Second" welding current levels.

The integrating operational amplifier 448 has two precisely-fixed voltage limits for its output terminal 968, namely, minus nineteen and three-quarters volts and minus one-quarter of a volt. Further, whenever the programming device and electric welder are in a steady state condition, the output terminal 968 of the amplifier 448 will be at one or the other of its precisely-set voltage limits. Similarly, the inverting operational amplifier 490 has two precisely-fixed voltage limits for its output terminal 968, namely, minus one-quarter of a volt and minus nineteen and three-quarters volts. Further, whenever the programming device and electric welder are in a steady state condition, the output terminal 968 of the amplifier 490 will be at one or the other of its precisely-set voltage limits. In contrast, the summing amplifier 658 can have an infinite number of voltages established at the output terminal 968 thereof. The pre-amplifier 706 can have an infinite number of voltages established at the output terminal 968 thereof; but that output terminal also has voltage limits beyond which it will not be permitted to go. Specifically, the Zener diode 720 which is connected between the junctions 714 and 722 will become conductive whenever the output terminal 968 of the pre-amplifier 706 becomes more than eighteen volts negative; and as that Zener diode becomes conductive it will divert enough current around the pre-amplifier 706 to keep that pre-amplifier from driving its output terminal 968 further in the negative direction. If the output terminal 968 of the pre-amplifier were ever to become more than one-half of a volt positive, the Zener diode 720 would act as an ordinary diode and would feed back enough current to the upper input of the pre-amplifier 706 to keep that pre-amplifier from driving that output terminal further in the positive direction. The provision of these two voltage limits for the output terminal 968 of the pre-amplifier 706 is desirable, because it restricts that pre-amplifier to a range in which it functions very well.

The resistor 730 and the capacitor 732, which are serially-connected between the junctions 710 and 728 also help the pre-amplifier 706 to function well. The capacitor 732 will constitute an infinite impedance to direct current and will constitute a large impedance to low frequency signals while constituting only a small impedance to transients. Because high impedance in a feedback circuit can mean high gain, and because low impedance in a feedback circuit can mean low gain, the capacitor 732 can provide high gain for low frequency signals but will provide low gain for noise and other transients; and this is desirable because it will minimize the possibility of oscillations occurring in the output of the electric welder. As a result, the programming device and electric welder of the present invention will be able to operate on a stable basis.

The Zener diode 724 has the right-hand end thereof connected to the positive terminal 132 of FIG. 1 by junction 726, resistor 778, junction 779 and conductor 128; and current will flow from that positive terminal via conductor 128, junction 779, resistor 778, junction 726, Zener diode 724, junction 722, terminal 968 of the pre-amplifier 706, transistor 970 and resistor 972 of that pre-amplifier, junction 957, and conductor 416 to the negative terminal 440 of the voltage regulator. That current flow will make the left-hand end of that Zener diode six volts negative relative to the right-hand end of that Zener diode, and will thus enable that Zener diode to provide a six volt shifting of the output voltages at the terminal 968 of the pre-amplifier 706. That shifting enables those voltages to provide the desired degrees of conductivity of the transistors 738, 740, 742 and 744 of the four-transistor amplifier of FIG. 4. That four-transistor amplifier is provided with the emitter resistors 760, 762, 764 and 766 to compensate for any variations in the characteristics of the transistors 738, 740, 742 and 744. Specifically, if one of those transistors tends to be more conductive than the others, the increased voltage drop across the emitter resistor of that transistor will make the emitter of that transistor more negative—thereby reducing the conductivity of that transistor. As a result, those emitter resistors help stabilize the operation of that four-transistor amplifier.

It should be noted that the programming device and electric welder provided by the present invention have made it possible to provide welding current levels of less than ten amperes, even though the ignition circuit 312 is connected to the upper input of the pre-amplifier 706. This is important because it means that the said programming device and electric welder have made it possible to provide precisely-controlled initiation of the arc while also making it possible to weld at low current levels. This is in strong contrast to prior programming devices and electric welders wherein the ignition circuits had to be disconnected if low level welding currents were to be supplied without having those ignition circuits recurrently becoming active. In some prior programming devices and electric welders, the ignition circuits had to be disconnected if welding current levels below forty or fifty amperes were to be supplied.

The programming device and electric welder provided by the present invention are enabled to leave the ignition circuit 312 connected to the upper input of the pre-amplifier 706 and yet provide low levels of welding current because of the "and" gate of that ignition circuit. While the transistor 794 of that ignition circuit might be rendered non-conductive by line voltage variations, load voltage variations, noise, or other transients as the programming device and electric welder are providing very low current levels, the voltage across the output terminals 222 and 254 would still remain below fifty volts; and hence the transistor 786 would continue to remain conductive and would keep the Schmitt trigger from rendering the transistor 877 conductive once again. This means that as long as the arc is maintained, the level of the welding current can be reduced as low as desired—even so low as to render the transistor 794 non-conductive—and yet not cause the ignition circuit 312 to become active.

It should also be noted that the requirement that the voltage across the output terminals 222 and 254 must drop from about eighty-two volts to about fifty volts before the transistor 786 of the ignition circuit 312 can become conductive is helpful in keeping line voltage variations, load voltage variations, noise, and other transients from pre-maturely rendering that transistor conductive. Similarly, the positive voltage that is initially applied to the base of the transistor 794 of that ignition circuit, by the voltage divider which consists of resistors 338, 310, 328, 326, 324, 322 and 264 and potentiometer 266, is helpful in keeping line voltage variations, load voltage variations, noise, and other transients from pre-maturely rendering that transistor conductive. As a result, the ignition circuit 312 will enable the magnetic amplifiers to provide the desired precisely-controlled, increased output but will not do so prematurely.

It should be noted that as the various welding current levels change to succeeding welding current levels, the programming device causes those welding current levels to change at linear rates; and such rates are highly desirable. That programming device positively forces the welding current levels to change at linear rates by precisely fixing the voltages at the opposite ends of the resistors through which the charging and discharging currents of the capacitor 454 must flow. Specifically, that programming device precisely fixes the voltage at the left-hand end of the adjustable resistor 464 by connecting that left-hand end to the negative terminal 440 of the voltage regulator of FIG. 5, and precisely fixes the voltage at the right-hand end of the resistor 466 by connecting it to the upper input of the integrating operational amplifier 448—that upper input being held at about minus three-quarters of a volt. As a result, a fixed voltage of about twenty-seven and one-quarter volts is always maintained across the serially-connected adjustable resistor 464 and fixed resistor 466 whenever the movable relay contact 446 is in its lower position and the movable relay contact 470 is in its upper position. That fixed voltage drop will coact with the resistances of adjustable resistor 464 and fixed resistor 466 to definitely fix the rate at which current can flow through those serially-connected resistors, and will thus fix the rate at which capacitor 454 can charge or discharge. Similarly, the programming device of the present invention precisely fixes the voltage at the left-hand end of adjustable resistor 474 by connecting it to positive terminal 442 of the voltage regulator, and precisely fixes the voltage at the right-hand end of fixed resistor 476 by connecting it to the upper input of amplifier 448—that upper input being held at about minus three-quarters of a volt. This means that a fixed voltage of about twenty-eight and three-quarters volts is always maintained across serially-connected resistors 474 and 476 whenever movable relay contacts 446 and 470 are in their lower positions. That fixed voltage will coact with the resistances of those serially-connected resistors to fix the rate at which current can flow through those serially-connected resistors, and can thus fix the rate at which capacitor 454 can charge and discharge.

It should also be noted that when the "Initial" welding current level is to change to the "Second" welding current level, the voltage across the potentiometer 552 and the voltage across the potentiometer 524 will start changing at the same time and will continue to change for the same length of time. As a result, a precisely-predictable and smooth transition will be provided between the "Initial" welding current level and the "Second" welding current level. Similar precisely-predictable and smooth transitions will be provided between the "Second" welding current level and the "Finish" welding current level, and between the "Finish" welding current level and the "Second" welding current level; because the voltages across the potentiometer 524 and the potentiometer 554 will start changing at the same time and will continue to change for the same length of time.

As indicated hereinbefore, the outputs of magnetic amplifiers tend to become non-linear adjacent the upper ends of the output ranges of those magnetic amplifiers. Any such non-linearity would be objectionable in the programming device and electric welder provided by the present invention; because it would prevent the use of dials with linear markings. The present invention compensates for the characteristic non-linearity of the magnetic amplifiers 150, 164 and 178 adjacent the upper ends of the output ranges of those amplifiers by providing the diode function generator which includes the diode 692, the potentiometer 680, the adjustable resistor 696, and the fixed resistors 678, 682, 700 and 698.

The resistor 682, the potentiometer 680 and the resistor 678 are connected between the positive voltage 442 of the voltage regulator and the negative voltage 440 of that voltage regulator by transistor 970 and resistor 972 of the summing amplifier 658; and that potentiometer and those resistors constitute a voltage divider. Whenever the terminal 968 of the summing amplifier 658 is highly negative, as it will be when the electric welder is supplying welding current in the lower portion of the operating range thereof, the movable contact of the potentiometer 680 will be negative relative to the anode of the diode 692. As a result, the voltage divider which includes resistor 682, potentiometer 680 and resistor 678 will normally back-bias the diode 692 and will normally render that diode non-conductive. The terminal 968 of the amplifier 658 will move in the positive direction as the welding current level of the electric welder increases; and, usually at a welding current level in excess of one half of the overall current range of the electric welder, the voltage at the movable contact of the potentiometer 680 will rise to zero and will then start to go positive. When the anode of the diode 692 becomes about one-half of a volt positive relative to the cathode thereof, that diode will become conductive; and current will flow from the positive terminal 442 of the voltage regulator via resistor 682 in FIG. 4, the right-hand section of potentiometer 680, diode 692, junction 694, and then either through resistor 700 to the common return of the circuit or through adjustable resistor 696, resistor 698, junction 690, resistor 688, junctions 670 and 668, Zener diode 666, junction 664, terminal 968 of the amplifier 658, transistor 970 and resistor 972 of that amplifier, junction 957 and conductor 416 to the negative terminal 440 of the voltage rectifier. The current flow through the resistor 688 will make the voltage at the junction 690 move in the positive direction; and the pre-amplifier 706 will respond to the resulting positive-going signal to move the terminal 968 thereof further in negative direction. The bases of the transistors 738, 740, 742 and 744 will thus receive a negative-going signal which will increase the conductivities of those transistors; and the resulting increase in current flowing through the control windings 154, 168 and 182 will cause the magnetic amplifiers 150, 164 and 178 to increase their outputs. The consequent increases in outputs of those magnetic amplifiers will compensate for the normal "fall off" in voltage which characteristically occurs when magnetic amplifiers are operated adjacent the upper ends of the output current ranges thereof.

In the operation of the diode function generator, the resistor 700 will pass any leakage current from the diode 692 to the common return of the circuit. This is desirable because it will keep that leakage current from establishing a voltage drop across adjustable resistor 696 and resistor 698 prior to the time the diode 692 is supposed to become conductive. The adjustable resistor 696 is used to establish the rate of current flow through the resistor 688 that is needed to make the current flowing through the arc match the settings of the dials of the programming device.

If the operator of the programming device and electric welder wishes to control the said programming device and electric welder while he is standing immediately adjacent the workpiece, he need only shift the knob 531 of the "Remote-Local" switch to its "Remote" position and shift the knob 617 of the program control switch to its "Initial" position. The movable contact 58 will move up into engagement with the fixed contact 56, the movable contact 78 will move up into engagement with the fixed contact 74, the movable contact 516 will disconnect the top of the potentiometer 524 from the anode of the diode 514 and will connect the top of the potentiometer 522 to that anode. The movable contact 528 will disconnect the movable contact of the potentiometer 524 from the upper input of the summing amplifier 658 and will connect the movable contact of the potentiometer 522 to that upper input. The movable contacts 598 and 616 will, respectively, move into engagement with the second-uppermost fixed contacts 600 and 618.

To initiate the arc, the operator can press the push button 72 and can energize the source of radio frequency current, not shown; and thereupon the programming device and electric welder will cause the magnetic amplifiers 150, 164 and 178 to start supplying current to the output terminals 222 and 254 in the manner described hereinbefore when the knob 531 was in its "Local" position. The ignition circuit 312 will initially hold the welding current to a low level but will thereafter cause the magnetic amplifiers 150, 164 and 178 to provide an increased output for a predetermined period of time. Thereafter, that ignition circuit will permit the welding current to drop to the level set on the dial 553 of the potentiometer 552.

When the operator wishes to change from the "Initial" welding current level to the "Second" welding current level, he need only press the push button 640. Thereupon, current will flow from the common return of the circuit via push button 640, junction 638, resistor 636, relay coil 634, junction 632, normally-closed push button 630, and conductor 130 to the negative terminal 134 in FIG. 1. The resulting energization of the relay coil 634 will shift the movable relay contact 642 down into engagement with the fixed relay contact 644 and thereby establish a holding circuit for that relay coil which extends from the common return of the circuit via fixed and movable relay contacts 644 and 642, junction 638, resistor 636, relay coil 634, junction 632, push button 630, and conductor 130 to the negative terminal 134 in FIG. 1. The holding circuit is desirable because it assures energization of the relay coil 634 even if the operator presses the push button 640 only momentarily. The energization of the relay coil 634 also will shift the movable relay contact 624 down into engagement with the fixed relay contact 626; and thereupon current will flow from the common return of the circuit via fixed and movable relay contacts 626 and 624, junctions 604 and 596, resistor 594, relay coil 592, and conductor 128 to the positive terminal 132 in FIG. 1. The resulting energization of the relay coil 592 will cause the movable relay contacts 446 and 576 to shift down into their lower positions, and will thus apply a negative going signal to the upper input of the amplifier 448 and will cause current to flow from right to left through the capacitor 454. As described hereinbefore, that signal and that flow of current will cause the voltage at the junction 556 to rise to zero and will cause the voltage at the movable contact 516 to move to about minus eighteen and three-quarters volts. That change in voltages will occur during the time established by the setting of the dial 465 of the adjustable resistor 464.

When the operator wishes to change the "Second" welding current level to the "Finish" welding current level, he can press the push button 650; and thereupon current will flow from the common return of the circuit via push button 650, junction 652, resistor 648, relay coil 646, junction 632, push button 630, and conductor 130 to the negative terminal 134 in FIG. 1. The resulting energization of the relay coil 646 will cause the movable relay contacts 620 and 654 to shift down into their lower positions. The downward shifting of the movable relay contact 654 will complete a holding circuit for the relay coil 646 which extends from the common return of the circuit via fixed and movable relay contacts 656 and 654, junction 652, resistor 648, relay coil 646, junction 632, push button 630, and conductor 130 to the negative terminal 134 in FIG. 1. This holding circuit is desirable because it assures energization of the relay coil 646 even if the operator presses the push button 650 only momentarily. The downward shifting of the movable relay contact 620 will complete a circuit which extends from the common return of the circuit via fixed and movable contacts 622 and 620, junction 614, resistor 612, relay coil 610, and conductor 128 to the positive terminal 132 in FIG. 1. The resulting energization of the relay coil 610 will cause the movable relay contacts 470, 546, 570 and 608 to shift down into their lower positions. Thereupon, the "Second" welding current level will change to the "Finish" welding current level in the manner described hereinbefore. When the operator of the welder wishes to shut off the welder, he need only press the push button 68; and thereupon the holding circuit of the relay coil 44 in FIG. 1 will be interrupted.

If the operator of the programming device and electric welder inadvertently presses the push button 650 at a time when he wishes to change the "Initial" welding current level to the "Second" welding current level, the energization of the relay coil 646 will not only energize the relay coil 610 but will, through the movable and fixed relay contacts 608 and 606, also energize the relay coil 592. As a result, even if the operator of the programming device and electric welder inadvertently fails to initiate the "Second" welding current cycle prior to the time he initiates the "Finish" welding current cycle, that programming device will automatically effect the desired energization of the relay coil 592. In this way, the programming device makes certain that the movable relay contacts 446 and 576 will be in their lower positions whenever the relay coil 610 holds the movable relay contacts 470, 546, 570 and 608 in their lower positions.

If the push button 650 is pressed at a time when the "Initial" welding current level is changing to the "Second" welding current level, in response to a prior pressing of the push button 640, the movable relay contact 470 will disconnect the capacitor 454 from the fixed resistor 466 and the adjustable resistor 464 and will connect that capacitor to the fixed resistor 476 and the adjustable resistor 474. Thereupon, the capacitor 454 will, within the time set on the dial 475, change from the then-existing welding current level to the "Finish" welding current level; and it will do so at a linear rate.

If it is desirable to initiate a further welding program while the operator is holding the remote control and is standing adjacent the workpiece, the operator can press the push button 630; and thereupon the relay coils 634 and 646 will become de-energized. At such time, the movable relay contacts 446, 470, 546, 570, 576, and 608 will return to the upper position shown by FIG. 3. Thereupon, the programming device and electric welder will cause the magnetic amplifiers 150, 164 and 178 to start supplying welding current to the arc at the "Initial" welding current level.

Where the programming device and electric welder provided by the present invention are incorporated within a large welding system, it may be desirable for the initiating of the change from the "Initial" welding current level to the "Second" welding current level, for the initiating of the change from the "Second" welding current level to the "Finish" welding current level, and for the initiating of further changes from the "Finish" current level to the "Second" welding current level and then back to the "Finish" current welding level to be controlled by an automatic timer, a tape-controlled device or a card-controlled device. To enable an automatic timer, a tape-controlled device or a card-controlled device to control the programming device and electric welder, the uppermost contacts 600 and 618 will be connected to that automatic timer, tape-controlled device or card-controlled device, and the knob 617 of the program control switch will be shifted to its "Auto" position. Where this is done, the programming device will respond to signals from that automatic timer, tape-controlled device or card-controlled device to selectively energize the relay coil 592 or both relay coils 592 and 610. In this way, the automatic timer, tape-controlled device or card-controlled device can control how long the programming device and electric welder supply current at the "Initial" welding current level, can control how long the programming device and electric welder supply current at the "Second" welding current level, can control how long the programming device and electric welder supply current at the "Finish" welding current level, can control how many times that programming device and electric welder will supply current at the "Second" welding current level and the "Finish" welding current level, anl can control when the programming device and electric welder are, once again, to supply "Initial" welding current.

Modifications

FIG. 9 shows the potentiometers 522 and 524 with the tops thereof connectable to the movable contact 516, and shows the potentiometers 552 and 554 with the tops thereof connected to the junction 556. In actual practice, however, it has been found desirable to use precisely made poteniometers which have taps that are fixed intermediate the end terminals thereof to establish the desired effective resistances for those potentiometers, and that have movable contacts to select the desired welding current levels. However, whether the poteniometers 522, 524, 552 and 554 utilize their entire resistances or just parts of the resistances thereof, the function and operation of those potentiometers will be the same. The principal requirements of those potentiometers are that they must be of a high quality and must have carefully-matched linear responses throughout their resistance ranges.

In the ignition circuit 312 of FIG. 6, two resistors 780 and 782 are connected in series. If desired one resistor, having a resistance equal to that of the two resistors 780 and 782, could be used. However, it has been found easier to dissipate the heat from the two resistors 780 and 782 than to dissipate the heat from one resistor that has a total resistance equal to that of the two resistors 780 and 782.

Similarly, in FIG. 2, one resistor could be used to replace the serially-connected resistors 324, 326 and 328. However, those three resistors are preferred because they readily dissipate the heat which they generate as current flows through them.

The voltage regulator of FIG. 5 is very accurate and is very desirable. However, if desired, another voltage regulator could be used; and a ferro resonant voltage regulator has been found to be very useful.

The programming device provided by the present invention is not restricted to use with electric welders that utilize magnetic amplifiers. Instead, that programming device can be used with electric welders that use other forms of variable impedances which can respond to reference voltages to establish predetermined output current levels.

Conclusion

The programming device and electric welder provided by the present invention provide a precision of operation which has not heretofore been available in electric welders. For example, that programming device and electric welder can maintain the welding current levels to accuracies of plus or minus one percent or plus or minus one ampere, whichever is the larger. This very high level of accuracy is made possible because the pre-amplifier 706 and the magnetic amplifiers 150, 164 and 178 coact to provide a forward open loop current gain in the order of forty million. The programming device and electric welder provided by the present invention could provide a lesser but important degree of accuracy, which would still be very much higher than that of prior electric welders, as long as the pre-amplifier 706 and the magnetic amplifiers 150, 164 and 178 provided a forward open loop current gain in excess of ten thousand. The forward open loop current gain of the pre-amplifier 706 and the magnetic amplifiers 150, 164 and 178 must be so high that any variations in current gain due to variations in line voltage, variations in load voltage, noise or other transients will have only a small effect upon the total current output of the electric welder. With prior electric welders, wherein the forward open loop current gain was commonly in the range of one hundred, variations in line voltage, variations in load voltage, noise or other transients could materially affect the level of the current output; and hence such welders could not provide the precise control provided by the present invention.

Because of its high current gain, the programming device and electric welder of the present invention can eliminate all need for the line voltage compensation which is customarily provided for prior electric welders. As a result, the programming device and elecrtic welder provided by the present invention eliminates the cost of providing line voltage compensation while also providing more accurate control of the welding current levels.

By providing a high gain electric welder, the present invention avoids the loss of control which is inherent in the operation of low gain electric welders. Further, the present invention avoids the difficulties which would normally accompany the use of high gain electric welders by equipping the electric welder of the present invention with the ignition circuit 312, which can keep that electric welder from applying its full output to the electrode and workpiece during the initiation of the arc.

It will be noted that the electric welder provided by the present invention uses six diodes, namely diodes 158, 160, 172, 174, 186 and 188. In using those six diodes, that welder provides a wave form which requires very little filtering. Further, it will be noted that the output windings 152, 166 and 180, respectively, of the magnetic amplifiers 150, 164 and 178 coact with the said six diodes to constitute a three phase bridge. Hence, the output currents supplied by those magnetic amplifiers have a low level of A.C. ripple.

The diodes 158, 160, 172, 174, 186 and 188 will be cooled by the fan motor 40. In the event the air vents of the electric welder housing become obstructed, or for some other reason the blower 42 fails to sufficiently cool those diodes, the thermostatic switch 62 which is mounted adjacent those diodes will open the circuit of the relay coil 44. In doing so, that thermostatic switch will prevent injury to the diodes 158, 160, 172, 174, 186 and 188.

It will be noted that three current transformers 272, 284 and 296 are provided; and this is desirable because if just one current transformer were to be used, the change in output current, due to line voltage variations, might not be sensed for two-thirds of a cycle of the A.C. supply. Also, it will be noted that each of the current transformers 272, 284 and 296 has two primary windings—one connected to one of the sections of the adjacent output winding and the other being connected to the other section of that output winding. This is desirable, because it enables those current transformers to respond to both half cycles of the A.C. supply. The use of the three transformers 272, 284 ad 296 is additionally desirable because those transformers isolate the currents in the bridge rectifiers 276, 288 and 300 from the magnetic amplifiers 150, 164 and 178. Further, those three current transformers are desirable because they respond to, and help compensate for, any unbalance in the three phase A.C. supply.

The current transformers 272, 284 and 296 coact with the bridge rectifiers 276, 288 and 300 to develop three individual and discrete voltages that are comparable to the output currents from the three magnetic amplifiers 150, 164 and 178. Further, those currents are of the same nature as the currents which those magnetic amplifiers supply to the arcs, in the sense that they are rectified alternating currents. Similarly, the currents flowing through the potentiometer 266 and the diode 256 in FIG. 2 are comparable, in nature, to the current supplied to the arc by the magnetic amplifiers 150, 164 and 178, because they are rectified alternating currents. As a result, the programming device and electric welder provided by the pesent invention are able to provide voltags to the pre-amplifier 706 which truly represents the total current flowing through the arc.

Whenever the operator sets the knob 531 of the "Remote-Local" switch in its "Remote" position, the electric welder can be started by pressing the push button 50 of the programming device or by pressing the push button 72 of the remote control. Similarly, the operator can shut off the welder by pressing the push button 60 of the programming device or by pushing the push button 68 of the remote control. This is desirable because it can save the operator of the programming device and electric welder many needless steps.

Where desired, the dials 465 and 475 could be marked with information other than time. For example, those dials could be marked to indicate cycles of the A.C. supply. The programming device provided by the present invention could be used with electrical devices other than electric welders. For example, that programming device could be used to program the operation of dimmers, could be used to program speed changes of various electrically-operated devices, could be used to program temperature cycles, and the like. Where that programming device is used with devices other than welders, the indicia on the dials 465, 475, 523, 525, 553 and 555 can be made to appropriately reflect the changes in condition and the steady state conditions which they control.

The resistor 746 in FIG. 4 is desirable because it protects the transistors 738, 740, 742 and 744 against injury due to overheating. Specifically, that ressitor reduces the voltage which is applied to the collectors of those transistors, and thus reduces the total power that must be dissipated by those transistors for any given value of current flowing through those transistors. That resistor also is desirable because it will limit the total current that can flow through those transistors, and will thus protect those transistors against injury due to excessive currents.

Whereas the drawing and accompanying description have shown and described a preferred embodiment of the present invention it should be apparent to those skilled in the art that various changes may be made in the form of the invention without affecting the scope thereof.

What I claim is:
1. A programming device for an electric welder that comprises:
  (a) output terminals,
  (b) a variable impedance element that is connected to said output terminals, that is connectable to a source of power, and that can supply variable amounts of current to said output terminals,
  (c) a first sub-circuit that is responsive to the current flowing to said output terminals to provide a signal that is proportional to said current,
  (d) a second sub-circuit that provides a plurality of voltages,
  (e) a member that responds to a voltage from said second sub-circuit to develop a first reference voltage across it,
  (f) a second member that responds to a voltage from said second sub-circuit to develop a second reference voltage across it,
  (g) a third member that responds to a voltage from said second sub-circuit to develop a third reference voltage across it,
  (h) said second sub-circuit selectively applying voltages to said members and thereby causing reference voltages to be developed across said members,
  (i) an ignition circuit having an input and having a first output and a second output, means connecting the first output thereof to one of said members,
  (j) a diode function generator, means connecting said diode function generator to said one member for providing a signal whenever the reference voltage across said one member approaches the upper end of the reference voltage range of said one member, and
  (k) an amplifier having an input, means connecting said amplifier input to said second output of said ignition circuit, said amplifier having said input thereof connected to the first said sub-circuit and having said input thereof connected to said one member, said amplifier input being connected to said diode function generator for sensing said signal, and means connecting the output of said amplifier to said variable impedance element, (l) said amplifier being adapted to cause said variable impedance element to change its output current level, (m) said first output of said ignition circuit being adapted to increase the value of the current supplied to said output terminals by said variable impedance element, and said second output of said ignition circuit being adapted to decrease the value of the current supplied to said output terminals by said variable impedance element, (n) said ignition circuit, whenever the first said output thereof is supplying a signal, adding said signal to the reference voltage across said one member to provide an increased reference voltage across said one member, (o) said amplifier sensing said signal, from the first said sub-circuit, that is proportional to the current flowing to said output terminals, and sensing the voltage across said one member, (p) said amplifier, whenever a predetermined difference develops between said signal from the first said sub-circuit and said voltage across said one member, forcing said variable impedance element to change its output current level until said signal bears a predetermined relation to said voltage across said one member, (q) said amplifier, whenever said second output of said ignition circuit is connected to said amplifier and is providing a signal, forcing said variable impedance element to hold its output current to a low level, irrespective of the value of said voltage across said one member, (r) said amplifier, whenever it receives a signal from said diode function generator forcing said variable impedance element to increase the output thereof.

2. A programming device for an electric welder that comprises:

(a) output terminals, (b) a variable impedance element that is connected to said output terminals, that is connectable to a source of power, and that can supply variable amounts of current to said output terminals, (c) a sub-circuit that is responsive to the current flowing to said output terminals to provide a signal that is proportional to said current, (d) a reference voltage source, (e) an ignition circuit having an input and having a first output and a second output, means connecting the first output thereof to said reference voltage source, (f) an amplifier having an input, means connecting said amplifier input to said second output of said ignition circuit, said amplifier having said input thereof connected to said sub-circuit and having said input thereof connected to said reference voltage source, and means connecting the output of said amplifier to said variable impedance element, (g) said amplifier being adapted to cause said variable impedance element to change its output current level, (h) said first output of said ignition circuit being adapted to increase the value of the current supplied to said output terminals by said variable impedance element, and said second output of said ignition circuit being adapted to decrease the value of the current supplied to said output terminals by said variable impedance element, (i) said ignition circuit, whenever the first said output thereof is supplying a signal, adding said signal to the reference voltage from said reference voltage source to provide an increased reference voltage across said reference voltage source, (j) said amplifier sensing said signal, from said sub-circuit, that is proportional to the current flowing to said output terminals, and sensing the voltage across said reference voltage source, (k) said amplifier, whenever a predetermined difference develops between said signal from said sub-circuit and said voltage across said reference voltage source, forcing said variable impedance element to change its output current level until said signal bears a predetermined relation to the voltage across said reference voltage source, (l) said amplifier, whenever said second output of said ignition circuit is connected to said amplifier and is providing a signal, forcing said variable impedance element to hold its output current to a low level, irrespective of the value of said voltage across said reference voltage source.

3. A programming device for an electric welder that comprises:

(a) output terminals, (b) a variable impedance element that is connected to said output terminals, that is connectable to a source of power, and that can supply variable amounts of current to said output terminals, (c) a sub-circuit that is responsive to the current flowing to said output terminals to provide a signal that is proportional to said current, (d) a reference voltage source, (e) an ignition circuit having an input and having a first output and a second output, means connecting the first output thereof to said reference voltage source, (f) an amplifier having an input, means connecting said amplifier input to said second output of said ignition circuit, said amplifier having said input thereof connected to said sub-circuit and having said input thereof connected to said reference voltage source, and means connecting the output of said amplifier to said variable impedance element, (g) said amplifier being adapted to cause said variable impedance element to change its output current level, (h) said first output of said ignition circuit being adapted to increase the value of the current supplied to said output terminals by said variable impedance element, and said second output of said ignition circuit being adapted to decrease the value of the current supplied to said output terminals by said variable impedance element, (i) said ignition circuit, whenever the first said output thereof is supplying a signal, adding said signal to the reference voltage from said reference voltage source to provide an increased reference voltage across said reference voltage source, (j) said amplifier sensing said signal, from said sub-circuit that is proportional to the current flowing to said output terminals, and sensing the voltage across said reference voltage source, (k) said amplifier, whenever a predetermined difference develops between said signal from said sub-circuit and said voltage across said reference voltage source, forcing said variable impedance element to change its output current level until said signal bears a predetermined relation to the voltage across said reference voltage source, (l) said amplifier, whenever said second output of said ignition circuit is connected to said amplifier and is providing a signal, forcing said variable impedance element to hold its output current to a low level, irrespective of the value of said voltage across said reference voltage source, (m) said ignition circuit having an adjustable element that can be adjusted to vary the duration of the signal supplied by the first said output thereof and can thereby vary the duration of said increased reference voltage.

4. A programming device for an electric welder that comprises:
(a) output terminals,
(b) a variable impedance element that is connected to said output terminals, that is connectable to a source of power, and that can supply variable amounts of current to said output terminals,
(c) a sub-circuit that is responsive to the current flowing to said output terminals to provide a signal that is proportional to said current,
(d) a reference voltage source,
(e) an ignition circuit that has an input and an output,
(f) an amplifier having an input, means connecting said amplifier input to said output of said ignition circuit, said amplifier having said input thereof connected to said sub-circuit and having said input thereof connected to said reference voltage source, and means connecting the output of said amplifier to said variable impedance element,
(g) said amplifier being adapted to cause said variable impedance element to change its output current level,
(h) said amplifier sensing said signal, from said sub-circuit, that is proportional to the current flowing to said output terminals, and sensing the voltage across said reference voltage source,
(i) said amplifier, whenever a predetermined difference develops between said signal from said sub-circuit and said voltage across said reference voltage source, forcing said variable impedance element to change its output current level until said signal bears a predetermined relation to the voltage across said reference voltage source,
(j) said amplifier, whenever said ignition circuit is connected to said amplifier and is supplying a signal, forcing said variable impedance element to hold its output current to a low level, irrespective of the value of the voltage across said reference voltage source.

5. A control system for an electrical device that comprises:
(a) a variable output source and a pair of terminals that are connected to said variable output source and that receive current from said variable output source and that have a voltage developed across them by said variable output source,
(b) said variable output source being adapted to vary the output current which it supplies to said terminals,
(c) a signal source, means connecting said signal source to said variable output source, said variable output source supplying a predetermined level of output current to said terminals,
(d) a starting circuit, one input means of said starting circuit responsive to the current supplied to said terminals by said variable output source and a second input means of said starting circuit responsive to the voltage developed across said terminals by said variable output source,
(e) said starting circuit having an output connected to said variable output source for forcing said variable output source to increase the output current thereof when rendered active, and, as long as it remains active, being incapable of again forcing said variable output source to increase the output current thereof,
(f) said current that is supplied to said terminals by said variable output source initially being very low and said voltage developed across said terminals by said variable output source initially being very high, and said current subsequently becoming high and said voltage subsequently becoming low,
(g) said starting circuit having an "or" gate, means connecting said "or" gate to said inputs for rendering said starting circuit active to provide a second signal that forces said variable output source to increase the output current thereof, whenever the first said input initially senses a predetermined higher current level or second input initially senses a predetermined lower voltage level,
(h) sub-circuit means in said starting circuit for subsequently removing said second signal and thereby permitting said variable output source to decrease the output current thereof to said predetermined level of output current,
(i) said starting circuit having an "and" gate, means connecting said "and" gate to said inputs for maintaining said starting circuit active as long as said first said input senses a current level equal to or greater than said predetermined higher current level and said second input senses a voltage equal to or lower than said predetermined lower voltage level,
(j) whereby said "and" gate as long as said starting circuit remains active, renders said starting circuit incapable of again causing said variable output source to increase the output thereof even through the current sensed by the first said input should become very low and thereafter rise to said predetermined higher level or the voltage sensed by said second input should become very high and then fall to said predetermined lower level,
(k) said "and" gate forcing said starting circuit to become inactive whenever the current sensed by the first said input falls to a very low level and the voltage sensed by said second input rises to a very high value,
(l) said "or" gate thereafter being adapted to render said starting circuit active,
(m) whereby said starting circuit initially forces said variable output source to increase the output current thereof, subsequently permits said variable output source to decrease the output current thereof, keeps said starting circuit from again forcing said variable output source to increase the output current thereof as long as the current remains high or the voltage remains low.

6. A control system for an electrical device, which has two parameters that experience divergent changes during one part of the cycle of said electrical device and that experience similar changes during a later part of said cycle of said electrical device, that comprises:
(a) a starting circuit that normally is inactive but that can be rendered active by a change in one of said parameters in one direction to a first predetermined magnitude or by a divergent change in the other of said parameters in a second predetermined direction to a second predetermined magnitude,
(b) terminal means connected to said starting circuit, said terminal means sensing said parameters,
(c) said starting circuit having an "or" gate, means connecting said "or" gate to said terminal means to enable said "or" gate to sense said parameters, said "or" gate being adapted to perform a switching function and thereby render said starting circuit active whenever it initially senses said predetermined change in said one of said parameters in said one direction to the first said predetermined magnitude and also adapted to render said starting circuit active whenever it initially senses said divergent change in said other of said parameters in said second predetermined direction to said second predetermined magnitude,
(d) said starting circuit having an "and" gate means connecting said "and" gate to said terminals to enable said "and" gate to sense said parameters and subsequently keep said circuit active as long as the changes in said parameters are similar, and
(e) said "and" gate of said starting circuit performing a reverse switching function and thereby rendering said starting circuit inactive whenever it senses diverging changes of the first said parameter in a direction opposite to said one direction to a value beyond the first said predetermined magnitude and of said other parameter in a direction opposite to said second predetermined direction to a value beyond said second predetermined magnitude.

7. An electric welder that comprises:
(a) a variable output source that supplies power to establish and maintain an arc,
(b) control means to vary the output level of said variable output source, and
(c) an ignition circuit that is connected to said control means and that can cause said control means to force said variable output source to change the output level thereof,
(d) said ignition circuit having a first sub-circuit, means connecting said first sub-circuit to said control means, said first sub-circuit supplying a first signal to said control means which forces said variable output source to hold the output thereof to a low level, whereby the arc can be initiated without forming craters or holes in the workpiece,
(e) said ignition circuit having a second sub-circuit, means connecting said second sub-circuit to said control means, said second sub-circuit subsequently supplying a second and different signal to said control means which forces said variable output source to supply an increased output to said arc to assure full establishment of said arc,
(f) said ignition circuit having a third sub-circuit, means connecting said third sub-circuit to said control means, said third sub-circuit eliminating, at a predetermined condition, the signal supplied to said control means by said second sub-circuit and thereby enabling said control means to permit said variable output source to reduce the output thereof,
(g) the first said and said second sub-circuits of said ignition circuit being responsive to the output of the variable output source, and operable to supply the first said and said second signals to said control means only during the establishment of said arc.

8. In an electric welder:
(a) a variable output source including output terminals that supplies power to establish and maintain an arc,
(b) an ignition circuit, means connecting said ignition circuit to said variable output source for supplying a signal to said variable output source which will force said variable output source to provide an increased output for said electric welder for a predetermined period of time,
(c) an "or" gate in said ignition circuit, means connecting said "or" gate to said variable output source for causing said ignition circuit to supply said signal to said variable output source and thereby force said variable output source to provide said increased output,
(d) a sub-circuit in said ignition circuit, means connecting said sub-circuit to said variable output source for causing said ignition circuit to continue to supply said signal to said variable output source for a predetermined period and thereafter remove said signal from said variable output source,
(e) an "and" gate in said ignition circuit that is adapted to prevent reactuation of said ignition circuit,
(f) means connecting said "or" gate and said "and" gate to said output terminals for sensing the voltage across said output terminals of said welder and also for sensing the current supplied to said output terminals of said welder,
(g) said "or" gate responding either to a decrease in the voltage across said output terminals of said welder or to an increase in the current supplied to said output terminals to actuate said ignition circuit,
(h) said "and" gate requiring both a decrease in the current supplied to said output terminals and an increase in the voltage across said output terminals to permit said ignition circuit to become inactive and to thereafter be reactuated by said "or" gate,
(i) whereby said ignition circuit will respond either to a decrease in voltage or to an increase in welding current to supply said signal to said variable output source and thereby cause said electric welder to provide an increased output, will subsequently, remove said signal and no longer require the electric welder to supply that increased output, and will subsequently prevent the application of said signal to said variable output source and thereby prevent said welder from again supplying that increased output during the rest of the welding cycle.

9. An electric welder that comprises:
(a) a high gain variable power output source and control system therefor, and
(b) an ignition circuit that is connected to said control system for said variable output source,
(c) said ignition circuit having a first sub-circuit, means for connecting said first sub-circuit to said control system for supplying a signal to said control system to force said variable power output source to hold its output to low levels,
(d) said high gain variable power output source normally supplying power to the workpiece at predetermined levels which would, during the establishment of an arc, form craters and holes in said workpiece,
(e) said low levels to which said variable power output is forced to hold its output being low enough to avoid the formation of craters and holes in said workpiece but being high enough to establish said arc,
(f) said ignition circuit having a second sub-circuit responsive to the output of the variable output source, means connecting said second sub-circuit to said control system for permitting the first said sub-circuit to supply said signal to said control system during the initiation of arcs but thereafter preventing the first said sub-circuit from supplying said signal to said control system,
(g) whereby said ignition circuit will cause said control system to force said variable power output source to hold its output to said low levels during the establishment of said arc but will, after said arc has been established, permit said variable power output source to supply power to said workpiece at said predetermined levels.

10. A control system, for an electrical device which can respond to a reference voltage, that comprises:
(a) a first member across which a D.C. reference voltage can be developed,
(b) a second member across which a second D.C. reference voltage can be developed,
(c) means for simultaneously connecting said members to a first control which is connected to said electrical device,
(d) a second circuit and means connecting said second circuit to said members for responding to one signal to develop the first said D.C. reference voltage across the first said member and for preventing the development of said second D.C. reference voltage across said second member,
(e) said second circuit and said means connecting said second circuit to said members responding to a second signal to develop said second D.C. reference voltage across said second member while preventing the development of the first said D.C. reference voltage across the first said member,
(f) said second circuit and said means connecting said second circuit to said members normally maintaining said D.C. reference voltages independent and non-interacting but, for transient periods, permitting said D.C. reference voltages to interact and to act upon the first said circuit, and
(g) the first said circuit normally responding to the first said D.C. reference voltage or to said second D.C. reference voltage but, during said transient periods, responding to both of said D.C. reference voltages,
(h) said electrical device normally responding to the first said circuit and the first said D.C. reference voltage to provide a predetermined output level or responding to the first said circuit and said second D.C. reference voltage to provide a second predetermined output level,
(i) said electrical device, during said transient periods, responding to the first said circuit and to both of said D.C. reference voltages to provide a third output level.

11. A control system, for an electrical device which can respond to a pulse-free D.C. reference voltage, that comprises:
(a) a first member across which a pulse-free D.C. reference voltage can be developed,
(b) a second member across which a second pulse-free D.C. reference voltage can be developed,
(c) means for simultaneously connecting said members to a first circuit which is connected to said electrical device,
(d) a second circuit and means connecting said second circuit to said members for responding to one signal to develop the first said pulse-free D.C. reference voltage across the first said member and for preventing the development of said second pulse-free D.C. reference voltage across said second member,
(e) said second circuit and said means connecting said second circuit to said members responding to a second signal to develop said second pulse-free D.C. reference voltage across said second member while preventing the development of the first said pulse-free D.C. reference voltage across the first said member,
(f) said second circuit and said means connecting said second circuit to said members normally maintaining said pulse-free D.C. reference voltages independent and non-interacting, but, for transient periods, permitting said pulse-free D.C. reference voltages to interact and to act upon the first said circuit,
(g) said second circuit including an amplifier, means connecting said amplifier to the said first and said second signals at the input thereof and means connecting the output of said amplifier to the first said member by one sub-circuit and means connecting the output of said amplifier to said second member by a second sub-circuit,
(h) said amplifier having an upper limit and a lower limit,
(i) said amplifier responding to said one signal to move the output thereof to its lower limit, and said sub-circuits responding to said lower limit to develop the first said pulse-free D.C. reference voltage across the first said member while preventing the development of said second pulse-free D.C. reference voltage across said first member,
(j) said amplifier responding to said second signal to move said output thereof to its upper limit, and said sub-circuits responding to said upper limit to develop said second pulse-free D.C. reference voltage across said second member while preventing the development of the first said pulse-free D.C. reference voltage across said second member,
(k) the first said circuit normally responding to the first said pulse-free D.C. reference voltage or to said second pulse-free D.C. reference voltage but, during said transient periods, responding to both of said pulse-free D.C. reference voltages,
(l) said electrical device normally responding to the first said circuit and the first said pulse-free D.C. reference voltage to provide a predetermined output level or responding to the first said circuit and said second pulse-free D.C. reference voltage to provide a second predetermined output level,
(m) said electrical device, during said transient periods, responding to the first said circuit and to both of said pulse-free D.C. reference voltages to provide a third output level.

12. A control system, for an electrical device which can respond to a pulse-free D.C. reference voltage, that comprises:
(a) a first member,
(b) a selectively-conductive element connected to said first member, means connected to said element for rendering said element conductive to develop a pulse-free D.C. reference voltage across said first member and for rendering said element non-conductive to prevent the development of a pulse-free D.C. reference voltage across said first member,
(c) a second member,
(d) a second selectively-conductive element connected to said second member, said means being connected to said second element for rendering said second element conductive to develop a second pulse-free D.C. reference voltage across said second member and for rendering said second element non-conductive to prevent the development of a second pulse-free D.C. reference voltage across said second member,
(e) a circuit, including the said means, responding to one signal to render the first said selectively-conductive element conductive and to render said second selectively-conductive element non-conductive,
(f) said circuit responding to a second signal to render the first said selectively-conductive element non-conductive and to render said second selectively-conductive element conductive,
(g) further means simultaneously connecting said members to said electrical device, but only one of said members normally having a pulse-free D.C. reference voltage developed thereacross, and
(h) the first said circuit, during transient periods, permitting both of said members to have pulse-free D.C. reference voltages developed thereacross,
(i) said further means normally responding to the first said pulse-free D.C. reference voltage or to said second pulse-free D.C. reference voltage but, during said transient periods, responding to both of said pulse-free D.C. reference voltages,
(j) one or the other of said pulse-free D.C. reference voltages normally being essentially zero,
(k) said electrical device normally responding to said further means and the first said pulse-free D.C. reference voltage to provide a predetermined output level or responding to said further means and said second pulse free D.C. reference voltage to provide a second predetermined output level,
(l) said electrical device, during said transient periods, responding to said further means and to both of said pulse-free D.C. reference voltages to provide a third output level.

13. A control system, for an electrical device which can respond to a reference voltage, that comprises:
(a) a first member across which a first reference voltage can be developed,
(b) a second member across which a second reference voltage can be developed,
(c) means simultaneously connecting said members to said electrical device, and
(d) a first circuit having a first sub-circuit and having a second sub-circuit,
(e) said first circuit responding to one signal to cause the first said sub-circuit to apply a voltage to, and thereby develop the first said reference voltage across, the first said member and to cause said second sub-circuit to prevent the development of said second reference voltage across said second member, (f) said first circuit responding to a second signal to cause said second sub-circuit to apply a voltage to, and thereby develop said second reference voltage across, said second member and to cause the first said sub-circuit to prevent the development of the first said reference voltage across the first said member, (g) the first said sub-circuit of said first circuit being adapted to respond to the removal of said one signal and to the application of said second signal to cause the first said reference voltage to start to disappear and said second sub-circuit responding to removal of said one signal and to the application of said second signal to simultaneously cause said second reference voltage to start to appear, and (h) a second circuit, means connecting said second circuit to said first circuit for applying the first said signal and said second signal to the first said circuit at a linear rate and simultaneously starting application of said second signal to, and removal of the first said signal from, the first said circuit, whereby the first said circuit forces the first said reference voltage to disappear and forces said second reference voltage to reach its intended value at the same time.

14. A control system, for an electrical device which can respond to a reference voltage, that comprises:
(a) a first member across which a first reference voltage can be developed,
(b) a second member across which a second reference voltage can be developed,
(c) means simultaneously connecting said members to said electrical device, and
(d) a first circuit having a first sub-circuit and having a second sub-circuit,
(e) said first circuit responding to one signal to cause the first said sub-circuit to apply a voltage to, and thereby develop the first said reference voltage across, the first said member and to cause said second sub-circuit to prevent the development of a second reference voltage across said second member,
(f) said first circuit responding to a second signal to cause said second sub-circuit to apply a voltage to, and thereby develop said second reference voltage across, said second member and to cause the first said sub-circuit to prevent the development of the first said reference voltage across the first said member,
(g) said first circuit normally maintaining said reference voltages independent and non-interacting,
(h) the first said sub-circuit of said first circuit responding to removal of said one signal and to application of said second signal to cause the first said reference voltage to start to disappear from across the first said member and said second sub-circuit responding to removal of said one signal and to application of said second signal to permit said second reference voltage to simultaneously start to appear across said second member,
(i) the voltage across the first said member being essentially zero whenever a steady-state reference voltage is developed across said second member,
(j) the voltage across said second member being essentially zero whenever a steady-state reference voltage is developed across the first said member.

15. A control system, for an electrical device which can respond to a reference voltage, that comprises:
(a) a first member across which a first reference voltage can be developed,
(b) a second member across which a second reference voltage can be developed,
(c) means simultaneously connecting said members to said electrical device, and
(d) a first circuit having a first sub-circuit and having a second sub-circuit,
(e) said first circuit responding to one signal to cause the first said sub-circuit to apply a voltage to, and thereby develop the first said reference voltage across, the first said member and to cause said second sub-circuit to prevent the development of said second reference voltage across said second member,
(f) said first circuit responding to a second signal to cause said second sub-circuit to apply a voltage to, and thereby develop said second reference voltage across, said second member and to cause the first said sub-circuit to prevent the development of the first said reference voltage across the first said member,
(g) said first circuit normally maintaining said reference voltages independent and non-interacting,
(h) the first said sub-circuit of said first circuit responding to removal of said one signal and to application of said second signal to cause the first said reference voltage to start to appear and said second sub-circuit responding to removal of said one signal and to application of said second signal to cause said second reference voltage to simultaneously start to appear, whereby said electrical device can for a short time respond to portions of both of said reference voltages,
(i) a second circuit, means connecting said second circuit to said first circuit for applying the first said signal and said second signal to the first said circuit at a linear rate and simultaneously starting application of said second signal to, and removal of the first said signal from, the first said circuit, whereby the first said circuit forces the said reference voltages to start changing at the same instant and to stop changing at the same instant,
(j) at least one of said members being adjustable to permit variations in the relative values of the first said and said second reference voltages,
(k) said one member being adjustable to have a value equal to, greater than, or less than the value of the other of said members, whereby the first said circuit can respond to said one signal to cause the reference voltage for said control system to increase, remain the same, or decrease.

16. A programming device for an electric welder that comprises:
(a) a variable output source that can supply different levels of welding current to an electrode and workpiece,
(b) a first reference voltage source,
(c) a second reference voltage source,
(d) an amplifier, means connecting said amplifier to said reference voltage sources and to said variable output source for responding to the voltages across said reference voltage sources to control the output level of said variable output source,
(e) the first said reference voltage source being adjustable to adjust the voltage thereacross and thereby enable said amplifier to cause said variable output source to adjust the level of welding current which it supplies to said electrode and workpiece,
(f) said second reference voltage source being adjustable to adjust the voltage thereacross and thereby enable said amplifier to cause said variable output source to adjust the level of welding current which it supplies to said electrode and workpiece,
(g) the first said reference voltage source having a dial,
(h) said second reference voltage source having a second dial,
(i) said amplifier being a high gain amplifier and being part of a closed loop so said amplifier and said variable output source provide accurate and linear responses to adjustments of said reference voltage sources, and
(j) a circuit, means connecting said circuit to said reference voltage source for normally maintaining one of said reference voltage sources inactive when the second reference voltage source is active and vice versa so said reference voltage sources are normally non-interacting, (k) whereby the markings on said dials of said reference voltage sources are accurate and linear, (l) said circuit acting, during transient periods, to permit both of said reference voltage sources to be active, (m) said variable output source normally responding to said amplifier and the first said reference voltage to provide a predetermined output level or responding to said amplifier and said second reference voltage source to provide a second predetermined output level, (n) said variable output source, during said transient periods, responding to said amplifier and to both of said reference voltage sources to provide a third output level.

17. A control system, for an electrical device, which comprises:

(a) a pair of output terminals, (b) a variable output source, means connecting said variable output source to said output terminals, said variable output source recurrently turning "on" to supply current to said output terminals, (c) means connected to said variable output source for varying the lengths of time said variable output source is "on" and thereby varying the level of the current which said variable output source supplies to said output terminals, (d) said variable output source, whenever it is "off," permitting an inductive load connected to said output terminals to cause D.C. circulating currents to flow through said output terminals, (e) a current transformer means connected to said output terminals and responsive to current supplied to said output terminals by said variable output source and coacting with a rectifier and a resistor to develop a voltage proportional to the value of said current, and (f) a discharge circuit connected across said output terminals, (g) said discharge circuit including a discharge rectifier means connecting said discharge rectifier to said variable output source, said discharge rectifier being non-conductive whenever said variable output source is "on" and is supplying current to said terminals, but being conductive whenever said variable output source is "off" and an inductive load is causing D.C. circulating currents to flow through said terminals, (h) said discharge rectifier substantially keeping said D.C. circulating currents from flowing through said variable output source, (i) said discharge circuit including a second resistor that responds to D.C. circulating currents flowing through said terminals to develop a voltage proportional to the value of said D.C. circulating currents, (j) said resistors being connected to add said voltages and thereby provide a voltage that is proportional to the total current flowing through said terminals.

18. A control system, for a polyphase electrical device, which comprises:

(a) a pair of terminals, (b) a plurality of variable output sources, one for each phase, means connecting said variable output sources for supplying current to said terminals, (c) a plurality of current transformers, means connecting said current transformers to said variable output sources, (d) a plurality of rectifiers, means connecting said rectifiers to said current transformers, (e) each variable output source having a current transformer and a rectifier connected thereto, (f) each current transformer and its rectifier sensing the current supplied to said terminals by its variable output source to provide one of a plurality of individual and discrete direct currents, (g) a resistor, connected to said rectifiers, through which said individual and discrete direct currents flow to develop a voltage proportional to the currents supplied to said terminals by said variable output sources, and (h) a discharge rectifier and a further resistor connected across said terminals to respond to D.C. circulating currents flowing through said terminals to develop a voltage proportional to the value of said D.C. circulating currents, (i) said resistors being connected to add said voltages and thereby provide a voltage that is proportional to the total current flowing through said terminals, and (j) said variable output source having output connections, (k) said current transformers being connected intermediate said terminals and said output connections of said variable output sources.

19. A programming device for an electric welder that comprises:

(a) a variable output source, (b) a first adjustable reference voltage source, (c) a second adjustable reference voltage source, (d) a third adjustable reference voltage source, (e) amplifier means connectable to said variable output source and said adjustable reference voltage sources and responsive to said adjustable reference voltage sources to cause said variable output source to change the output level thereof, (f) a first circuit means connectable to said adjustable reference voltage sources that responds to signals to selectively render said adjustable reference voltage sources active and inactive and thereby determines the particular reference voltage to which said amplifier and said variable output source respond at any given time, and (g) a second circuit means for disconnecting said amplifier from said third adjustable reference voltage source and connecting said amplifier to the first said adjustable reference voltage source, (h) the first said circuit means thereafter being adapted, while said second circuit means is disconnecting said amplifier from said third adjustable reference voltage source and while said amplifier is connected to said first and said second adjustable reference voltage sources, to respond to a predetermined signal to render the first said adjustable reference voltage source inactive so that said amplifier and said variable output source no longer respond to the first said and said third adjustable reference voltage sources but, respond to said second adjustable reference voltage source, (i) said amplifier summing the voltages across whichever reference voltage sources are connected to it at any given time.

20. In a programming device for an electric welder:

(a) a first operational amplifier having an upper limit and a lower limit for the output thereof, (b) a second operational amplifier having an upper limit and a lower limit for the output thereof, (c) a signal source, means for connecting said signal source to said first operational amplifier for supplying a signal to said first operational amplifier which will drive the output of said first operational amplifier to its upper limit and for supplying a second signal to said first operational amplifier which will drive the output of the said first operational amplifier to its lower limit, (d) means connecting the input of said second operational amplifier to said output of the first said operational amplifier so said output of said first operational amplifier will serve as the input of said second operational amplifier, (e) the output of said first operational amplifier causing said second operational amplifier to shift its output to its upper limit whenever said output of the first said operational amplifier is at its lower limit,
(f) the output of said first operational amplifier causing said second operational amplifier to shift its output to its lower limit whenever said output of the first said operational amplifier is at its upper limit,
(g) the first said and said second signals normally causing said first operational amplifier to hold its output at its upper limit or its lower limit, respectively, and thus normally causing second operational amplifier to hold its output at its lower limit or its upper limit, respectively.

21. A voltage regulator that comprises:
(a) output terminals,
(b) a first high gain amplifier connected to one of said output terminals,
(c) a second high gain amplifier connected to the other of said output terminals,
(d) a voltage reference that is connected to said output terminals and that can respond to the application of power to it to maintain a predetermined voltage across itself,
(e) input terminals that are connectable to an unregulated source of power to supply power to said voltage reference,
(f) a feedback loop which includes the first said high gain amplifier and said voltage reference and which fixes a D.C. output voltage of a predetermined magnitude and polarity at said one output terminal, and
(g) a second feedback loop that includes said second high gain amplifier and that uses said D.C. output voltage at said one output terminal as a voltage reference and that fixes a second D.C. output voltage of said predetermined magnitude but of opposite polarity at said other output terminal,
(h) said predetermined magnitude and polarity of the first said D.C. output voltage at said one output terminal being a function of said predetermined voltage maintained by said voltage reference across itself,
(i) one of said high gain amplifiers having a portion thereof connected between an input terminal and an output terminal of said voltage regulator.

22. In a control system for an electric welder:
(a) a variable output source,
(b) an amplifier, means connecting said amplifier to said variable output source for causing said variable output source to vary its output,
(c) a reference source, means connecting said reference source to said amplifier,
(d) a first circuit, means connecting said first circuit to said reference source for responding to a signal to develop a voltage across said reference source,
(e) said amplifier responding to said voltage across said reference source to cause said variable output source to supply a predetermined current level,
(f) a second reference source, means connecting said second reference source to said amplifier,
(g) a second circuit, means connecting said second circuit to said second reference source for responding to a second signal to develop a voltage across said second reference source,
(h) said amplifier responding to said voltage across said second reference source to cause said variable output source to supply a second predetermined current level,
(i) a signal source, means for connecting said signal source to said first circuit for initiating said signal to which said first circuit responds to develop said voltage across the first said reference source and supplying the second signal to which said second circuit responds to develop said second voltage across said second reference source,
(j) said first circuit responding to removal of the first said signal to permit said voltage across the first said reference source to disappear,
(k) a capacitor, means connecting said capacitor to said first reference source for charging and discharging said capacitor to help determine the rate at which the voltage across the first said reference source disappears and to help determine the rate at which the voltage across said second reference source develops,
(l) a resistor, means connecting said resistor to said capacitor for passing the charging and discharging current for said capacitor, and
(m) a circuit that includes an amplifier connected to said resistor, and that holds the voltages at the opposite ends of said resistor fixed so the charging and discharging currents for said capacitor will remain constant and thereby provide linear charging and discharging of said capacitor whereby the rate of removal of the voltage across the first said reference source will be linear and the rate of development of the voltage across said second reference source will be linear.

23. In an electric welder:
(a) output terminals,
(b) a power source, means connecting said power source to said output terminals for establishing a relatively high voltage at said output terminals and for supplying substantially no current to said output terminals prior to the initiation of an arc,
(c) said voltage decreasing and said current increasing as an arc is established,
(d) an ignition circuit, means connecting said ignition circuit to said power source, said ignition circuit normally being inactive but responding to actuation thereof to force said power source to supply power to said output terminals that facilitates the establishing of an arc,
(e) an "or" gate in said ignition circuit, means connecting said "or" gate to said output terminals, said "or" gate actuating said ignition circuit to force said power source to supply power to said output terminals,
(f) an "and" gate in said ignition circuit, means connecting said "and" gate to said output terminals, said "and" gate preventing actuation of said ignition circuit after said "or" gate has actuated said ignition circuit, thereby preventing reactuation of said ignition circuit,
(g) both said "or" gate and said "and" gate being connected by said means to sense the voltage across said output terminals of said welder and also to sense the current supplied to said output terminals by said power source,
(h) said "or" gate initially responding either to a decrease in the voltage across said output terminals of said welder or to an increase in the current supplied to said output terminals by said power source to actuate said ignition circuit and thereby force said ignition circuit to cause said power source to supply power to said output terminals,
(i) said "and" gate requiring both a decrease in the current supplied to said output terminals by said power source and an increase in the voltage across said output terminals to permit said ignition circuit to become inactive and to thereafter be reactuated by said "or" gate to again cause said power to be supplied to said output terminals,
(j) whereby said ignition circuit initially responds either to a decrease in voltage across said output terminals or to an increase in the current supplied to said output terminals by said power source to cause said power to be supplied to said output terminals and thereby facilitate establishment of an arc, and thereafter prevents reactuation of itself until both a decrease in the current supplied to said output terminals by said power source and an increase in the voltage across said output terminals occurs.

24. A programming device for an electric welder that comprises:
(a) a variable output source,
(b) an amplifier, means connecting said amplifier to said variable output source to vary its output,
(c) a reference voltage source, means connecting said reference voltage source to said amplifier, said reference voltage source having an adjustable element plus a dial that is movable to adjust said adjustable element and thereby adjust the value of the reference voltage provided by said reference voltage source,
(d) a circuit, means connecting said circuit to said reference voltage source, said circuit responding to a signal to develop said reference voltage across said reference voltage source,
(e) said amplifier responding to said reference voltage across said reference voltage source to cause said variable output source to supply the current level called for by the setting of the dial,
(f) a second reference voltage source, means connecting said second reference voltage source to said amplifier, said second reference voltage source having a second adjustable element plus a second dial that is movable to adjust said second adjustable element and thereby adjust the value of the second reference voltage provided by said second reference voltage source,
(g) a second circuit, means connecting said second circuit to said second reference voltage source, said second circuit responding to a second signal to develop said second reference voltage across said second voltage source,
(h) said amplifier responding to said second reference voltage across said second reference voltage source to cause said variable output source to supply the current level called for by the setting of said second dial,
(i) a signal source, means connecting said signal source to the first said circuit and to said second circuit for initiating the signal to which the first said circuit responds to develop said reference voltage across the first said reference voltage source for supplying the second signal to which said second circuit responds to develop said second reference voltage across said second reference voltage source,
(j) the first said circuit responding to removal of the first said signal to permit said reference voltage across the first said reference voltage source to disappear, and
(k) said means which connects said signal source to the first said circuit and to said second circuit including an adjustable member that has a third dial movable to adjust the position of said adjustable member and thereby determine the values of the first said and said second signals, said means which connects said signal source to the first said circuit and to said second circuit transmitting the first said signal to the first said circuit, transmitting said second signal to said second circuit, determining the time during which the reference voltage across the first said reference voltage source disappears, and determining the time during which the second reference voltage across said second reference voltage source develops,
(l) said adjustable member causing the time during which the reference voltage across the first said reference voltage source disappears and the second reference voltage across said second reference voltage source develops to match the setting on said third dial,
(m) said means which connects said signal source to the first said circuit and to said second circuit making the reference voltage across the first said reference voltage source disappear and making the second reference voltage across said second reference voltage source develop at a linear rate.

References Cited by the Examiner

UNITED STATES PATENTS

| | | | |
|---|---|---|---|
| 2,167,530 | 7/1939 | Schneider | 323—31 |
| 2,365,611 | 12/1944 | White | 323—89 |
| 2,426,964 | 9/1947 | Callender | 315—205 |
| 2,560,284 | 7/1951 | Grandstaff | 321—18 |
| 2,572,648 | 10/1951 | Mittag | 321—18 |
| 2,579,235 | 12/1951 | Kerns | 323—44 |
| 2,684,460 | 7/1954 | Buseman | 315—144 |
| 2,784,910 | 3/1957 | Ghierso | 328—115 |
| 2,813,199 | 11/1957 | Scjaky et al. | 328—75 |
| 2,883,583 | 4/1959 | Large et al. | 328—75 |
| 2,934,643 | 4/1960 | Petriw | 328—158 |
| 2,951,972 | 9/1960 | Pomazal | 315—311 |
| 2,955,257 | 10/1960 | Lindsay | 330—17 |
| 2,991,409 | 7/1961 | Bennett | 323—89 |
| 3,019,395 | 1/1962 | Hearn | 328—258 |
| 3,026,407 | 3/1962 | Bergmann | 328—75 |
| 3,040,234 | 6/1962 | Walker et al. | 323—89 |
| 3,094,675 | 6/1963 | Ule | 330—110 |
| 3,114,101 | 12/1963 | Greene | 328—75 |

FOREIGN PATENTS 868,018   5/1961   Great Britain.

DAVID J. GALVIN, *Primary Examiner.*

JOHN W. HUCKERT, *Examiner.*

UNITED STATES PATENT OFFICE
CERTIFICATE OF CORRECTION

Patent No. 3,321,667                                                  May 23, 1967

Harold C. Hoyt, Jr.

It is certified that error appears in the above identified patent and that said Letters Patent are hereby corrected as shown below:

Column 4, line 42, "voltages," should read -- voltages --. Column 5, line 62, "rise" should read -- decrease --. Column 11, line 2, "22" should read -- 222 --. Column 18, line 27, "Aa" should read -- A --. Column 19, line 74, cancel "to", first occurrence. Column 22, line 6, "362" should read -- 352 --. Column 23, lines 4 and 5, "negative" should read -- relative --. Column 30, line 27, after "drop" insert -- in --. Column 35, line 1, "nector" should read -- ductor --. Column 37, line 68, "conatct" should read -- contact --. Column 38, line 66, "or" should read -- of --. Column 39, line 1, "cathodes" should read -- cathode --. Column 41, line 63, after "termin-" insert -- nal 442 and provides a precisely-controlled negative --. Column 46, line 65, after "negative" insert -- voltage --. Column 47, line 38, after "thence" insert -- through --. Column 49, line 35, "curcuit" should read -- circuit --. Column 50, line 67, "hereinafter" should read -- hereinbefore --; line 69, "transistor" should read -- transistion --. Column 59, line 28, after "in" insert -- the --. Column 61, line 75, "anl" should read -- and --. Column 63, line 5, "electrtic" should read -- electric --. Column 64, line 23, "ressitor" should read -- resistor --. Column 70, line 7, cancel the comma, second occurrence; line 5! "control" should read -- circuit --. Column 71, line 44, "said first" should read -- first said --. Column 79, line 33, after "second" insert -- reference --; line 43, after "source" insert -- and --.

Signed and sealed this 30th day of March 1971.

(SEAL)
Attest:

EDWARD M. FLETCHER, JR.                                WILLIAM E. SCHUYLER, JR.
Attesting Officer                                            Commissioner of Patents